US012756520B2

(12) United States Patent
Matsumura et al.

(10) Patent No.: US 12,756,520 B2
(45) Date of Patent: Oct. 6, 2026

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Satoshi Nagata, Tokyo (JP); Jing Wang, Beijing (CN); Lan Chen, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 259 days.

(21) Appl. No.: 18/836,192

(22) PCT Filed: Feb. 10, 2022

(86) PCT No.: PCT/JP2022/005488
§ 371 (c)(1),
(2) Date: Aug. 6, 2024

(87) PCT Pub. No.: WO2023/152920
PCT Pub. Date: Aug. 17, 2023

(65) Prior Publication Data
US 2025/0119256 A1 Apr. 10, 2025

(51) Int. Cl.
*H04L 5/00* (2006.01)
*H04W 72/1268* (2023.01)
*H04W 72/232* (2023.01)

(52) U.S. Cl.
CPC ....... *H04L 5/0051* (2013.01); *H04W 72/1268* (2013.01); *H04W 72/232* (2023.01)

(58) Field of Classification Search
USPC .......................................................... 370/329
See application file for complete search history.

(56) References Cited

U.S. PATENT DOCUMENTS 9,596,064 B2 * 3/2017 Park .................... H04L 27/2613
9,609,647 B2 * 3/2017 You ....................... H04L 5/0051
10,848,223 B2 * 11/2020 Kim ..................... H04B 7/0626
10,958,396 B2 * 3/2021 Liu .......................... H04L 5/005
11,218,269 B2 * 1/2022 Jiang ..................... H04L 1/1819
(Continued)

OTHER PUBLICATIONS

3GPP TS 36.300 V8.12.0 "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)" Mar. 2010 (149 pages).
(Continued)

*Primary Examiner* — Melvin H Pollack
(74) *Attorney, Agent, or Firm* — Osha Bergman Watanabe & Burton LLP

(57) ABSTRACT

A terminal according to one aspect of the present disclosure includes a receiving section that receives downlink control information including a resource assignment of a physical uplink shared channel and a value of an antenna port indication, and a control section that controls transmission of a demodulation reference signal (DMRS), based on an association between the value, the number of code division multiplexing (CDM) groups, and a DMRS port. The number of the CDM groups for DMRS configuration type 1 is larger than 2, and the number of the CDM groups for DMRS configuration type 2 is larger than 3. According to one aspect of the present disclosure, an appropriate number of DMRS ports can be used.

6 Claims, 58 Drawing Sheets

Case 1

List#1

| p | CDM group λ |
|---|---|
| 1000 | 0 |
| 1001 | 0 |
| 1002 | 1 |
| 1003 | 1 |

List#2

| p | CDM group λ |
|---|---|
| 1000 | 0 |
| 1001 | 0 |
| 1002 | 1 |
| 1003 | 1 |
| j | k |

→

(Actual Mapping)

| p | CDM group λ |
|---|---|
| 1004 | 2 |
| 1005 | 2 |
| 1006 | 3 |
| 1007 | 3 |
| j+P | k+Q |

(56) References Cited

U.S. PATENT DOCUMENTS

| | | | | |
|---|---|---|---|---|
| 11,265,122 | B2 * | 3/2022 | Khoshnevisan | H04L 5/0051 |
| 11,336,413 | B2 * | 5/2022 | Kim | H04L 27/2695 |
| 11,411,697 | B2 * | 8/2022 | Nakamura | H04L 5/0048 |
| 11,632,204 | B2 * | 4/2023 | Marinier | H04L 5/001 370/329 |
| 11,677,448 | B2 * | 6/2023 | Wei | H04B 7/0452 370/329 |
| 12,166,710 | B2 * | 12/2024 | Xu | H04L 27/2602 |
| 12,224,966 | B2 * | 2/2025 | Frenne | H04L 5/0053 |
| 12,309,095 | B2 * | 5/2025 | Sridharan | H04L 5/0051 |
| 12,402,024 | B2 * | 8/2025 | Zhang | H04W 24/08 |
| 12,489,505 | B2 * | 12/2025 | Hajri | H04B 7/0617 |
| 12,507,241 | B2 * | 12/2025 | Gao | H04L 5/0023 |
| 12,562,792 | B2 * | 2/2026 | Rahman | H04B 7/0617 |
| 12,593,333 | B2 * | 3/2026 | Zhang | H04L 5/0044 |
| 12,609,795 | B2 * | 4/2026 | Maki | H04L 5/0051 |
| 2016/0087774 | A1 * | 3/2016 | Guo | H04L 5/0051 370/329 |
| 2019/0335399 | A1 * | 10/2019 | Wang | H04B 7/0426 |
| 2020/0220703 | A1 * | 7/2020 | Kim | H04L 27/26 |
| 2020/0266964 | A1 * | 8/2020 | Kang | H04W 72/23 |
| 2021/0045148 | A1 * | 2/2021 | Khoshnevisan | H04L 5/0051 |
| 2021/0203392 | A1 * | 7/2021 | Kwak | H04B 7/0639 |
| 2023/0143457 | A1 * | 5/2023 | Levitsky | H04L 5/0096 370/329 |
| 2025/0373295 | A1 * | 12/2025 | Hao | H04B 7/048 |
| 2026/0031955 | A1 * | 1/2026 | Xiao | H04L 5/0051 |
| 2026/0136359 | A1 * | 5/2026 | Gao | H04W 72/1268 |

OTHER PUBLICATIONS

International Search Report issued in International Application No. PCT/JP2022/005488, mailed Sep. 13, 2022 (5 pages).

Written Opinion issued in International Application No. PCT/JP2022/005488; Dated Sep. 13, 2022 (3 pages).

* cited by examiner

Parameters for PDSCH DM-RS configuration type 1.

| $p$ | CDM group $\lambda$ | $\Delta$ | $w_f(k')$ | | $w_t(l')$ | |
|---|---|---|---|---|---|---|
| | | | $k'=0$ | $k'=1$ | $l'=0$ | $l'=1$ |
| 1000 | 0 | 0 | +1 | +1 | +1 | +1 |
| 1001 | 0 | 0 | +1 | -1 | +1 | +1 |
| 1002 | 1 | 1 | +1 | +1 | +1 | +1 |
| 1003 | 1 | 1 | +1 | -1 | +1 | +1 |
| 1004 | 0 | 0 | +1 | +1 | +1 | -1 |
| 1005 | 0 | 0 | +1 | -1 | +1 | -1 |
| 1006 | 1 | 1 | +1 | +1 | +1 | -1 |
| 1007 | 1 | 1 | +1 | -1 | +1 | -1 |

Parameters for PDSCH DM-RS configuration type 2.

| $p$ | CDM group $\lambda$ | $\Delta$ | $w_f(k')$ | | $w_t(l')$ | |
|---|---|---|---|---|---|---|
| | | | $k'=0$ | $k'=1$ | $l'=0$ | $l'=1$ |
| 1000 | 0 | 0 | +1 | +1 | +1 | +1 |
| 1001 | 0 | 0 | +1 | -1 | +1 | +1 |
| 1002 | 1 | 2 | +1 | +1 | +1 | +1 |
| 1003 | 1 | 2 | +1 | -1 | +1 | +1 |
| 1004 | 2 | 4 | +1 | +1 | +1 | +1 |
| 1005 | 2 | 4 | +1 | -1 | +1 | +1 |
| 1006 | 0 | 0 | +1 | +1 | +1 | -1 |
| 1007 | 0 | 0 | +1 | -1 | +1 | -1 |
| 1008 | 1 | 2 | +1 | +1 | +1 | -1 |
| 1009 | 1 | 2 | +1 | -1 | +1 | -1 |
| 1010 | 2 | 4 | +1 | +1 | +1 | -1 |
| 1011 | 2 | 4 | +1 | -1 | +1 | -1 |

FIG. 1

Parameters for PUSCH DM-RS configuration type 1.

| $\tilde{p}$ | CDM group $\lambda$ | Δ | $w_f(k')$ | | $w_t(l')$ | |
|---|---|---|---|---|---|---|
| | | | $k'=0$ | $k'=1$ | $l'=0$ | $l'=1$ |
| 0 | 0 | 0 | +1 | +1 | +1 | +1 |
| 1 | 0 | 0 | +1 | -1 | +1 | +1 |
| 2 | 1 | 1 | +1 | +1 | +1 | +1 |
| 3 | 1 | 1 | +1 | -1 | +1 | +1 |
| 4 | 0 | 0 | +1 | +1 | +1 | -1 |
| 5 | 0 | 0 | +1 | -1 | +1 | -1 |
| 6 | 1 | 1 | +1 | +1 | +1 | -1 |
| 7 | 1 | 1 | +1 | -1 | +1 | -1 |

Parameters for PUSCH DM-RS configuration type 2.

| $\tilde{p}$ | CDM group $\lambda$ | Δ | $w_f(k')$ | | $w_t(l')$ | |
|---|---|---|---|---|---|---|
| | | | $k'=0$ | $k'=1$ | $l'=0$ | $l'=1$ |
| 0 | 0 | 0 | +1 | +1 | +1 | +1 |
| 1 | 0 | 0 | +1 | -1 | +1 | +1 |
| 2 | 1 | 2 | +1 | +1 | +1 | +1 |
| 3 | 1 | 2 | +1 | -1 | +1 | +1 |
| 4 | 2 | 4 | +1 | +1 | +1 | +1 |
| 5 | 2 | 4 | +1 | -1 | +1 | +1 |
| 6 | 0 | 0 | +1 | +1 | +1 | -1 |
| 7 | 0 | 0 | +1 | -1 | +1 | -1 |
| 8 | 1 | 2 | +1 | +1 | +1 | -1 |
| 9 | 1 | 2 | +1 | -1 | +1 | -1 |
| 10 | 2 | 4 | +1 | +1 | +1 | -1 |
| 11 | 2 | 4 | +1 | -1 | +1 | -1 |

FIG. 2

Parameters for PDSCH DM-RS configuration type 1.

| $p$ | CDM group $\lambda$ | $\Delta$ | $w_f(k')$ | $w_t(l')$ | |
|---|---|---|---|---|---|
| | | | | $l'=0$ | $l'=1$ |
| 1000 | 0 | 0 | #0 | +1 | +1 |
| 1001 | 0 | 0 | #1 | +1 | +1 |
| 1002 | 0 | 0 | #2 | +1 | +1 |
| 1003 | 0 | 0 | #3 | +1 | +1 |
| 1004 | 1 | 1 | #0 | +1 | +1 |
| 1005 | 1 | 1 | #1 | +1 | +1 |
| 1006 | 1 | 1 | #2 | +1 | +1 |
| 1007 | 1 | 1 | #3 | +1 | +1 |
| 1008 | 0 | 0 | #0 | +1 | -1 |
| 1009 | 0 | 0 | #1 | +1 | -1 |
| 1010 | 0 | 0 | #2 | +1 | -1 |
| 1011 | 0 | 0 | #3 | +1 | -1 |
| 1012 | 1 | 1 | #0 | +1 | -1 |
| 1013 | 1 | 1 | #1 | +1 | -1 |
| 1014 | 1 | 1 | #2 | +1 | -1 |
| 1015 | 1 | 1 | #3 | +1 | -1 |

FIG. 3

Parameters for PDSCH DM-RS configuration type 1.

| $p$ | CDM group $\lambda$ | Δ | $w_f(k')$ | $w_t(l')$ | |
|---|---|---|---|---|---|
| | | | | $l'=0$ | $l'=1$ |
| 1000 | 0 | 0 | #0 | +1 | +1 |
| 1001 | 0 | 0 | #1 | +1 | +1 |
| 1002 | 0 | 0 | #2 | +1 | +1 |
| 1003 | 0 | 0 | #3 | +1 | +1 |
| 1004 | 0 | 0 | #0 | +1 | -1 |
| 1005 | 0 | 0 | #1 | +1 | -1 |
| 1006 | 0 | 0 | #2 | +1 | -1 |
| 1007 | 0 | 0 | #3 | +1 | -1 |
| 1008 | 1 | 1 | #0 | +1 | +1 |
| 1009 | 1 | 1 | #1 | +1 | +1 |
| 1010 | 1 | 1 | #2 | +1 | +1 |
| 1011 | 1 | 1 | #3 | +1 | +1 |
| 1012 | 1 | 1 | #0 | +1 | -1 |
| 1013 | 1 | 1 | #1 | +1 | -1 |
| 1014 | 1 | 1 | #2 | +1 | -1 |
| 1015 | 1 | 1 | #3 | +1 | -1 |

FIG. 4

Parameters for PDSCH DM-RS configuration type 1.

| $p$ | CDM group $\lambda$ | Δ | $w_f(k')$ | $w_t(l')$ | |
|---|---|---|---|---|---|
| | | | | $l'=0$ | $l'=1$ |
| 1000 | 0 | | | | |
| 1001 | 0 | | | | |
| 1002 | 1 | | | | |
| 1003 | 1 | | | | |
| 1004 | 0 | | | | |
| 1005 | 0 | | | | |
| 1006 | 1 | | | | |
| 1007 | 1 | | | | |
| 1008 | 2 | | | | |
| 1009 | 2 | | | | |
| 1010 | 3 | | | | |
| 1011 | 3 | | | | |
| 1012 | 2 | | | | |
| 1013 | 2 | | | | |
| 1014 | 3 | | | | |
| 1015 | 3 | | | | |

FIG. 5

Parameters for PDSCH DM-RS configuration type 2.

| $p$ | CDM group $\lambda$ | $\Delta$ | $w_f(k')$ | $w_t(l')$ | |
|---|---|---|---|---|---|
| | | | | $l'=0$ | $l'=1$ |
| 1000 | 0 | | | | |
| 1001 | 0 | | | | |
| 1002 | 1 | | | | |
| 1003 | 1 | | | | |
| 1004 | 2 | | | | |
| 1005 | 2 | | | | |
| 1006 | 0 | | | | |
| 1007 | 0 | | | | |
| 1008 | 1 | | | | |
| 1009 | 1 | | | | |
| 1010 | 2 | | | | |
| 1011 | 2 | | | | |
| 1012 | 3 | | | | |
| 1013 | 3 | | | | |
| 1014 | 4 | | | | |
| 1015 | 4 | | | | |
| 1016 | 5 | | | | |
| 1017 | 5 | | | | |
| 1018 | 3 | | | | |
| 1019 | 3 | | | | |
| 1020 | 4 | | | | |
| 1021 | 4 | | | | |
| 1022 | 5 | | | | |
| 1023 | 5 | | | | |

FIG. 6

Parameters for PDSCH DM-RS configuration type 1.

| $p$ | CDM group $\lambda$ | $\Delta$ | $w_f(k')$ | $w_t(l')$ | |
|---|---|---|---|---|---|
| | | | | $l'=0$ | $l'=1$ |
| 1000 | 0 | | | | |
| 1001 | 0 | | | | |
| 1002 | 1 | | | | |
| 1003 | 1 | | | | |
| 1004 | 2 | | | | |
| 1005 | 2 | | | | |
| 1006 | 3 | | | | |
| 1007 | 3 | | | | |
| 1008 | 0 | | | | |
| 1009 | 0 | | | | |
| 1010 | 1 | | | | |
| 1011 | 1 | | | | |
| 1012 | 2 | | | | |
| 1013 | 2 | | | | |
| 1014 | 3 | | | | |
| 1015 | 3 | | | | |

FIG. 7

Parameters for PDSCH DM-RS configuration type 2.

| $p$ | CDM group $\lambda$ | Δ | $w_f(k')$ | $w_t(l')$ | |
|---|---|---|---|---|---|
| | | | | $l'=0$ | $l'=1$ |
| 1000 | 0 | | | | |
| 1001 | 0 | | | | |
| 1002 | 1 | | | | |
| 1003 | 1 | | | | |
| 1004 | 2 | | | | |
| 1005 | 2 | | | | |
| 1006 | 3 | | | | |
| 1007 | 3 | | | | |
| 1008 | 4 | | | | |
| 1009 | 4 | | | | |
| 1010 | 5 | | | | |
| 1011 | 5 | | | | |
| 1012 | 0 | | | | |
| 1013 | 0 | | | | |
| 1014 | 1 | | | | |
| 1015 | 1 | | | | |
| 1016 | 2 | | | | |
| 1017 | 2 | | | | |
| 1018 | 3 | | | | |
| 1019 | 3 | | | | |
| 1020 | 4 | | | | |
| 1021 | 4 | | | | |
| 1022 | 5 | | | | |
| 1023 | 5 | | | | |

FIG. 8

Parameters for PDSCH DM-RS configuration type 1.

| $p$ | CDM group $\lambda$ | Δ | $w_f(k')$ | $w_t(l')$ | |
|---|---|---|---|---|---|
| | | | | $l'=0$ | $l'=1$ |
| 1000 | 0 | | | | |
| 1001 | 0 | | | | |
| 1002 | 1 | | | | |
| 1003 | 1 | | | | |
| 1004 | 2 | | | | |
| 1005 | 2 | | | | |
| 1006 | 3 | | | | |
| 1007 | 3 | | | | |

FIG. 9

Parameters for PDSCH DM-RS configuration type 2.

| $p$ | CDM group $\lambda$ | Δ | $w_f(k')$ | $w_t(l')$ | |
|---|---|---|---|---|---|
| | | | | $l'=0$ | $l'=1$ |
| 1000 | 0 | | | | |
| 1001 | 0 | | | | |
| 1002 | 1 | | | | |
| 1003 | 1 | | | | |
| 1004 | 2 | | | | |
| 1005 | 2 | | | | |
| 1006 | 3 | | | | |
| 1007 | 3 | | | | |
| 1008 | 4 | | | | |
| 1009 | 4 | | | | |
| 1010 | 5 | | | | |
| 1011 | 5 | | | | |

FIG. 10

$$r(n) = \frac{1}{\sqrt{2}}\left(1 - 2 \cdot c(2n)\right) + j\frac{1}{\sqrt{2}}\left(1 - 2 \cdot c(2n+1)\right)$$

$$c_{\text{init}} = \left(2^{17}\left(N_{\text{symb}}^{\text{slot}} n_{\text{s,f}}^{\mu} + l + 1\right)\left(2N_{\text{ID}}^{\bar{n}_{\text{SCID}}^{\bar{\lambda}}} + 1\right) + 2^{17}\left\lfloor\frac{\bar{\lambda}}{2}\right\rfloor + 2N_{\text{ID}}^{\bar{n}_{\text{SCID}}^{\bar{\lambda}}} + \bar{n}_{\text{SCID}}^{\bar{\lambda}}\right) \bmod 2^{31}$$

FIG. 11

Case 1

List#1

| $p$ | CDM group $\lambda$ |
|---|---|
| 1000 | 0 |
| 1001 | 0 |
| 1002 | 1 |
| 1003 | 1 |

List#2

| $p$ | CDM group $\lambda$ |
|---|---|
| 1000 | 0 |
| 1001 | 0 |
| 1002 | 1 |
| 1003 | 1 |
| j | k |

→

(Actual Mapping)

| $p$ | CDM group $\lambda$ |
|---|---|
| 1004 | 2 |
| 1005 | 2 |
| 1006 | 3 |
| 1007 | 3 |
| j+P | k+Q |

FIG. 12

Case 2

List#1

| *p* | CDM group λ |
|---|---|
| 1000 | 0 |
| 1001 | 0 |
| 1002 | 1 |
| 1003 | 1 |
| 1004 | 0 |
| 1005 | 0 |
| 1006 | 1 |
| 1007 | 1 |

List#2

| *p* | CDM group λ |
|---|---|
| 1000 | 0 |
| 1001 | 0 |
| 1002 | 1 |
| 1003 | 1 |
| 1004 | 0 |
| 1005 | 0 |
| 1006 | 1 |
| 1007 | 1 |
| j | k |

→

(Actual Mapping)

| *p* | CDM group λ |
|---|---|
| 1008 | 2 |
| 1009 | 2 |
| 1010 | 3 |
| 1011 | 3 |
| 1012 | 2 |
| 1013 | 2 |
| 1014 | 3 |
| 1015 | 3 |
| j+P | k+Q |

FIG. 13

Case 3

List#1

| $p$ | CDM group $\lambda$ |
|---|---|
| 1000 | 0 |
| 1001 | 0 |
| 1002 | 1 |
| 1003 | 1 |
| 1004 | 2 |
| 1005 | 2 |

List#2

| $p$ | CDM group $\lambda$ |
|---|---|
| 1000 | 0 |
| 1001 | 0 |
| 1002 | 1 |
| 1003 | 1 |
| 1004 | 2 |
| 1005 | 2 |
| j | k |

→

(Actual Mapping)

| $p$ | CDM group $\lambda$ |
|---|---|
| 1006 | 3 |
| 1007 | 3 |
| 1008 | 4 |
| 1009 | 4 |
| 1010 | 5 |
| 1011 | 5 |
| j+P | k+Q |

FIG. 14

Case 4

List#1

| *p* | CDM group λ |
|---|---|
| 1000 | 0 |
| 1001 | 0 |
| 1002 | 1 |
| 1003 | 1 |
| 1004 | 2 |
| 1005 | 2 |
| 1006 | 0 |
| 1007 | 0 |
| 1008 | 1 |
| 1009 | 1 |
| 1010 | 2 |
| 1011 | 2 |

List#2

| *p* | CDM group λ |
|---|---|
| 1000 | 0 |
| 1001 | 0 |
| 1002 | 1 |
| 1003 | 1 |
| 1004 | 2 |
| 1005 | 2 |
| 1006 | 0 |
| 1007 | 0 |
| 1008 | 1 |
| 1009 | 1 |
| 1010 | 2 |
| 1011 | 2 |
| j | k |

→

(Actual Mapping)

| *p* | CDM group λ |
|---|---|
| 1012 | 3 |
| 1013 | 3 |
| 1014 | 4 |
| 1015 | 4 |
| 1016 | 5 |
| 1017 | 5 |
| 1018 | 3 |
| 1019 | 3 |
| 1020 | 4 |
| 1021 | 4 |
| 1022 | 5 |
| 1023 | 5 |
| j+P | k+Q |

FIG. 15

Antenna port(s), transform precoder is disabled,

***dmrs-Type*=1, *maxLength*=1, rank = 1**

| Value | Number of DMRS CDM group(s) without data | DMRS port(s) |
|---|---|---|
| 0 | 1 | 0 |
| 1 | 1 | 1 |
| 2 | 2 | 0 |
| 3 | 2 | 1 |
| 4 | 2 | 2 |
| 5 | 2 | 3 |
| 6-7 | Reserved | Reserved |

Antenna port(s), transform precoder is disabled,

***dmrs-Type*=1, *maxLength*=1, rank = 2**

| Value | Number of DMRS CDM group(s) without data | DMRS port(s) |
|---|---|---|
| 0 | 1 | 0,1 |
| 1 | 2 | 0,1 |
| 2 | 2 | 2,3 |
| 3 | 2 | 0,2 |
| 4-7 | Reserved | Reserved |

Antenna port(s), transform precoder is disabled,

***dmrs-Type*=1, *maxLength*=1, rank = 3**

| Value | Number of DMRS CDM group(s) without data | DMRS port(s) |
|---|---|---|
| 0 | 2 | 0-2 |
| 1-7 | Reserved | Reserved |

Antenna port(s), transform precoder is disabled,

***dmrs-Type*=1, *maxLength*=1, rank = 4**

| Value | Number of DMRS CDM group(s) without data | DMRS port(s) |
|---|---|---|
| 0 | 2 | 0-3 |
| 1-7 | Reserved | Reserved |

FIG. 17

Antenna port(s), transform precoder is disabled,

***dmrs-Type*=1, *maxLength*=2, rank = 1**

| Value | Number of DMRS CDM group(s) without data | DMRS port(s) | Number of front-load symbols |
|---|---|---|---|
| 0 | 1 | 0 | 1 |
| 1 | 1 | 1 | 1 |
| 2 | 2 | 0 | 1 |
| 3 | 2 | 1 | 1 |
| 4 | 2 | 2 | 1 |
| 5 | 2 | 3 | 1 |
| 6 | 2 | 0 | 2 |
| 7 | 2 | 1 | 2 |
| 8 | 2 | 2 | 2 |
| 9 | 2 | 3 | 2 |
| 10 | 2 | 4 | 2 |
| 11 | 2 | 5 | 2 |
| 12 | 2 | 6 | 2 |
| 13 | 2 | 7 | 2 |
| 14-15 | Reserved | Reserved | Reserved |

Antenna port(s), transform precoder is disabled,

***dmrs-Type*=1, *maxLength*=2, rank = 2**

| Value | Number of DMRS CDM group(s) without data | DMRS port(s) | Number of front-load symbols |
|---|---|---|---|
| 0 | 1 | 0,1 | 1 |
| 1 | 2 | 0,1 | 1 |
| 2 | 2 | 2,3 | 1 |
| 3 | 2 | 0,2 | 1 |
| 4 | 2 | 0,1 | 2 |
| 5 | 2 | 2,3 | 2 |
| 6 | 2 | 4,5 | 2 |
| 7 | 2 | 6,7 | 2 |
| 8 | 2 | 0,4 | 2 |
| 9 | 2 | 2,6 | 2 |
| 10-15 | Reserved | Reserved | Reserved |

FIG. 18

Antenna port(s), transform precoder is disabled,

***dmrs-Type*=1, *maxLength*=2, rank = 3**

| Value | Number of DMRS CDM group(s) without data | DMRS port(s) | Number of front-load symbols |
|---|---|---|---|
| 0 | 2 | 0-2 | 1 |
| 1 | 2 | 0,1,4 | 2 |
| 2 | 2 | 2,3,6 | 2 |
| 3-15 | Reserved | Reserved | Reserved |

Antenna port(s), transform precoder is disabled,

***dmrs-Type*=1, *maxLength*=2, rank = 4**

| Value | Number of DMRS CDM group(s) without data | DMRS port(s) | Number of front-load symbols |
|---|---|---|---|
| 0 | 2 | 0-3 | 1 |
| 1 | 2 | 0,1,4,5 | 2 |
| 2 | 2 | 2,3,6,7 | 2 |
| 3 | 2 | 0,2,4,6 | 2 |
| 4-15 | Reserved | Reserved | Reserved |

FIG. 19

Antenna port(s), transform precoder is disabled,
***dmrs-Type*=2, *maxLength*=1, rank=1**

| Value | Number of DMRS CDM group(s) without data | DMRS port(s) |
|---|---|---|
| 0 | 1 | 0 |
| 1 | 1 | 1 |
| 2 | 2 | 0 |
| 3 | 2 | 1 |
| 4 | 2 | 2 |
| 5 | 2 | 3 |
| 6 | 3 | 0 |
| 7 | 3 | 1 |
| 8 | 3 | 2 |
| 9 | 3 | 3 |
| 10 | 3 | 4 |
| 11 | 3 | 5 |
| 12-15 | Reserved | Reserved |

Antenna port(s), transform precoder is disabled,
***dmrs-Type*=2, *maxLength*=1, rank=2**

| Value | Number of DMRS CDM group(s) without data | DMRS port(s) |
|---|---|---|
| 0 | 1 | 0,1 |
| 1 | 2 | 0,1 |
| 2 | 2 | 2,3 |
| 3 | 3 | 0,1 |
| 4 | 3 | 2,3 |
| 5 | 3 | 4,5 |
| 6 | 2 | 0,2 |
| 7-15 | Reserved | Reserved |

FIG. 20

Antenna port(s), transform precoder is disabled,
***dmrs-Type*=2, *maxLength*=1, rank =3**

| Value | Number of DMRS CDM group(s) without data | DMRS port(s) |
|---|---|---|
| 0 | 2 | 0-2 |
| 1 | 3 | 0-2 |
| 2 | 3 | 3-5 |
| 3-15 | Reserved | Reserved |

Antenna port(s), transform precoder is disabled,
***dmrs-Type*=2, *maxLength*=1, rank =4**

| Value | Number of DMRS CDM group(s) without data | DMRS port(s) |
|---|---|---|
| 0 | 2 | 0-3 |
| 1 | 3 | 0-3 |
| 2-15 | Reserved | Reserved |

FIG. 21

Antenna port(s), transform precoder is disabled,

*dmrs-Type*=2, *maxLength*=2, rank=1

| Value | Number of DMRS CDM group(s) without data | DMRS port(s) | Number of front-load symbols |
|---|---|---|---|
| 0 | 1 | 0 | 1 |
| 1 | 1 | 1 | 1 |
| 2 | 2 | 0 | 1 |
| 3 | 2 | 1 | 1 |
| 4 | 2 | 2 | 1 |
| 5 | 2 | 3 | 1 |
| 6 | 3 | 0 | 1 |
| 7 | 3 | 1 | 1 |
| 8 | 3 | 2 | 1 |
| 9 | 3 | 3 | 1 |
| 10 | 3 | 4 | 1 |
| 11 | 3 | 5 | 1 |
| 12 | 3 | 0 | 2 |
| 13 | 3 | 1 | 2 |
| 14 | 3 | 2 | 2 |
| 15 | 3 | 3 | 2 |
| 16 | 3 | 4 | 2 |
| 17 | 3 | 5 | 2 |
| 18 | 3 | 6 | 2 |
| 19 | 3 | 7 | 2 |
| 20 | 3 | 8 | 2 |
| 21 | 3 | 9 | 2 |
| 22 | 3 | 10 | 2 |
| 23 | 3 | 11 | 2 |
| 24 | 1 | 0 | 2 |
| 25 | 1 | 1 | 2 |
| 26 | 1 | 6 | 2 |
| 27 | 1 | 7 | 2 |
| 28-31 | Reserved | Reserved | Reserved |

FIG. 22

Antenna port(s), transform precoder is disabled,

***dmrs-Type*=2, *maxLength*=2, rank=2**

| Value | Number of DMRS CDM group(s) without data | DMRS port(s) | Number of front-load symbols |
|---|---|---|---|
| 0 | 1 | 0,1 | 1 |
| 1 | 2 | 0,1 | 1 |
| 2 | 2 | 2,3 | 1 |
| 3 | 3 | 0,1 | 1 |
| 4 | 3 | 2,3 | 1 |
| 5 | 3 | 4,5 | 1 |
| 6 | 2 | 0,2 | 1 |
| 7 | 3 | 0,1 | 2 |
| 8 | 3 | 2,3 | 2 |
| 9 | 3 | 4,5 | 2 |
| 10 | 3 | 6,7 | 2 |
| 11 | 3 | 8,9 | 2 |
| 12 | 3 | 10,11 | 2 |
| 13 | 1 | 0,1 | 2 |
| 14 | 1 | 6,7 | 2 |
| 15 | 2 | 0,1 | 2 |
| 16 | 2 | 2,3 | 2 |
| 17 | 2 | 6,7 | 2 |
| 18 | 2 | 8,9 | 2 |
| 19-31 | Reserved | Reserved | Reserved |

FIG. 23

Antenna port(s), transform precoder is disabled,

***dmrs-Type*=2, *maxLength*=2, rank=3**

| Value | Number of DMRS CDM group(s) without data | DMRS port(s) | Number of front-load symbols |
|---|---|---|---|
| 0 | 2 | 0-2 | 1 |
| 1 | 3 | 0-2 | 1 |
| 2 | 3 | 3-5 | 1 |
| 3 | 3 | 0,1,6 | 2 |
| 4 | 3 | 2,3,8 | 2 |
| 5 | 3 | 4,5,10 | 2 |
| 6-31 | Reserved | Reserved | Reserved |

Antenna port(s), transform precoder is disabled,

***dmrs-Type*=2, *maxLength*=2, rank=4**

| Value | Number of DMRS CDM group(s) without data | DMRS port(s) | Number of front-load symbols |
|---|---|---|---|
| 0 | 2 | 0-3 | 1 |
| 1 | 3 | 0-3 | 1 |
| 2 | 3 | 0,1,6,7 | 2 |
| 3 | 3 | 2,3,8,9 | 2 |
| 4 | 3 | 4,5,10,11 | 2 |
| 5-31 | Reserved | Reserved | Reserved |

FIG. 24

Antenna port(s), transform precoder is disabled,

***dmrs-Type*=1, *maxLength*=1, enhanced ports, rank = 1**

| Value | Number of DMRS CDM group(s) without data | DMRS port(s) |
|---|---|---|
| 0 | 1 | i_1,1 |
| 1 | 1 | i_1,2 |
| 2 | 2 | i_1,1 |
| 3 | 2 | i_1,2 |
| 4 | 2 | i_2,1 |
| 5 | 2 | i_2,2 |
| 6 | 1 | i_1,1 |
| 7 | 1 | i_1,2 |
| 8 | 2 | i_2,1 |
| 9 | 2 | i_2,2 |
| 10 | 2 | i_3,1 |
| 11 | 2 | i_3,2 |
| 12 | 1 | i_1,1 |
| 13 | 1 | i_1,2 |
| 14 | 2 | i_2,1 |
| 15 | 2 | i_2,2 |
| 16 | 2 | i_3,1 |
| 17 | 2 | i_3,2 |
| 18 | 1 | i_4,1 |
| 19 | 1 | i_4,2 |
| ... | ... | ... |
| $2^x$ | Reserved | Reserved |

FIG. 25

Antenna port(s), transform precoder is disabled,

***dmrs-Type*=1, *maxLength*=1, enhanced ports, rank = 2**

| Value | Number of DMRS CDM group(s) without data | DMRS port(s) |
|---|---|---|
| 0 | 1 | i_1,1, i_1,2 |
| 1 | 2 | i_1,1, i_1,2 |
| 2 | 2 | i_2,1, i_2,2 |
| 3 | 2 | i_1,1, i_2,2 |
| 4 | 2 | i_1,2, i_2,2 |
| 5 | 3 | i_1,1, i_1,2 |
| 6 | 3 | i_2,1, i_2,2 |
| 7 | 3 | i_3,1, i_3,2 |
| 8 | 3 | i_1,1, i_2,2 |
| 9 | 3 | i_1,1, i_3,1 |
| 10 | 4 | i_1,1, i_1,2 |
| 11 | 4 | i_2,1, i_2,2 |
| 12 | 4 | i_3,1, i_3,2 |
| 13 | 4 | i_4,1, i_4,2 |
| 14 | 4 | i_1,1, i_2,1 |
| 15 | 4 | i_1,1, i_3,1 |
| 16 | 4 | i_1,1, i_4,1 |
| ... | ... | ... |
| $2^x$ | Reserved | Reserved |

FIG. 26

Antenna port(s), transform precoder is disabled,

***dmrs-Type*=1, *maxLength*=1, enhanced ports, rank = 3**

| Value | Number of DMRS CDM group(s) without data | DMRS port(s) |
|---|---|---|
| 0 | 2 | i_1,1, i_1,2, i_2,1 |
| 1 | 2 | i_1,1, i_2,1, i_2,2 |
| 2 | 2 | i_1,2, i_2,1, i_2,2 |
| 3 | 3 | i_1,1, i_1,2, i_2,1 |
| 4 | 3 | i_2,2, i_3,1, i_3,2 |
| 5 | 4 | i_1,1, i_1,2, i_2,1 |
| 6 | 4 | i_2,2, i_3,1, i_3,2 |
| 7 | 4 | i_2,1, i_2,2, i_3,1 |
| 8 | 4 | i_3,2, i_4,1, i_4,2 |
| ... | Reserved | Reserved |

Antenna port(s), transform precoder is disabled,

***dmrs-Type*=1, *maxLength*=1, enhanced ports, rank = 4**

| Value | Number of DMRS CDM group(s) without data | DMRS port(s) |
|---|---|---|
| 0 | 2 | i_1,1, i_1,2, i_2,1, i_2,2 |
| 1 | 3 | i_1,1, i_1,2, i_2,1, i_2,2 |
| 2 | 3 | i_2,1, i_2,2, i_3,1, i_3,2 |
| 3 | 3 | i_1,1, i_1,2, i_3,1, i_3,2 |
| 4 | 4 | i_1,1, i_1,2, i_2,1, i_2,2 |
| 5 | 4 | i_3,1, i_3,2, i_4,1, i_4,2 |
| 6 | 4 | i_1,1, i_2,2, i_3,1, i_3,2 |
| 7 | 4 | i_2,1, i_2,2, i_4,1, i_4,2 |
| ... | ... | ... |
| ... | Reserved | Reserved |

FIG. 27

Antenna port(s), transform precoder is disabled,

***dmrs-Type*=1, *maxLength*=1, enhanced ports, rank = 1**

| Value | Number of DMRS CDM group(s) without data | DMRS port(s) |
|---|---|---|
| 0 | 1 | 0 |
| 1 | 1 | 1 |
| 2 | 2 | 0 |
| 3 | 2 | 1 |
| 4 | 2 | 2 |
| 5 | 2 | 3 |
| 6 | 1 | 0 |
| 7 | 1 | 1 |
| 8 | 2 | 2 |
| 9 | 2 | 3 |
| 10 | 2 | 4 |
| 11 | 2 | 5 |
| 12 | 1 | 0 |
| 13 | 1 | 1 |
| 14 | 2 | 2 |
| 15 | 2 | 3 |
| 16 | 2 | 4 |
| 17 | 2 | 5 |
| 18 | 1 | 6 |
| 19 | 1 | 7 |
| ... | ... | ... |
| $2^x$ | Reserved | Reserved |

FIG. 28

Antenna port(s), transform precoder is disabled,

***dmrs-Type*=1, *maxLength*=1, enhanced ports, rank = 2**

| Value | Number of DMRS CDM group(s) without data | DMRS port(s) |
|---|---|---|
| 0 | 1 | 0,1 |
| 1 | 2 | 0,1 |
| 2 | 2 | 2,3 |
| 3 | 2 | 0,2 |
| 4 | 2 | 1,3 |
| 5 | 3 | 0,1 |
| 6 | 3 | 2,3 |
| 7 | 3 | 4,5 |
| 8 | 3 | 0,2 |
| 9 | 3 | 0,4 |
| 10 | 4 | 0,1 |
| 11 | 4 | 2,3 |
| 12 | 4 | 4,5 |
| 13 | 4 | 6,7 |
| 14 | 4 | 0,2 |
| 15 | 4 | 0,4 |
| 16 | 4 | 0,6 |
| ... | ... | ... |
| $2^x$ | Reserved | Reserved |

FIG. 29

Antenna port(s), transform precoder is disabled,

***dmrs-Type*=1, *maxLength*=1, enhanced ports, rank = 3**

| Value | Number of DMRS CDM group(s) without data | DMRS port(s) |
|---|---|---|
| 0 | 2 | 0-2 |
| 1 | 2 | 0,2,3 |
| 2 | 2 | 1-3 |
| 3 | 3 | 0-2 |
| 4 | 3 | 3-5 |
| 5 | 4 | 0-2 |
| 6 | 4 | 3-4 |
| 7 | 4 | 2-4 |
| 8 | 4 | 5-7 |
| ... | Reserved | Reserved |

Antenna port(s), transform precoder is disabled,

***dmrs-Type*=1, *maxLength*=1, enhanced ports, rank = 4**

| Value | Number of DMRS CDM group(s) without data | DMRS port(s) |
|---|---|---|
| 0 | 2 | 0-3 |
| 1 | 3 | 0-3 |
| 2 | 3 | 2-5 |
| 3 | 3 | 0-1, 4-5 |
| 4 | 4 | 0-3 |
| 5 | 4 | 4-7 |
| 6 | 4 | 0-1, 4-5 |
| 7 | 4 | 2-3, 6-7 |
| ... | ... | ... |
| ... | Reserved | Reserved |

FIG. 30

Antenna port(s), transform precoder is disabled,

***dmrs-Type*=1, *maxLength*=2, enhanced ports, rank = 1**

| Value | Number of DMRS CDM group(s) without data | DMRS port(s) | Number of front-load symbols |
|---|---|---|---|
| 0 | 1 | i_1,1 | |
| 1 | 1 | i_1,2 | |
| 2 | 1 | i_1,3 | |
| 3 | 1 | i_1,4 | |
| 4 | 2 | i_1,1 | |
| 5 | 2 | i_1,2 | |
| 6 | 2 | i_1,3 | |
| 7 | 2 | i_1,4 | |
| 8 | 2 | i_2,1 | |
| 9 | 2 | i_2,2 | |
| 10 | 2 | i_2,3 | |
| 11 | 2 | i_2,4 | |
| 12 | 3 | i_1,1 | |
| 13 | 3 | i_1,2 | |
| 14 | 3 | i_1,3 | |
| 15 | 3 | i_1,4 | |
| 16 | 3 | i_2,1 | |
| 17 | 3 | i_2,2 | |
| 18 | 3 | i_2,3 | |
| 19 | 3 | i_2,4 | |
| 20 | 3 | i_3,1 | |
| 21 | 3 | i_3,2 | |
| 22 | 3 | i_3,3 | |
| 23 | 3 | i_3,4 | |
| 24 | 4 | i_1,1 | |
| 25 | 4 | i_1,2 | |
| 26 | 4 | i_1,3 | |
| 27 | 4 | i_1,4 | |
| 28 | 4 | i_2,1 | |
| 29 | 4 | i_2,2 | |
| 30 | 4 | i_2,3 | |
| 31 | 4 | i_2,4 | |
| 32 | 4 | i_3,1 | |
| 33 | 4 | i_3,2 | |
| 34 | 4 | i_3,3 | |
| ... | ... | ... | |
| ... | Reserved | Reserved | Reserved |

FIG. 31

Antenna port(s), transform precoder is disabled,

***dmrs-Type*=1, *maxLength*=2, enhanced ports, rank = 2**

| Value | Number of DMRS CDM group(s) without data | DMRS port(s) | Number of front-load symbols |
|---|---|---|---|
| 0 | 1 | i_1,1, i_1,2 | |
| 1 | 1 | i_1,3, i_1,4 | |
| 2 | 2 | i_1,1, i_1,2 | |
| 3 | 2 | i_1,3, i_1,4 | |
| 4 | 2 | i_2,1, i_2,2 | |
| 5 | 2 | i_2,3, i_2,4 | |
| 6 | 2 | i_1,1, i_2,1 | |
| 7 | 2 | i_1,3, i_2,3 | |
| 8 | 3 | i_1,1, i_1,2 | |
| 9 | 3 | i_1,3, i_1,4 | |
| 10 | 3 | i_2,1, i_2,2 | |
| 11 | 3 | i_2,3, i_2,4 | |
| 12 | 3 | i_3,1, i_3,2 | |
| 13 | 3 | i_3,3, i_3,4 | |
| 14 | 3 | i_1,1, i_2,1 | |
| 15 | 3 | i_1,1, i_3,1 | |
| 16 | 4 | i_1,1, i_1,2 | |
| 17 | 4 | i_1,3, i_1,4 | |
| 18 | 4 | i_2,1, i_2,2 | |
| 19 | 4 | i_2,3, i_2,4 | |
| 20 | 4 | i_3,1, i_3,2 | |
| 21 | 4 | i_3,3, i_3,4 | |
| 22 | 4 | i_4,1, i_4,2 | |
| 23 | 4 | i_4,3, i_4,4 | |
| 24 | 4 | i_1,1, i_2,1 | |
| 25 | 4 | i_1,1, i_3,1 | |
| 26 | 4 | i_1,1, i_4,1 | |
| ... | ... | ... | |
| ... | Reserved | Reserved | Reserved |

FIG. 32

Antenna port(s), transform precoder is disabled,
***dmrs-Type*=1, *maxLength*=2, enhanced ports, rank = 3**

| Value | Number of DMRS CDM group(s) without data | DMRS port(s) | Number of front-load symbols |
|---|---|---|---|
| 0 | 1 | i_1,1, i_1,2, i_1,3 | |
| 1 | 2 | i_1,1, i_1,2, i_1,3 | |
| 2 | 2 | i_2,1, i_2,2, i_2,3 | |
| 3 | 2 | i_1,1, i_1,2, i_2,1 | |
| 4 | 2 | i_1,1, i_2,1, i_2,2 | |
| 5 | 3 | i_1,1, i_1,2, i_1,3 | |
| 6 | 3 | i_2,1, i_2,2, i_2,3 | |
| 7 | 3 | i_3,1, i_3,2, i_3,3 | |
| 8 | 4 | i_1,1, i_1,2, i_1,3 | |
| 9 | 4 | i_2,1, i_2,2, i_2,3 | |
| 10 | 4 | i_3,1, i_3,2, i_3,3 | |
| 11 | 4 | i_4,1, i_4,2, i_4,3 | |
| ... | ... | ... | |
| ... | Reserved | Reserved | Reserved |

Antenna port(s), transform precoder is disabled,
***dmrs-Type*=1, *maxLength*=2, enhanced ports, rank = 4**

| Value | Number of DMRS CDM group(s) without data | DMRS port(s) | Number of front-load symbols |
|---|---|---|---|
| 0 | 1 | i_1,1, i_1,2, i_1,3, i_1,4 | |
| 1 | 2 | i_1,1, i_1,2, i_1,3, i_1,4 | |
| 2 | 2 | i_2,1, i_2,2, i_2,3, i_2,4 | |
| 3 | 2 | i_1,1, i_1,2, i_2,1, i_2,2 | |
| 4 | 2 | i_1,3, i_1,4, i_2,3, i_2,4 | |
| 5 | 3 | i_1,1, i_1,2, i_1,3, i_1,4 | |
| 6 | 3 | i_2,1, i_2,2, i_2,3, i_2,4 | |
| 7 | 3 | i_3,1, i_3,2, i_3,3, i_3,4 | |
| 8 | 3 | i_1,1, i_1,2, i_2,1, i_2,2 | |
| 9 | 3 | i_1,3, i_1,4, i_2,3, i_2,4 | |
| 10 | 3 | i_2,1, i_2,2, i_3,1, i_3,2 | |
| 11 | 3 | i_2,3, i_2,4, i_3,3, i_3,4 | |
| 12 | 4 | i_1,1, i_1,2, i_1,3, i_1,4 | |
| 13 | 4 | i_2,1, i_2,2, i_2,3, i_2,4 | |
| 14 | 4 | i_3,1, i_3,2, i_3,3, i_3,4 | |
| 15 | 4 | i_4,1, i_4,2, i_4,3, i_4,4 | |
| ... | ... | ... | |
| ... | Reserved | Reserved | Reserved |

FIG. 33

Antenna port(s), transform precoder is disabled,

***dmrs-Type*=1, *maxLength*=2, enhanced ports, rank = 3**

| Value | Number of DMRS CDM group(s) without data | DMRS port(s) | Number of front-load symbols |
|---|---|---|---|
| 0 | 1 | i_1,1, i_1,2, i_1,3 | 1 |
| 1 | 2 | i_1,1, i_1,2, i_1,3 | 1 |
| 2 | 2 | i_2,1, i_2,2, i_2,3 | 1 |
| 3 | 2 | i_1,1, i_1,2, i_2,1 | 1 |
| 4 | 2 | i_1,1, i_2,1, i_2,2 | 1 |
| 5 | 2 | i_1,1, i_1,2, i_1,3 | 2 |
| 6 | 2 | i_2,1, i_2,2, i_2,3 | 2 |
| 7 | 2 | i_1,1, i_1,2, i_2,1 | 2 |
| 8 | 2 | i_1,1, i_2,1, i_2,2 | 2 |
| | 3 | i_1,1, i_1,2, i_1,3 | |
| | 3 | i_2,1, i_2,2, i_2,3 | |
| | 3 | i_3,1, i_3,2, i_3,3 | |
| | 4 | i_1,1, i_1,2, i_1,3 | |
| | 4 | i_1,1, i_1,2, i_1,3 | |
| | 4 | i_2,1, i_2,2, i_2,3 | |
| | 4 | i_3,1, i_3,2, i_3,3 | |
| | 4 | i_4,1, i_4,2, i_4,3 | |
| ... | ... | ... | |
| ... | Reserved | Reserved | Reserved |

FIG. 34

Antenna port(s), transform precoder is disabled,

***dmrs-Type*=2, *maxLength*=1, enhanced ports, rank=1**

| Value | Number of DMRS CDM group(s) without data | DMRS port(s) |
|---|---|---|
| 0 | 1 | i_1,1 |
| 1 | 1 | i_1,2 |
| 2 | 2 | i_1,1 |
| 3 | 2 | i_1,2 |
| 4 | 2 | i_2,1 |
| 5 | 2 | i_2,2 |
| 6 | 3 | i_1,1 |
| 7 | 3 | i_1,2 |
| 8 | 3 | i_2,1 |
| 9 | 3 | i_2,2 |
| 10 | 3 | i_3,1 |
| 11 | 3 | i_3,2 |
| 12 | 4 | i_1,1 |
| 13 | 4 | i_1,2 |
| 14 | 4 | i_2,1 |
| 15 | 4 | i_2,2 |
| 16 | 4 | i_3,1 |
| 17 | 4 | i_3,2 |
| 18 | 4 | i_4,1 |
| 19 | 4 | i_4,2 |
| 20 | 5 | i_1,1 |
| 21 | 5 | i_1,2 |
| 22 | 5 | i_2,1 |
| 23 | 5 | i_2,2 |
| 24 | 5 | i_3,1 |
| 25 | 5 | i_3,2 |
| 26 | 5 | i_4,1 |
| 27 | 5 | i_4,2 |
| 28 | 5 | i_5,1 |
| 29 | 5 | i_5,2 |
| 30 | 6 | i_1,1 |
| ... | ... | ... |
| ... | Reserved | Reserved |

FIG. 35

Antenna port(s), transform precoder is disabled,
***dmrs-Type*=2, *maxLength*=1, enhanced ports, rank=2**

| Value | Number of DMRS CDM group(s) without data | DMRS port(s) |
|---|---|---|
| 0 | 1 | i_1,1, i_1,2 |
| 1 | 2 | i_1,1, i_1,2 |
| 2 | 2 | i_2,1, i_2,2 |
| 3 | 2 | i_1,1, i_2,2 |
| 4 | 2 | i_1,2, i_2,2 |
| 5 | 3 | i_1,1, i_1,2 |
| 6 | 3 | i_2,1, i_2,2 |
| 7 | 3 | i_3,1, i_3,2 |
| 8 | 3 | i_1,1, i_2,2 |
| 9 | 3 | i_1,1, i_3,1 |
| 10 | 4 | i_1,1, i_1,2 |
| 11 | 4 | i_2,1, i_2,2 |
| 12 | 4 | i_3,1, i_3,2 |
| 13 | 4 | i_4,1, i_4,2 |
| 14 | 4 | i_1,1, i_2,1 |
| 15 | 4 | i_1,1, i_3,1 |
| 16 | 4 | i_1,1, i_4,1 |
| 17 | 5 | i_1,1, i_1,2 |
| 18 | 5 | i_2,1, i_2,2 |
| 19 | 5 | i_3,1, i_3,2 |
| 20 | 5 | i_4,1, i_4,2 |
| 21 | 5 | i_5,1, i_5,1 |
| 22 | 5 | i_1,1, i_2,1 |
| 23 | 5 | i_1,1, i_3,1 |
| 24 | 5 | i_1,1, i_4,1 |
| 25 | 5 | i_1,1, i_5,1 |
| 26 | 6 | i_1,1, i_1,2 |
| ... | ... | ... |
| ... | Reserved | Reserved |

FIG. 36

Antenna port(s), transform precoder is disabled,

***dmrs-Type*=2, *maxLength*=1, enhanced ports, rank =3**

| Value | Number of DMRS CDM group(s) without data | DMRS port(s) |
|---|---|---|
| 0 | 2 | i_1,1, i_1,2, i_2,1 |
| 1 | 2 | i_1,1, i_2,1, i_2,2 |
| 2 | 3 | i_1,1, i_1,2, i_2,1 |
| 3 | 3 | i_2,2, i_3,1, i_3,2 |
| 4 | 4 | i_1,1, i_1,2, i_2,1 |
| 5 | 4 | i_2,2, i_3,1, i_3,2 |
| 6 | 4 | i_2,1, i_2,2, i_3,1 |
| 7 | 4 | i_3,2, i_4,1, i_4,2 |
| 8 | 4 | i_1,1, i_1,2, i_2,1 |
| 9 | 5 | i_2,2, i_3,1, i_3,2 |
| 10 | 5 | i_4,1, i_4,2, i_5,1 |
| 11 | 6 | i_1,1, i_1,2, i_2,1 |
| 12 | 6 | i_2,2, i_3,1, i_3,2 |
| 13 | 6 | i_4,1, i_4,2, i_5,1 |
| 14 | 6 | i_5,2, i_6,1, i_6,2 |
| ... | ... | ... |
| ... | Reserved | Reserved |

Antenna port(s), transform precoder is disabled,

***dmrs-Type*=2, *maxLength*=1, enhanced ports, rank =4**

| Value | Number of DMRS CDM group(s) without data | DMRS port(s) |
|---|---|---|
| 0 | 2 | i_1,1, i_1,2, i_2,1, i_2,2 |
| 1 | 3 | i_1,1, i_1,2, i_2,1, i_2,2 |
| 2 | 3 | i_2,1, i_2,2, i_3,1, i_3,2 |
| 3 | 4 | i_1,1, i_1,2, i_3,1, i_3,2 |
| 4 | 4 | i_3,1, i_3,2, i_4,1, i_4,2 |
| 5 | 4 | i_2,1, i_2,2, i_3,1, i_3,2 |
| 6 | 5 | i_1,1, i_1,2, i_2,1, i_2,2 |
| 7 | 5 | i_3,1, i_3,2, i_4,1, i_4,2 |
| 8 | 5 | i_2,1, i_2,2, i_3,1, i_3,2 |
| 9 | 5 | i_2,1, i_2,2, i_3,1, i_3,2 |
| 10 | 5 | i_4,1, i_4,2, i_5,1, i_5,2 |
| 11 | 6 | i_1,1, i_1,2, i_2,1, i_2,2 |
| 12 | 6 | i_3,1, i_3,2, i_4,1, i_4,2 |
| 13 | 6 | i_5,1, i_5,2, i_6,1, i_6,2 |
| ... | ... | ... |
| ... | Reserved | Reserved |

FIG. 37

Antenna port(s), transform precoder is disabled,

***dmrs-Type*=2, *maxLength*=2, enhanced ports, rank = 1**

| Value | Number of DMRS CDM group(s) without data | DMRS port(s) | Number of front-load symbols |
|---|---|---|---|
| 0 | 1 | i_1,1 | |
| 1 | 1 | i_1,2 | |
| 2 | 1 | i_1,3 | |
| 3 | 1 | i_1,4 | |
| 4 | 2 | i_1,1 | |
| 5 | 2 | i_1,2 | |
| 6 | 2 | i_1,3 | |
| 7 | 2 | i_1,4 | |
| 8 | 2 | i_2,1 | |
| 9 | 2 | i_2,2 | |
| 10 | 2 | i_2,3 | |
| 11 | 2 | i_2,4 | |
| 12 | 3 | i_1,1 | |
| 13 | 3 | i_1,2 | |
| 14 | 3 | i_1,3 | |
| 15 | 3 | i_1,4 | |
| 16 | 3 | i_2,1 | |
| 17 | 3 | i_2,2 | |
| 18 | 3 | i_2,3 | |
| 19 | 3 | i_2,4 | |
| 20 | 3 | i_3,1 | |
| 21 | 3 | i_3,2 | |
| 22 | 3 | i_3,3 | |
| 23 | 3 | i_3,4 | |
| 24 | 4 | i_1,1 | |
| ... | ... | ... | |
| 40 | 5 | i_1,1 | |
| ... | ... | ... | |
| 60 | 6 | i_1,1 | |
| ... | ... | ... | |
| ... | Reserved | Reserved | Reserved |

FIG. 38

Antenna port(s), transform precoder is disabled,

***dmrs-Type*=2, *maxLength*=2, enhanced ports, rank = 2**

| Value | Number of DMRS CDM group(s) without data | DMRS port(s) | Number of front-load symbols |
|---|---|---|---|
| 0 | 1 | i_1,1, i_1,2 | |
| 1 | 1 | i_1,3, i_1,4 | |
| 2 | 2 | i_1,1, i_1,2 | |
| 3 | 2 | i_1,3, i_1,4 | |
| 4 | 2 | i_2,1, i_2,2 | |
| 5 | 2 | i_2,3, i_2,4 | |
| 6 | 2 | i_1,1, i_2,1 | |
| 7 | 2 | i_1,3, i_2,3 | |
| 8 | 3 | i_1,1, i_1,2 | |
| 9 | 3 | i_1,3, i_1,4 | |
| 10 | 3 | i_2,1, i_2,2 | |
| 11 | 3 | i_2,3, i_2,4 | |
| 12 | 3 | i_3,1, i_3,2 | |
| 13 | 3 | i_3,3, i_3,4 | |
| 14 | 3 | i_1,1, i_2,1 | |
| 15 | 3 | i_1,1, i_3,1 | |
| 16 | 4 | i_1,1, i_1,2 | |
| 17 | 4 | i_1,3, i_1,4 | |
| 18 | 4 | i_2,1, i_2,2 | |
| 19 | 4 | i_2,3, i_2,4 | |
| 20 | 4 | i_3,1, i_3,2 | |
| 21 | 4 | i_3,3, i_3,4 | |
| 22 | 4 | i_4,1, i_4,2 | |
| 23 | 4 | i_4,3, i_4,4 | |
| 24 | 4 | i_1,1, i_2,1 | |
| 25 | 4 | i_1,1, i_3,1 | |
| 26 | 4 | i_1,1, i_4,1 | |
| 27 | 5 | i_1,1, i_1,2 | |
| ... | ... | ... | |
| 41 | 6 | i_1,1, i_1,2 | |
| ... | ... | ... | |
| ... | Reserved | Reserved | Reserved |

FIG. 39

Antenna port(s), transform precoder is disabled,

***dmrs-Type*=2, *maxLength*=2, enhanced ports, rank = 3**

| Value | Number of DMRS CDM group(s) without data | DMRS port(s) | Number of front-load symbols |
|---|---|---|---|
| 0 | 1 | i_1,1, i_1,2, i_1,3 | |
| 1 | 2 | i_1,1, i_1,2, i_1,3 | |
| 2 | 2 | i_2,1, i_2,2, i_2,3 | |
| 3 | 2 | i_1,1, i_1,2, i_2,1 | |
| 4 | 2 | i_1,1, i_2,1, i_2,2 | |
| 5 | 3 | i_1,1, i_1,2, i_1,3 | |
| 6 | 3 | i_2,1, i_2,2, i_2,3 | |
| 7 | 3 | i_3,1, i_3,2, i_3,3 | |
| 8 | 4 | i_1,1, i_1,2, i_1,3 | |
| 9 | 4 | i_2,1, i_2,2, i_2,3 | |
| 10 | 4 | i_3,1, i_3,2, i_3,3 | |
| 11 | 4 | i_4,1, i_4,2, i_4,3 | |
| 12 | 5 | i_1,1, i_1,2, i_1,3 | |
| 13 | 5 | i_2,1, i_2,2, i_2,3 | |
| 14 | 5 | i_3,1, i_3,2, i_3,3 | |
| 15 | 5 | i_4,1, i_4,2, i_4,3 | |
| 16 | 5 | i_5,1, i_5,2, i_5,3 | |
| 17 | 6 | i_1,1, i_1,2, i_1,3 | |
| 18 | 6 | i_2,1, i_2,2, i_2,3 | |
| 19 | 6 | i_3,1, i_3,2, i_3,3 | |
| 20 | 6 | i_4,1, i_4,2, i_4,3 | |
| 21 | 6 | i_5,1, i_5,2, i_5,3 | |
| 22 | 6 | i_6,1, i_6,2, i_6,3 | |
| ... | ... | ... | |
| ... | Reserved | Reserved | Reserved |

FIG. 40

Antenna port(s), transform precoder is disabled,

*dmrs-Type*=2, *maxLength*=2, enhanced ports, rank = 4

| Value | Number of DMRS CDM group(s) without data | DMRS port(s) | Number of front-load symbols |
|---|---|---|---|
| 0 | 1 | i_1,1, i_1,2, i_1,3, i_1,4 | |
| 1 | 2 | i_1,1, i_1,2, i_1,3, i_1,4 | |
| 2 | 2 | i_2,1, i_2,2, i_2,3, i_2,4 | |
| 3 | 2 | i_1,1, i_1,2, i_2,1, i_2,2 | |
| 4 | 2 | i_1,3, i_1,4, i_2,3, i_2,4 | |
| 5 | 3 | i_1,1, i_1,2, i_1,3, i_1,4 | |
| 6 | 3 | i_2,1, i_2,2, i_2,3, i_2,4 | |
| 7 | 3 | i_3,1, i_3,2, i_3,3, i_3,4 | |
| 8 | 4 | i_1,1, i_1,2, i_1,3, i_1,4 | |
| 9 | 4 | i_2,1, i_2,2, i_2,3, i_2,4 | |
| 10 | 4 | i_3,1, i_3,2, i_3,3, i_3,4 | |
| 11 | 4 | i_4,1, i_4,2, i_4,3, i_4,4 | |
| 12 | 5 | i_1,1, i_1,2, i_1,3, i_1,4 | |
| 13 | 5 | i_2,1, i_2,2, i_2,3, i_2,4 | |
| 14 | 5 | i_3,1, i_3,2, i_3,3, i_3,4 | |
| 15 | 5 | i_4,1, i_4,2, i_4,3, i_4,4 | |
| 16 | 5 | i_5,1, i_5,2, i_5,3, i_5,4 | |
| 17 | 6 | i_1,1, i_1,2, i_1,3, i_1,4 | |
| 18 | 6 | i_2,1, i_2,2, i_2,3, i_2,4 | |
| 19 | 5 | i_3,1, i_3,2, i_3,3, i_3,4 | |
| 20 | 5 | i_4,1, i_4,2, i_4,3, i_4,4 | |
| 21 | 5 | i_5,1, i_5,2, i_5,3, i_5,4 | |
| 22 | 6 | i_6,1, i_6,2, i_6,3, i_6,4 | |
| ... | ... | ... | |
| ... | Reserved | Reserved | Reserved |

FIG. 41

**Antenna port(s) (1000 + DMRS port), *dmrs-Type*=1, *maxLength*=1**

| One Codeword: Codeword 0 enabled, Codeword 1 disabled | | |
|---|---|---|
| **Value** | **Number of DMRS CDM group(s) without data** | **DMRS port(s)** |
| 0 | 1 | 0 |
| 1 | 1 | 1 |
| 2 | 1 | 0,1 |
| 3 | 2 | 0 |
| 4 | 2 | 1 |
| 5 | 2 | 2 |
| 6 | 2 | 3 |
| 7 | 2 | 0,1 |
| 8 | 2 | 2,3 |
| 9 | 2 | 0-2 |
| 10 | 2 | 0-3 |
| 11 | 2 | 0,2 |
| 12-15 | Reserved | Reserved |

FIG. 42

Antenna port(s) (1000 + DMRS port), *dmrs-Type*=1, *maxLength*=2

| One Codeword: Codeword 0 enabled, Codeword 1 disabled | | | | Two Codewords: Codeword 0 enabled, Codeword 1 enabled | | | |
|---|---|---|---|---|---|---|---|
| Value | Number of DMRS CDM group (s) without data | DMRS port(s) | Number of front-load symbol s | Value | Number of DMRS CDM group (s) without data | DMRS port(s) | Number of front-load symbol s |
| 0 | 1 | 0 | 1 | 0 | 2 | 0-4 | 2 |
| 1 | 1 | 1 | 1 | 1 | 2 | 0,1,2,3, 4,6 | 2 |
| 2 | 1 | 0,1 | 1 | 2 | 2 | 0,1,2,3, 4,5,6 | 2 |
| 3 | 2 | 0 | 1 | 3 | 2 | 0,1,2,3, 4,5,6,7 | 2 |
| 4 | 2 | 1 | 1 | 4-31 | reserved | reserve d | reserve d |
| 5 | 2 | 2 | 1 | | | | |
| 6 | 2 | 3 | 1 | | | | |
| 7 | 2 | 0,1 | 1 | | | | |
| 8 | 2 | 2,3 | 1 | | | | |
| 9 | 2 | 0-2 | 1 | | | | |
| 10 | 2 | 0-3 | 1 | | | | |
| 11 | 2 | 0,2 | 1 | | | | |
| 12 | 2 | 0 | 2 | | | | |
| 13 | 2 | 1 | 2 | | | | |
| 14 | 2 | 2 | 2 | | | | |
| 15 | 2 | 3 | 2 | | | | |
| 16 | 2 | 4 | 2 | | | | |
| 17 | 2 | 5 | 2 | | | | |
| 18 | 2 | 6 | 2 | | | | |
| 19 | 2 | 7 | 2 | | | | |
| 20 | 2 | 0,1 | 2 | | | | |
| 21 | 2 | 2,3 | 2 | | | | |
| 22 | 2 | 4,5 | 2 | | | | |
| 23 | 2 | 6,7 | 2 | | | | |
| 24 | 2 | 0,4 | 2 | | | | |
| 25 | 2 | 2,6 | 2 | | | | |
| 26 | 2 | 0,1,4 | 2 | | | | |
| 27 | 2 | 2,3,6 | 2 | | | | |
| 28 | 2 | 0,1,4,5 | 2 | | | | |
| 29 | 2 | 2,3,6,7 | 2 | | | | |
| 30 | 2 | 0,2,4,6 | 2 | | | | |
| 31 | Reserved | Reserved | Reserve d | | | | |

FIG. 43

Antenna port(s) (1000 + DMRS port), *dmrs-Type*=2, *maxLength*=1

| One codeword: Codeword 0 enabled, Codeword 1 disabled | | | Two codewords: Codeword 0 enabled, Codeword 1 enabled | | |
|---|---|---|---|---|---|
| Value | Number of DMRS CDM group(s) without data | DMRS port(s) | Value | Number of DMRS CDM group(s) without data | DMRS port(s) |
| 0 | 1 | 0 | 0 | 3 | 0-4 |
| 1 | 1 | 1 | 1 | 3 | 0-5 |
| 2 | 1 | 0,1 | 2-31 | reserved | reserved |
| 3 | 2 | 0 | | | |
| 4 | 2 | 1 | | | |
| 5 | 2 | 2 | | | |
| 6 | 2 | 3 | | | |
| 7 | 2 | 0,1 | | | |
| 8 | 2 | 2,3 | | | |
| 9 | 2 | 0-2 | | | |
| 10 | 2 | 0-3 | | | |
| 11 | 3 | 0 | | | |
| 12 | 3 | 1 | | | |
| 13 | 3 | 2 | | | |
| 14 | 3 | 3 | | | |
| 15 | 3 | 4 | | | |
| 16 | 3 | 5 | | | |
| 17 | 3 | 0,1 | | | |
| 18 | 3 | 2,3 | | | |
| 19 | 3 | 4,5 | | | |
| 20 | 3 | 0-2 | | | |
| 21 | 3 | 3-5 | | | |
| 22 | 3 | 0-3 | | | |
| 23 | 2 | 0,2 | | | |
| 24-31 | Reserved | Reserved | | | |

FIG. 44

| One codeword: Codeword 0 enabled, Codeword 1 disabled | | | | Two Codewords: Codeword 0 enabled, Codeword 1 enabled | | | |
|---|---|---|---|---|---|---|---|
| Value | Number of DMRS CDM group (s) without data | DMRS port(s) | Number of front-load symbol s | Value | Number of DMRS CDM group (s) without data | DMRS port(s) | Number of front-load symbol s |
| 0 | 1 | 0 | 1 | 0 | 3 | 0-4 | 1 |
| 1 | 1 | 1 | 1 | 1 | 3 | 0-5 | 1 |
| 2 | 1 | 0,1 | 1 | 2 | 2 | 0,1,2,3, 6 | 2 |
| 3 | 2 | 0 | 1 | 3 | 2 | 0,1,2,3, 6,8 | 2 |
| 4 | 2 | 1 | 1 | 4 | 2 | 0,1,2,3, 6,7,8 | 2 |
| 5 | 2 | 2 | 1 | 5 | 2 | 0,1,2,3, 6,7,8,9 | 2 |
| 6 | 2 | 3 | 1 | 6-63 | Reserve d | Reserve d | Reserve d |
| 7 | 2 | 0,1 | 1 | | | | |
| 8 | 2 | 2,3 | 1 | | | | |
| 9 | 2 | 0-2 | 1 | | | | |
| 10 | 2 | 0-3 | 1 | | | | |
| 11 | 3 | 0 | 1 | | | | |
| ... | ... | ... | ... | | | | |
| 16 | 3 | 5 | 1 | | | | |
| 17 | 3 | 0,1 | 1 | | | | |
| ... | ... | ... | ... | | | | |
| 20 | 3 | 0-2 | 1 | | | | |
| 21 | 3 | 3-5 | 1 | | | | |
| 22 | 3 | 0-3 | 1 | | | | |
| 23 | 2 | 0,2 | 1 | | | | |
| 24 | 3 | 0 | 2 | | | | |
| ... | ... | ... | ... | | | | |
| 35 | 3 | 11 | 2 | | | | |
| 36 | 3 | 0,1 | 2 | | | | |
| ... | ... | ... | ... | | | | |
| 41 | 3 | 10,11 | 2 | | | | |
| 42 | 3 | 0,1,6 | 2 | | | | |
| 43 | 3 | 2,3,8 | 2 | | | | |
| 44 | 3 | 4,5,10 | 2 | | | | |
| 45 | 3 | 0,1,6,7 | 2 | | | | |
| 46 | 3 | 2,3,8,9 | 2 | | | | |
| 47 | 3 | 4,5,10,11 | 2 | | | | |
| 48 | 1 | 0 | 2 | | | | |
| ... | ... | ... | ... | | | | |
| 58-63 | Reserved | Reserved | Reserve d | | | | |

FIG. 45

Antenna port(s) (1000 + DMRS port),

***dmrs-Type*=1, *maxLength*=1, enhanced ports**

| One Codeword: Codeword 0 enabled, Codeword 1 disabled | | |
|---|---|---|
| **Value** | **Number of DMRS CDM group(s) without data** | **DMRS port(s)** |
| 0 | 1 | i_1,1 |
| 1 | 1 | i_1,2 |
| 2 | 1 | i_1,1, i_1,2 |
| 3 | 2 | i_1,1 |
| 4 | 2 | i_1,2 |
| 5 | 2 | i_2,1 |
| 6 | 2 | i_2,2 |
| 7 | 2 | i_1,1, i_1,2 |
| 8 | 2 | i_2,1, i_2,2 |
| 9 | 2 | i_1,1, i_2,1 |
| 10 | 2 | i_1,2, i_2,2 |
| 11 | 2 | i_1,1, i_1,2, i_2,1 |
| 12 | 2 | i_1,1, i_2,1, i_2,2 |
| 13 | 2 | i_1,1, i_1,2, i_2,1, i_2,2 |
| 14 | 3 | i_1,1 |
| 15 | 3 | i_1,2 |
| 16 | 3 | i_2,1 |
| 17 | 3 | i_2,2 |
| 18 | 3 | i_3,1 |
| 19 | 3 | i_3,2 |
| 20 | 3 | i_1,1, i_1,2 |
| 21 | 3 | i_2,1, i_2,2 |
| 22 | 3 | i_3,1, i_3,2 |
| 23 | 3 | i_1,1, i_2,1 |
| 24 | 3 | i_1,2, i_2,2 |
| 25 | 3 | i_2,1, i_3,1 |
| 26 | 3 | i_2,2, i_3,2 |
| 27 | 3 | i_1,1, i_1,2, i_2,1 |
| 28 | 3 | i_2,2, i_3,1, i_3,2 |
| 29 | 4 | i_1,1 |
| ... | ... | |
| ... | Reserved | Reserved |

FIG. 46

| One Codeword: Codeword 0 enabled, Codeword 1 disabled | | | | Two Codewords: Codeword 0 enabled, Codeword 1 enabled | | | |
|---|---|---|---|---|---|---|---|
| Value | Number of DMRS CDM group (s) without data | DMRS port(s) | Number of front-load symbols | Value | Number of DMRS CDM group (s) without data | DMRS port(s) | Number of front-load symbols |
| 0 | 1 | i_1,1 | | 0 | 2 | i_1,1, i_1,2, i_1,3, i_1,4, i_2,1 | |
| 1 | 1 | i_1,2 | | 1 | 2 | i_1,1, i_1,2, i_1,3, i_1,4, i_2,1, i_2,2 | |
| 2 | 1 | i_1,3 | | | 2 | i_1,1, i_1,2, i_1,3, i_1,4, i_2,1, i_2,2, i_2,3 | |
| 3 | 1 | i_1,4 | | | 2 | i_1,1, i_1,2, i_1,3, i_1,4, i_2,1, i_2,2, i_2,3, i_2,4 | |
| 4 | 1 | i_1,1, i_1,2 | | | 3 | i_1,1, i_1,2, i_1,3, i_1,4, i_2,1 | |
| 5 | 1 | i_1,1, i_1,2, i_1,3 | | | 3 | i_2,1, i_2,2, i_2,3, i_2,4, i_3,1 | |
| 6 | 1 | i_1,1, i_1,2, i_1,3, i_1,4 | | | 3 | i_1,1, i_1,2, i_1,3, i_1,4, i_2,1, i_2,2 | |

FIG. 47

| | | | | | | | |
|---|---|---|---|---|---|---|---|
| 7 | 2 | i_1,1 | | | 3 | i_2,1, i_2,2, i_2,3, i_2,4, i_3,1, i_3,2 | |
| 8 | 2 | i_1,2 | | | 3 | i_1,1, i_1,2, i_1,3, i_1,4, i_2,1, i_2,2, i_2,3 | |
| 9 | 2 | i_1,3 | | | 3 | i_2,1, i_2,2, i_2,3, i_2,4, i_3,1, i_3,2, i_3,3 | |
| 10 | 2 | i_1,4 | | | 3 | i_1,1, i_1,2, i_1,3, i_1,4, i_2,1, i_2,2, i_2,3, i_2,4 | |
| 11 | 2 | i_2,1 | | | 3 | i_2,1, i_2,2, i_2,3, i_2,4, i_3,1, i_3,2, i_3,3, i_3,4 | |
| 12 | 2 | i_2,2 | | | 4 | i_1,1, i_1,2, i_1,3, i_1,4, i_2,1 | |
| 13 | 2 | i_2,3 | | | 4 | i_3,1, i_3,2, i_3,3, i_3,4, i_4,1 | |
| 14 | 2 | i_2,4 | | | 4 | i_1,1, i_1,2, i_1,3, i_1,4, i_2,1, i_2,2 | |
| 15 | 2 | i_1,1, i_1,2 | | | 4 | i_3,1, i_3,2, i_3,3, i_3,4, i_4,1, i_4,2 | |
| 16 | 2 | i_1,3, i_1,4 | | | 4 | i_1,1, i_1,2, i_1,3, i_1,4, i_2,1, i_2,2, i_2,3 | |
| 17 | 2 | i_2,1, i_2,2 | | | 4 | i_3,1, i_3,2, i_3,3, i_3,4, i_4,1, i_4,2, i_4,3 | |
| 18 | 2 | i_2,3, i_2,4 | | | 4 | i_1,1, i_1,2, i_1,3, i_1,4, i_2,1, i_2,2, i_2,3, i_2,4 | |
| 19 | 2 | i_1,1, i_2,1 | | | 4 | i_3,1, i_3,2, i_3,3, i_3,4, i_4,1, i_4,2, i_4,3, i_4,4 | |
| 20 | 2 | i_1,1, i_1,2, i_1,3 | | | | | |
| 21 | 2 | i_2,1, i_2,2, i_2,3 | | | | | |
| 22 | 2 | i_1,1, i_1,2, i_1,3, i_1,4, | | | | | |
| 23 | 2 | i_2,1, i_2,2, i_2,3, i_2,4, | | | | | |
| 24 | 3 | i_1,1 | | | | | |
| 25 | 3 | i_1,2 | | | | | |
| 26 | 3 | i_1,3 | | | | | |
| 27 | 3 | i_1,4 | | | | | |
| 28 | 3 | i_2,1 | | | | | |
| 29 | 3 | i_2,2 | | 2 | 2 | | |
| 30 | 3 | i_2,3 | | 3 | 2 | | |
| 31 | 3 | i_2,4 | | 4-31 | R | Reserved | R |
| 32 | 3 | i_3,1 | | | | | |
| 33 | 3 | i_3,2 | | | | | |
| 34 | 3 | i_3,3 | | | | | |
| 35 | 3 | i_3,4 | | | | | |
| 36 | 3 | i_1,1, i_1,2 | | | | | |
| 37 | 3 | i_1,3, i_1,4 | | | | | |
| 38 | 3 | i_2,1, i_2,2 | | | | | |
| 39 | 3 | i_2,3, i_2,4 | | | | | |
| 40 | 3 | i_3,1, i_3,2 | | | | | |
| 41 | 3 | i_3,3, i_3,4 | | | | | |

FIG. 48

| | | | | | | | |
|---|---|---|---|---|---|---|---|
| 42 | 3 | i_1,1, i_1,2, i_1,3 | | | | | |
| 43 | 3 | i_2,1, i_2,2, i_2,3 | | | | | |
| 44 | 3 | i_3,1, i_3,2, i_3,3 | | | | | |
| 45 | 3 | i_1,1, i_1,2, i_1,3, i_1,4 | | | | | |
| 46 | 3 | i_2,1, i_2,2, i_2,3, i_2,4 | | | | | |
| 47 | 3 | i_3,1, i_3,2, i_3,3, i_3,4 | | | | | |
| 48 | 4 | i_1,1 | | | | | |
| 49 | 4 | i_1,2 | | | | | |
| 50 | 4 | i_1,3 | | | | | |
| 51 | 4 | i_1,4 | | | | | |
| 52 | 4 | i_2,1 | | | | | |
| 53 | 4 | i_2,2 | | | | | |
| 54 | 4 | i_2,3 | | | | | |
| | 4 | i_2,4 | | | | | |
| | 4 | i_3,1 | | | | | |
| | 4 | i_3,2 | | | | | |
| | 4 | i_3,3 | | | | | |
| | 4 | i_3,4 | | | | | |
| | 4 | i_3,1 | | | | | |
| | 4 | i_3,2 | | | | | |
| | 4 | i_3,3 | | | | | |
| | 4 | i_3,4 | | | | | |
| | 4 | i_1,1, i_1,2 | | | | | |
| | 4 | i_1,3, i_1,4 | | | | | |
| | 4 | i_2,1, i_2,2 | | | | | |
| | 4 | i_2,3, i_2,4 | | | | | |
| | 4 | i_3,1, i_3,2 | | | | | |
| | 4 | i_3,3, i_3,4 | | | | | |
| | 4 | i_4,1, i_4,2 | | | | | |
| | 4 | i_4,3, i_4,4 | | | | | |
| | 4 | i_1,1, i_1,2, i_1,3 | | | | | |
| | 4 | i_2,1, i_2,2, i_2,3 | | | | | |
| | 4 | i_3,1, i_3,2, i_3,3 | | | | | |
| | 4 | i_4,1, i_4,2, i_4,3 | | | | | |
| | 4 | i_1,1, i_1,2, i_1,3, i_1,4 | | | | | |
| | 4 | i_2,1, i_2,2, i_2,3, i_2,4 | | | | | |
| | 4 | i_3,1, i_3,2, i_3,3, i_3,4 | | | | | |
| ... | ... | ... | | | | | |
| | R | Reserved | R | | | | |

FIG. 49

Case 1 group-sub-set#1

| *p* | CDM group λ |
|---|---|
| 1000 | 0 |
| 1001 | 0 |
| 1002 | 1 |
| 1003 | 1 |

group-sub-set#2

| *p* | CDM group λ |
|---|---|
| 1000 | 0 |
| 1001 | 0 |
| 1002 | 1 |
| 1003 | 1 |

j

→

(Actual Mapping)

| *p* | CDM group λ |
|---|---|
| 1004 | 0 |
| 1005 | 0 |
| 1006 | 1 |
| 1007 | 1 |

j+P

FIG. 50

Case 2 group-sub-set#1

| *p* | CDM group λ |
|---|---|
| 1000 | 0 |
| 1001 | 0 |
| 1002 | 1 |
| 1003 | 1 |
| 1004 | 0 |
| 1005 | 0 |
| 1006 | 1 |
| 1007 | 1 |

group-sub-set#2

| *p* | CDM group λ |
|---|---|
| 1000 | 0 |
| 1001 | 0 |
| 1002 | 1 |
| 1003 | 1 |
| 1004 | 0 |
| 1005 | 0 |
| 1006 | 1 |
| 1007 | 1 |

j

→

(Actual Mapping)

| *p* | CDM group λ |
|---|---|
| 1008 | 0 |
| 1009 | 0 |
| 1010 | 1 |
| 1011 | 1 |
| 1012 | 0 |
| 1013 | 0 |
| 1014 | 1 |
| 1015 | 1 |

j+P

FIG. 51

Case 3 group-sub-set#1

| *p* | CDM group λ |
|---|---|
| 1000 | 0 |
| 1001 | 0 |
| 1002 | 1 |
| 1003 | 1 |
| 1004 | 2 |
| 1005 | 2 |

group-sub-set#2

| *p* | CDM group λ |
|---|---|
| 1000 | 0 |
| 1001 | 0 |
| 1002 | 1 |
| 1003 | 1 |
| 1004 | 2 |
| 1005 | 2 |

j

→

(Actual Mapping)

| *p* | CDM group λ |
|---|---|
| 1006 | 0 |
| 1007 | 0 |
| 1008 | 1 |
| 1009 | 1 |
| 1010 | 2 |
| 1011 | 2 |

j+P

FIG. 52

Case 4 group--sub-set#1

| $p$ | CDM group $\lambda$ |
|---|---|
| 1000 | 0 |
| 1001 | 0 |
| 1002 | 1 |
| 1003 | 1 |
| 1004 | 2 |
| 1005 | 2 |
| 1006 | 0 |
| 1007 | 0 |
| 1008 | 1 |
| 1009 | 1 |
| 1010 | 2 |
| 1011 | 2 |

group--sub-set#2

| $p$ | CDM group $\lambda$ |
|---|---|
| 1000 | 0 |
| 1001 | 0 |
| 1002 | 1 |
| 1003 | 1 |
| 1004 | 2 |
| 1005 | 2 |
| 1006 | 0 |
| 1007 | 0 |
| 1008 | 1 |
| 1009 | 1 |
| 1010 | 2 |
| 1011 | 2 |

j

→

(Actual Mapping)

| $p$ | CDM group $\lambda$ |
|---|---|
| 1012 | 0 |
| 1013 | 0 |
| 1014 | 1 |
| 1015 | 1 |
| 1016 | 2 |
| 1017 | 2 |
| 1018 | 0 |
| 1019 | 0 |
| 1020 | 1 |
| 1021 | 1 |
| 1022 | 2 |
| 1023 | 2 |

j+P

FIG. 53

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (for example, also referred to as "5th generation mobile communication system (5G)," "5G+ (plus)," "6th generation mobile communication system (6G)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In future radio communication systems (for example, NR), a method of beam management is introduced. For example, in NR, forming (or using) beams in at least one of a base station and a user terminal (User Equipment (UE)) has been under study.

At the same time, for the sake of orthogonalization of layers or the like, a reference signal (for example, a demodulation reference signal (DMRS)) having a plurality of ports is used. In the future radio communication systems, increasing the number of DMRS ports more than that in existing specifications is required. However, how to increase the number of DMRS ports has not yet been actively studied. If an appropriate number of DMRS ports cannot be used, communication throughput/communication quality may be deteriorated.

In view of this, the present disclosure has one object to provide a terminal, a radio communication method, and a base station that use an appropriate number of DMRS ports.

Solution to Problem

A terminal according to one aspect of the present disclosure includes a receiving section that receives downlink control information including a resource assignment of a physical uplink shared channel and a value of an antenna port indication, and a control section that controls transmission of a demodulation reference signal (DMRS), based on an association between the value, the number of code division multiplexing (CDM) groups, and a DMRS port. The number of the CDM groups for DMRS configuration type 1 is larger than 2, and the number of the CDM groups for DMRS configuration type 2 is larger than 3.

Advantageous Effects of Invention

According to one aspect of the present disclosure, an appropriate number of DMRS ports can be used.

BRIEF DESCRIPTION OF DRAWINGS

FIG. 1 shows an example of parameters for PDSCH DMRS configuration type 1.

FIG. 2 shows an example of parameters for PUSCH DMRS configuration type 1.

FIG. 3 shows an example of a new DMRS port table for increase of the number of DMRS ports.

FIG. 4 shows another example of a new DMRS port table for increase of the number of DMRS ports.

FIG. 5 shows an example of a new DMRS port table for DMRS configuration type 1 according to choice 1 of option 1.

FIG. 6 shows an example of a new DMRS port table for DMRS configuration type 2 according to choice 1 of option 1.

FIG. 7 shows an example of a new DMRS port table for DMRS configuration type 1 according to choice 2 of option 1.

FIG. 8 shows an example of a new DMRS port table for DMRS configuration type 2 according to choice 2 of option 1.

FIG. 9 shows an example of a new DMRS port table according to case 1 of option 2.

FIG. 10 shows an example of a new DMRS port table according to case 3 of option 2.

FIG. 11 shows an example of a pseudo-random sequence generator to generate a DMRS sequence.

FIG. 12 shows an example of CDM group lists for case 1.

FIG. 13 shows an example of CDM group lists for case 2.

FIG. 14 shows an example of CDM group lists for case 3.

FIG. 15 shows an example of CDM group lists for case 4.

FIG. 17 shows an example of existing antenna port tables for DMRS configuration type 1 and DMRS maximum length=1.

FIG. 18 shows a first example of existing antenna port tables for DMRS configuration type 1 and DMRS maximum length=2.

FIG. 19 shows a second example of existing antenna port tables for DMRS configuration type 1 and DMRS maximum length=2.

FIG. 20 shows a first example of existing antenna port tables for DMRS configuration type 2 and DMRS maximum length=1.

FIG. 21 shows a second example of existing antenna port tables for DMRS configuration type 2 and DMRS maximum length=1.

FIG. 22 shows a first example of an existing antenna port table for DMRS configuration type 2 and DMRS maximum length=2.

FIG. 23 shows a second example of an existing antenna port table for DMRS configuration type 2 and DMRS maximum length=2.

FIG. 24 shows a third example of existing antenna port tables for DMRS configuration type 2 and DMRS maximum length=2.

FIG. 25 shows an example of a new antenna port table for DMRS configuration type 1, DMRS maximum length=1, the number of enhanced ports, and a rank=1.

FIG. 26 shows an example of a new antenna port table for DMRS configuration type 1, DMRS maximum length=1, the number of enhanced ports, and a rank=2.

FIG. 27 shows an example of new antenna port tables for DMRS configuration type 1, DMRS maximum length=1, the number of enhanced ports, and a rank=3, 4.

FIG. 28 shows another example of a new antenna port table for DMRS configuration type 1, DMRS maximum length=1, the number of enhanced ports, and a rank=1.

FIG. 29 shows another example of a new antenna port table for DMRS configuration type 1, DMRS maximum length=1, the number of enhanced ports, and a rank=2.

FIG. 30 shows another example of new antenna port tables for DMRS configuration type 1, DMRS maximum length=1, the number of enhanced ports, and a rank=3, 4.

FIG. 31 shows an example of a new antenna port table for DMRS configuration type 1, DMRS maximum length=2, the number of enhanced ports, and a rank=1.

FIG. 32 shows an example of a new antenna port table for DMRS configuration type 1, DMRS maximum length=2, the number of enhanced ports, and a rank=2.

FIG. 33 shows an example of new antenna port tables for DMRS configuration type 1, DMRS maximum length=2, the number of enhanced ports, and a rank=3, 4.

FIG. 34 shows an example of enhancement of a new antenna port table.

FIG. 35 shows an example of a new antenna port table for DMRS configuration type 2, DMRS maximum length=1, the number of enhanced ports, and a rank=1.

FIG. 36 shows an example of a new antenna port table for DMRS configuration type 2, DMRS maximum length=1, the number of enhanced ports, and a rank=2.

FIG. 37 shows an example of new antenna port tables for DMRS configuration type 2, DMRS maximum length=1, the number of enhanced ports, and a rank=3, 4.

FIG. 38 shows an example of a new antenna port table for DMRS configuration type 2, DMRS maximum length=2, the number of enhanced ports, and a rank=1.

FIG. 39 shows an example of a new antenna port table for DMRS configuration type 2, DMRS maximum length=2, the number of enhanced ports, and a rank=2.

FIG. 40 shows an example of a new antenna port table for DMRS configuration type 2, DMRS maximum length=2, the number of enhanced ports, and a rank=3.

FIG. 41 shows an example of a new antenna port table for DMRS configuration type 2, DMRS maximum length=2, the number of enhanced ports, and a rank=4.

FIG. 42 shows an example of an existing antenna port table for a PDSCH, a DMRS configuration type=1, and DMRS maximum length=1.

FIG. 43 shows an example of an existing antenna port table for a PDSCH, a DMRS configuration type=1, and DMRS maximum length=2.

FIG. 44 shows an example of an existing antenna port table for a PDSCH, a DMRS configuration type=2, and DMRS maximum length=1.

FIG. 45 shows an example of an existing antenna port table for a PDSCH, a DMRS configuration type=2, and DMRS maximum length=2.

FIG. 46 shows an example of a new antenna port table for a case of DMRS configuration type 1, DMRS maximum length=1, and the number of enhanced ports according to embodiment #9.

FIG. 47 shows an example of a first part of a new antenna port table for a case of DMRS configuration type 1, DMRS maximum length=2, and the number of enhanced ports according to embodiment #9.

FIG. 48 shows an example of a second part of a new antenna port table for a case of DMRS configuration type 1, DMRS maximum length=2, and the number of enhanced ports according to embodiment #9.

FIG. 49 shows an example of a third part of a new antenna port table for a case of DMRS configuration type 1, DMRS maximum length=2, and the number of enhanced ports according to embodiment #9.

FIG. 50 shows an example of group subsets for case 1.

FIG. 51 shows an example of group subsets for case 2.

FIG. 52 shows an example of group subsets for case 3.

FIG. 53 shows an example of group subsets for case 4.

DESCRIPTION OF EMBODIMENTS (Beam Management)

Figure 16:
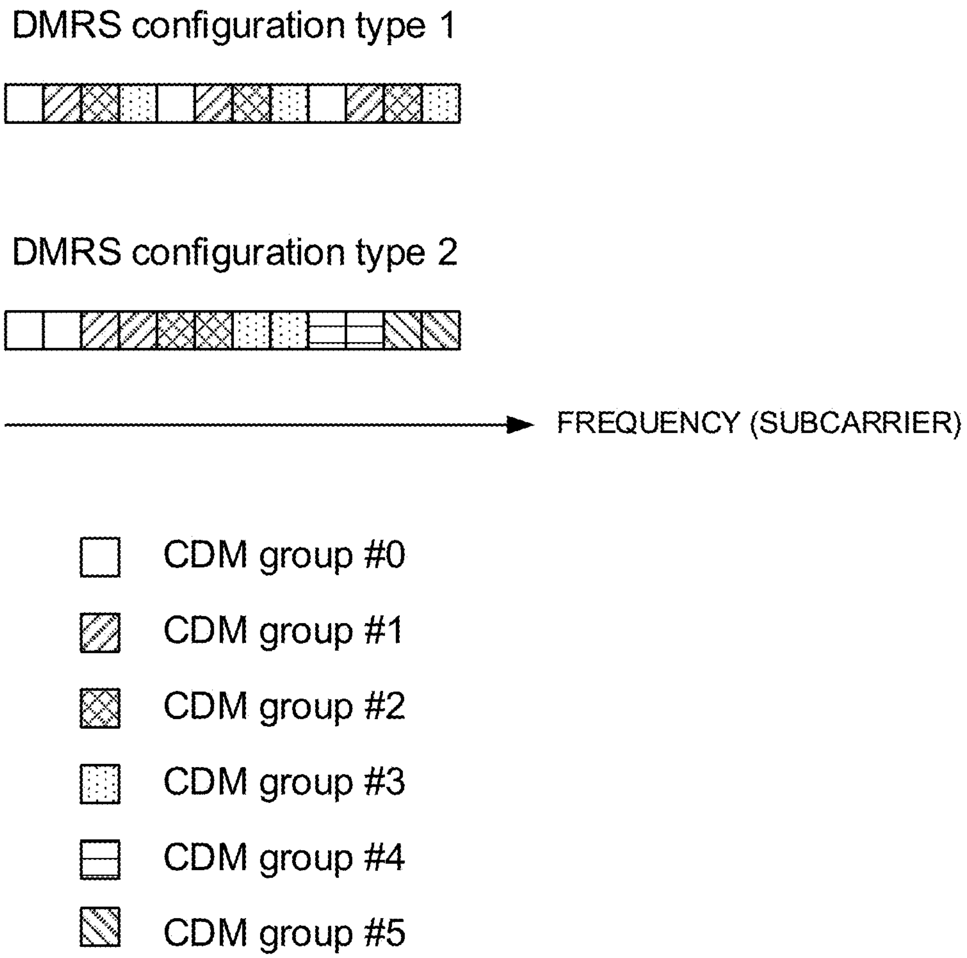
FIG. 16 shows an example of DMRS mapping.

In NR, a method of beam management is introduced. For example, for NR, forming (or using) beams in at least one of a base station and a UE has been under study.

Through application of beam forming (BF), it is expected that difficulty in securing coverage due to increase in carrier frequency be reduced, and radio wave propagation loss be reduced.

BF is, for example, a technique in which a beam (antenna directivity) is formed by controlling (also referred to as precoding) amplitude/phase of a signal that is transmitted or received from each element by using an ultra multi-element antenna. Note that Multiple Input Multiple Output (MIMO) using such an ultra multi-element antenna is also referred to as massive MIMO.

Sweeping of beams may be performed in both of transmission and reception, and control may be performed so that an appropriate pair is selected out of candidates of a plurality of patterns of transmit and receive beam pairs. The pair of the transmit beam and the receive beam may be referred to as a beam pair, and may be identified as a beam pair candidate index.

Note that, in beam management, a single beam is not used, and a plurality of levels of beam control, such as a rough beam and a fine beam, may be performed.

BF can be categorized into digital BF and analog BF. Digital BF and analog BF may be referred to as digital precoding and analog precoding, respectively.

Digital BF is, for example, a method in which precoding signal processing is performed on a baseband (for a digital signal). In this case, as many parallel processings, such as inverse fast Fourier transform (IFFT), digital to analog conversion (Digital to Analog Converter (DAC)), and Radio Frequency (RF), as the number of antenna ports (or RF chains) are required. At the same time, as many beams as the number of RF chains can be formed at any timing.

Analog BF is, for example, a method in which a phase shifter is used in RF. In analog BF, a plurality of beams cannot be formed at the same timing; however, a configuration thereof is easy and can be implemented at a low cost because it is only necessary that phase of RF signals be rotated.

Note that a hybrid BF configuration, which is a combination of digital BF and analog BF, can be implemented as well. In NR, introduction of massive MIMO has been under study. When forming of a great number of beams is intended to be performed by means of only digital BF, however, a circuit configuration costs much. Thus, use of the hybrid BF configuration is also assumed.

(TCI, Spatial Relation, QCL)

For NR, control of reception processing (for example, at least one of reception, demapping, demodulation, and decoding) and transmission processing (for example, at least one of transmission, mapping, precoding, modulation, and coding) of at least one of a signal and a channel (which may be referred to as a signal/channel; hereinafter, in a similar manner, "A/B" may be interpreted as "at least one of A and B") based on a transmission configuration indication state (TCI state) has been under study.

The TCI state may be a state applied to a downlink signal/channel. A state that corresponds to the TCI state applied to an uplink signal/channel may be expressed as spatial relation.

The TCI state is information related to quasi-co-location (QCL) of the signal/channel, and may be referred to as a spatial reception parameter, spatial relation information (SRI), or the like. The TCI state may be configured for the UE for each channel or for each signal.

QCL is an indicator indicating statistical properties of the signal/channel. For example, when a certain signal/channel and another signal/channel are in a relationship of QCL, it may be indicated that it is assumable that at least one of Doppler shift, a Doppler spread, an average delay, a delay spread, and a spatial parameter (for example, a spatial reception parameter (spatial Rx parameter)) is the same (the relationship of QCL is satisfied in at least one of these) between such a plurality of different signals/channels.

Note that the spatial reception parameter may correspond to a receive beam of the UE (for example, a receive analog beam), and the beam may be identified based on spatial QCL. The QCL (or at least one element in the relationship of QCL) in the present disclosure may be interpreted as sQCL (spatial QCL).

For the QCL, a plurality of types (QCL types) may be defined. For example, four QCL types A to D may be provided, which have different parameter(s) (or parameter set(s)) that can be assumed to be the same, and such parameter(s) (which may be referred to as QCL parameter(s)) are described below:

QCL type A: Doppler shift, Doppler spread, average delay, and delay spread

QCL type B: Doppler shift and Doppler spread

QCL type C: Doppler shift and Average delay

QCL type D: Spatial reception parameter

Types A to C may correspond to QCL information related to synchronization processing of at least one of time and frequency, and type D may correspond to QCL information related to beam control.

A case that the UE assumes that a certain control resource set (CORESET), channel, or reference signal is in a relationship of specific QCL (for example, QCL type D) with another CORESET, channel, or reference signal may be referred to as QCL assumption.

The UE may determine at least one of a transmit beam (Tx beam) and a receive beam (Rx beam) of the signal/channel, based on the TCI state or the QCL assumption of the signal/channel.

The TCI state may be, for example, information related to QCL between a channel as a target (or a reference signal (RS) for the channel) and another signal (for example, another downlink reference signal (DL-RS)). The TCI state may be configured (indicated) by higher layer signaling or physical layer signaling, or a combination of these.

In the present disclosure, the higher layer signaling may be, for example, any one or combinations of Radio Resource Control (RRC) signaling, Medium Access Control (MAC) signaling, broadcast information, and the like.

The MAC signaling may use, for example, a MAC control element (MAC CE), a MAC Protocol Data Unit (PDU), or the like. The broadcast information may be, for example, a master information block (MIB), a system information block (SIB), minimum system information (Remaining Minimum System Information (RMSI)), other system information (OSI), or the like.

The physical layer signaling may be, for example, downlink control information (DCI).

A channel for which the TCI state is configured (indicated) may be, for example, at least one of a downlink shared channel (Physical Downlink Shared Channel (PDSCH)), a downlink control channel (Physical Downlink Control Channel (PDCCH)), an uplink shared channel (Physical Uplink Shared Channel (PUSCH)), and an uplink control channel (Physical Uplink Control Channel (PUCCH)).

The RS (DL-RS) to have a QCL relationship with the channel may be, for example, at least one of a synchronization signal block (SSB), a channel state information reference signal (CSI-RS), and a reference signal for measurement (Sounding Reference Signal (SRS)). Alternatively, the DL-RS may be a CSI-RS used for tracking (also referred to as a Tracking Reference Signal (TRS)), or a reference signal used for QCL detection (also referred to as a QRS).

The SSB is a signal block including at least one of a primary synchronization signal (PSS), a secondary synchronization signal (SSS), and a broadcast channel (Physical Broadcast Channel (PBCH)). The SSB may be referred to as an SS/PBCH block.

An information element of the TCI state ("TCI-state IE" of RRC) configured using higher layer signaling may include one or a plurality of pieces of QCL information ("QCL-Info"). The QCL information may include at least one of information related to the DL-RS to have a QCL relationship (DL-RS relation information) and information indicating a QCL type (QCL type information). The DL-RS relation information may include information such as an index of the DL-RS (for example, an SSB index, or a non-zero power CSI-RS (NZP CSI-RS) resource ID (Identifier)), an index of a cell in which the RS is located, and an index of a Bandwidth Part (BWP) in which the RS is located.

(Development of MIMO Technology and Beam)

Incidentally, the MIMO technology has hitherto been used in a frequency band lower than 6 GHz. However, further application to a frequency band higher than 6 GHz in future has been under study.

Note that the frequency band lower than 6 GHz may be referred to as sub-6, frequency range (FR) 1, or the like. The frequency band higher than 6 GHz may be referred to as above-6, FR2, a millimeter wave (mmW), FR4, or the like.

It is assumed that the maximum number of MIMO layers is limited by an antenna size.

It is expected that, even with mmW, through use of MIMO of a high degree as well as cooperation of a plurality of UEs, the degree of freedom and diversity of MIMO multiplexing are enhanced, which further leads to enhancement of throughput.

In this manner, it is assumed that, in future radio communication systems (for example, NR of Rel-17 or later versions), even in a high frequency (for example, FR2), operation of only a digital beam without use of an analog beam (which may be referred to as full digital operation) is used and operation implementing dominant use of the digital beam is used.

For example, in a case of the full digital operation, by simultaneously applying orthogonal precoding (or an orthogonal beam, a digital beam) to a plurality of UEs, improvement of spectral efficiency can be expected. When the digital beam cannot be appropriately applied, interference between the UEs is increased, which leads to deterioration of communication quality (or reduction of cell capacity). Note that orthogonality according to the present disclosure may be interpreted as semi-orthogonality.

When the base station (which may be interpreted as a transmission/reception point (TRP), a panel, or the like) can transmit only one beam at certain time, the base station performs transmission and reception by switching beams for the UE. When the base station can transmit a plurality of beams at certain time, the base station can simultaneously perform transmission and reception to and from a plurality of UEs by using different beams.

Even if the base station adopts the full digital operation, the Rel-15 UE ought to be supported as far as the Rel-15 UE is present.

(DMRS)

A front-loaded DMRS is a first (first symbol or a symbol near the first symbol) DMRS for earlier demodulation. An additional DMRS can be configured by the RRC, for the sake of a high-speed moving UE or a high modulation and coding scheme (MCS)/rank. A frequency position of the additional DMRS is the same as that of the front-loaded DMRS.

For the time domain, DMRS mapping type A or B is configured. In DMRS mapping type A, DMRS position l_0 is counted with a symbol index in the slot. l_0 is configured by an MIB or a parameter (dmrs-TypeA-Position) in a common serving cell configuration (ServingCellConfigCommon). DMRS position 0 (reference point 1) means a first symbol of a slot or each frequency hop. In DMRS mapping type B, DMRS position l_0 is counted with a symbol index in a PDSCH/PUSCH. l_0 is invariably 0. DMRS position 0 (reference point 1) means a first symbol of a PDSCH/PUSCH or each frequency hop.

The DMRS position is defined by a table in a specification, and is dependent upon duration of the PDSCH/PUSCH. The position of the additional DMRS is fixed.

For the frequency domain, (PDSCH/PUSCH) DMRS configuration type 1 or 2 is configured. DMRS configuration type 1 has a comb structure, and can be applied to both of CP-OFDM (transport precoding=disabled) and DFT-S-OFDM (transport precoding=enabled). DMRS configuration type 2 can be applied only to CP-OFDM.

A single symbol DMRS or a double symbol DMRS is configured.

The single symbol DMRS is normally used (mandatory in Rel. 15). In the single symbol DMRS, the number of additional DMRSs (symbols) is {0, 1, 2, 3}. The single symbol DMRS supports both of a case in which frequency hopping is enabled and a case in which frequency hopping is disabled. If a maximum number (maxLength) in an uplink DMRS configuration (DMRS-UplinkConfig) is not configured, the single symbol DMRS is used.

The double symbol DMRS is used for a larger number of DMRS ports (in particular, MU-MIMO). In the double symbol DMRS, the number of additional DMRSs (symbols) is {0, 1}. The double symbol DMRS supports a case in which frequency hopping is disabled. If a maximum number (maxLength) in the uplink DMRS configuration (DMRS-UplinkConfig) is 2 (len2), whether the single symbol DMRS is used or the double symbol DMRS is used is determined by DCI or a configured grant.

From the above, as configuration patterns allowing the DMRS, the following combinations are conceivable.

- DMRS configuration type 1, DMRS mapping type A, single symbol DMRS
- DMRS configuration type 1, DMRS mapping type A, double symbol DMRS
- DMRS configuration type 1, DMRS mapping type B, single symbol DMRS
- DMRS configuration type 1, DMRS mapping type B, double symbol DMRS
- DMRS configuration type 2, DMRS mapping type A, single symbol DMRS
- DMRS configuration type 2, DMRS mapping type A, double symbol DMRS
- DMRS configuration type 2, DMRS mapping type B, single symbol DMRS
- DMRS configuration type 2, DMRS mapping type B, double symbol DMRS A plurality of DMRS ports mapped to the same REs (time and frequency resources) are referred to as a DMRS CDM group.

For DMRS configuration type 1 and the single symbol DMRS, four DMRS ports can be used. In each DMRS CDM group, two DMRS ports are multiplexed using an FD OCC having a length of 2. Among a plurality of DMRS CDM groups (two DMRS CDM groups), two DMRS ports are multiplexed using FDM.

For DMRS configuration type 1 and the double symbol DMRS, eight DMRS ports can be used. In each DMRS CDM group, two DMRS ports are multiplexed using an FD OCC having a length of 2, and two DMRS ports are multiplexed using a TD OCC. Among a plurality of DMRS CDM groups (two DMRS CDM groups), two DMRS ports are multiplexed using FDM.

For DMRS configuration type 2 and the single symbol DMRS, six DMRS ports can be used. In each DMRS CDM group, two DMRS ports are multiplexed using an FD OCC having a length of 2. Among a plurality of DMRS CDM groups (three DMRS CDM groups), three DMRS ports are multiplexed using FDM.

For DMRS configuration type 2 and the double symbol DMRS, 12 DMRS ports can be used. In each DMRS CDM group, two DMRS ports are multiplexed using an FD OCC having a length of 2, and two DMRS ports are multiplexed using a TD OCC. Among a plurality of DMRS CDM groups (three DMRS CDM groups), three DMRS ports are multiplexed using FDM.

Here, although an example of DMRS mapping type B is shown above, the same holds true for DMRS mapping type A.

In parameters for a PDSCH DMRS (existing tables, existing DMRS port tables, FIG. 1), DMRS ports 1000 to 1007 can be used for DMRS configuration type 1, and DMRS ports 1000 to 1011 can be used for DMRS configuration type 2.

In parameters for a PUSCH DMRS (existing tables, existing DMRS port tables, FIG. 2), DMRS ports 0 to 7 can be used for DMRS configuration type 1, and DMRS ports 0 to 11 can be used for DMRS configuration type 2.

(Ports of Reference Signal)

For the sake of orthogonalization of the MIMO layers or the like, a reference signal (for example, a demodulation reference signal (DMRS) or a CSI-RS) having a plurality of ports is used.

For example, regarding single user MIMO (SU-MIMO), a different DMRS port/CSI-RS port may be configured for each layer. Regarding multi user MIMO (MU-MIMO), a different DMRS port/CSI-RS port may be configured for each layer in one UE and for each UE.

Note that, when the number of CSI-RS ports having a value larger than the number of layers used for data is used, it is expected that more accurate channel state measurement can be performed based on the CSI-RS, which contributes to improvement of throughput.

In Rel-15 NR, regarding the DMRS having a plurality of ports, through the use of frequency division multiplexing (FDM), a frequency domain orthogonal cover code (FD-OCC), a time domain OCC (TD-OCC), or the like, a maximum of eight ports are supported for a type 1 DMRS (in other words, DMRS configuration type 1), and a maximum of 12 ports are supported for a type 2 DMRS (in other words, DMRS configuration type 2).

In Rel-15 NR, as the FDM mentioned above, a pattern of transmission frequency having a shape of teeth of a comb (comb-like resource set) is used. As the FD-OCC mentioned above, a cyclic shift (CS) is used. The TD-OCC mentioned above can only be applied to a double symbol DMRS.

The OCC according to the present disclosure may be interchangeably interpreted as an orthogonal code, orthogonalization, a cyclic shift, or the like.

Note that the type of the DMRS may be referred to as a DMRS configuration type.

Among the DMRSs, the DMRS that is subjected to resource mapping in the unit of consecutive (adjacent) two symbols may be referred to as a double symbol DMRS, and the DMRS that is subjected to resource mapping in the unit of one symbol may be referred to as a single symbol DMRS.

Both of the DMRSs may be mapped to one or more symbols per slot, according to the length of a data channel. The DMRS that is mapped to a start position of a data symbol may be referred to as a front-loaded DMRS, and the DMRS that is additionally mapped to a position other than the start position may be referred to as an additional DMRS.

In a case of DMRS configuration type 1 and the single symbol DMRS, the Comb and the CS may be used for orthogonalization. For example, up to 4 antenna ports (APs) may be supported by using two types of Combs and two types of CSs (Comb2+2CS).

In a case of DMRS configuration type 1 and the double symbol DMRS, the Comb, the CS, and the TD-OCC may be used for orthogonalization. For example, up to 8 APs may be supported by using two types of Combs, two types of CSs, and TD-OCCs ({1, 1} and {1, −1}).

In a case of DMRS configuration type 2 and the single symbol DMRS, the FD-OCC may be used for orthogonalization. For example, up to 6 APs may be supported by applying the orthogonal code (2-FD-OCC) to two resource elements (REs) adjacent to each other in the frequency direction.

In a case of DMRS configuration type 2 and the double symbol DMRS, the FD-OCC and the TD-OCC may be used for orthogonalization. For example, up to 12 APs may be supported by applying the orthogonal code (2-FD-OCC) to two REs adjacent in the frequency direction and applying the TD-OCC ({1, 1} and {1, −1}) to two REs adjacent in the time direction.

In Rel-15 NR, regarding the CSI-RS having a plurality of ports, through the use of FDM, time division multiplexing (TDM), a frequency domain OCC, a time domain OCC, or the like, a maximum of 32 ports are supported. Regarding orthogonalization of the CSI-RS as well, a method similar to that for the DMRS described above may be applied.

Incidentally, a group of DMRS ports subjected to orthogonalization by means of the FD-OCC/TD-OCC as described above is also referred to as a code division multiplexing (CDM) group.

Different CDM groups are subjected to FDM, and are thus orthogonal to each other. In contrast, in the same CDM group, orthogonality of the applied OCC may be collapsed due to channel change or the like. In this case, when a signal in the same CDM group is received with different received power, the near-far problem is caused, which may lead to a failure in securing orthogonality.

Here, the TD-OCC/FD-OCC of the DMRS according to Rel-15 NR will be described. The DMRS mapped to the resource element (RE) may correspond to a sequence, which is obtained by multiplying a parameter (which may be referred to as a sequence element or the like) $w_f(k')$ of the FD-OCC and a parameter (which may be referred to as a sequence element or the like) $w_t(l')$ of the TD-OCC on a DMRS sequence.

The TD-OCC and the FD-OCC of the DMRS according to Rel-15 NR both correspond to the OCC having a sequence length (which may be referred to as an OCC length) of 2. Thus, a possible value of each of k' and l' in the above is 0 or 1. By multiplying the FD-OCC by the unit of the RE, the DMRS having two ports can be multiplexed by using the same time and frequency resources (two REs). When both of the FD-OCC and the TD-OCC are applied, the DMRS having four ports can be multiplexed by using the same time and frequency resources (four REs).

The two existing DMRS port tables for the PDSCH described above correspond to DMRS configuration type 1 and type 2, respectively. Note that p represents a number of the antenna port, and Δ represents a parameter for shifting (offsetting) the frequency resource.

For example, to antenna ports 1000 and 1001, $\{w_f(0), w_f(1)\}=\{+1, +1\}$ and $\{w_f(0), w_f(1)\}=\{+1, -1\}$ are respectively applied, so as to be subjected to orthogonalization by using the FD-OCC.

To antenna ports 1000 to 1001 and antenna ports 1002 to 1003 (in a case of type 2, antenna ports 1004 to 1005 as well), Δ of different values is applied, so that FDM is applied. Thus, antenna ports 1000 to 1003 (or 1000 to 1005) corresponding to the single symbol DMRS are subjected to orthogonalization by using the FD-OCC and FDM.

To antenna ports 1000 to 1003 and antenna ports 1004 to 1007 of type 1, $\{w_t(0), w_t(1)\}=\{+1, +1\}$ and $\{w_t(0), w_t(1)\}=\{+1, -1\}$ are respectively applied, so as to be subjected to orthogonalization by using the TD-OCC. Thus, antenna ports 1000 to 1007 (or 1000 to 1011) corresponding to the double symbol DMRS are subjected to orthogonalization by using the FD-OCC, the TD-OCC, and FDM.

For only CP-OFDM, for MU-MIMO of the DL/UL (without increasing DMRS overhead), defining a larger number of orthogonal DMRS ports, implementing a common design among DL and UL DMRSs, up to 24 orthogonal DMRS ports, and doubling a maximum number of orthogonal DMRS ports for both of the single symbol DMRS and the double symbol DMRS for each of the applicable DMRS configuration types have been under study.

In Rel. 15, the following case 1 to case 4 can be configured.

[Case 1] Single Symbol DMRS of DMRS Configuration Type 1

A total number of DMRS ports is 2 (achieved owing to comb/FDM)×2 (achieved owing to FD OCC)=4 ports.

[Case 2] Double Symbol DMRS of DMRS Configuration Type 1

A total number of DMRS ports is 2 (achieved owing to comb/FDM)×2 (achieved owing to FD OCC)×2 (achieved owing to TD OCC)=8 ports.

[Case 3] Single Symbol DMRS of DMRS Configuration Type 2

A total number of DMRS ports is 3 (achieved owing to FDM)×2 (achieved owing to FD OCC)=6 ports.

[Case 4] Double Symbol DMRS of DMRS Configuration Type 2

A total number of DMRS ports is 3 (achieved owing to comb)×2 (achieved owing to FD OCC)×2 (achieved owing to TD OCC)=12 ports.

In Rel. 18, for cases 1, 2, 3, and 4, increasing the total number of DMRS ports to 8, 16, 12, and 24, respectively, has been under study.

The DMRS CDM groups and DMRS port indication tables related thereto have not been fully studied yet. If these are not clarified, communication throughput/communication quality may be deteriorated.

In view of this, the inventors of the present invention came up with the idea of a method of configuration/determination related to the DMRS ports/DMRS CDM groups.

Embodiments according to the present disclosure will be described in detail with reference to the drawings as follows.

Note that the embodiments (for example, the cases) described below may each be used individually, or at least two of them may be combined to be applied.

In the present disclosure, “A/B” and “at least one of A and B” may be interchangeably interpreted as each other. In the present disclosure, “A/B/C” may mean “at least one of A, B, and C”.

In the present disclosure, to activate, to deactivate, to indicate, to select, to configure, to update, to determine, and the like may be interchangeably interpreted as each other. In the present disclosure, to support, to control, to be able to control, to operate, and to be able to operate may be interchangeably interpreted as each other.

In the present disclosure, radio resource control (RRC), an RRC parameter, an RRC message, a higher layer parameter, an information element (IE), a configuration, and the like may be interchangeably interpreted as each other. In the present disclosure, a Medium Access Control control element (MAC Control Element (CE)), an update command, an activation/deactivation command, and the like may be interchangeably interpreted as each other.

In the present disclosure, the higher layer signaling may be, for example, any one or combinations of Radio Resource Control (RRC) signaling, Medium Access Control (MAC) signaling, broadcast information, and the like.

In the present disclosure, the MAC signaling may use, for example, a MAC control element (MAC CE), a MAC Protocol Data Unit (PDU), or the like. The broadcast information may be, for example, a master information block (MIB), a system information block (SIB), minimum system information (Remaining Minimum System Information (RMSI)), other system information (OSI), or the like.

In the present disclosure, the physical layer signaling may be, for example, downlink control information (DCI), uplink control information (UCI), or the like.

In the present disclosure, an index, an identifier (ID), an indicator, a resource ID, and the like may be interchangeably interpreted as each other. In the present disclosure, a sequence, a list, a set, a group, a cluster, a subset, and the like may be interchangeably interpreted as each other.

In the present disclosure, a panel, a UE panel, a panel group, a beam, a beam group, a precoder, an Uplink (UL) transmission entity, a transmission/reception point (TRP), a base station, spatial relation information (SRI), a spatial relation, an SRS resource indicator (SRI), a control resource set (CORESET), a Physical Downlink Shared Channel (PDSCH), a codeword (CW), a transport block (TB), a reference signal (RS), an antenna port (for example, a demodulation reference signal (DMRS) port), an antenna port group (for example, a DMRS port group), a group (for example, a spatial relation group, a code division multiplexing (CDM) group, a reference signal group, a CORESET group, a Physical Uplink Control Channel (PUCCH) group, a PUCCH resource group), a resource (for example, a reference signal resource, an SRS resource), a resource set (for example, a reference signal resource set), a CORESET pool, a downlink Transmission Configuration Indication state (TCI state) (DL TCI state), an uplink TCI state (UL TCI state), a unified TCI state, a common TCI state, quasi-co-location (QCL), QCL assumption, and the like may be interchangeably interpreted as each other.

In the present disclosure, time domain resource allocation and time domain resource assignment may be interchangeably interpreted as each other.

(Radio Communication Method)

In each embodiment, a DMRS, a DL DMRS, a UL DMRS, a PDSCH DMRS, and a PUSCH DMRS may be interchangeably interpreted as each other.

In each embodiment, an orthogonal sequence, an OCC, an FD OCC, and a TD OCC may be interchangeably interpreted as each other.

In each embodiment, a DMRS port, an antenna port, and a port may be interchangeably interpreted as each other. In each embodiment, a port index and a port number may be interchangeably interpreted as each other. In each embodiment, a DMRS CDM group and a CDM group may be interchangeably interpreted as each other. In each embodiment, an antenna port indication and an antenna port field may be interchangeably interpreted as each other.

In each embodiment, a CDM group list and a list may be interchangeably interpreted as each other. In each embodiment, a CDM group subset and a group subset may be interchangeably interpreted as each other.

In each embodiment, a DMRS for the PDSCH (DMRS ports 1000 to 10xx) and a DMRS for the PUSCH (DMRS ports 0 to xx) may be interchangeably interpreted as each other.

Analysis #1

FIG. 3 shows an example of a new DMRS port table for increase of the number of DMRS ports for PDSCH DMRS configuration type 1. FIG. 4 shows another example of a new DMRS port table for increase of the number of DMRS ports for PDSCH DMRS configuration type 1. By using such new DMRS port tables and a new FD OCC $W_f(k')$/TD OCC $W_t(l')$/DMRS mapping, the number of DMRS ports can be increased from an existing number of DMRS ports. $w_f(k')$ may have a length the same as that of an existing FD OCC, or may be longer than an existing FD OCC. $w_f(k')$ may be a sequence having a value of 0 and 1, or may be a sequence having a complex value. In the new DMRS port table, a CDM group for new DMRS ports is an existing CDM group.

The UE may receive a configuration of the DMRS, and control transmission and reception of the DMRS, based on one or more associations between a plurality of CDM groups and a plurality of DMRS ports and the configuration. The number of the plurality of CDM groups for DMRS configuration type 1 may be larger than 2, and the number of the plurality of CDM groups for DMRS configuration type 2 may be larger than 3.

Embodiment #1

The embodiment relates to mapping between the CDM groups and the DMRS port indexes (for example, DMRS port index order, CDM group order, CDM grouping order/method).

In case 1 to case 4 of Rel. 15, mapping between the CDM groups and the DMRS port indexes is as follows.

[Case 1]

Four ports and two CDM groups may be available. For the PUSCH, CDM group #0 may correspond to the DMRS port indexes {0, 1}, and CDM group #1 may correspond to the DMRS port indexes {2, 3}. For the PDSCH, CDM group #0 may correspond to the DMRS port indexes {1000, 1001}, and CDM group #1 may correspond to the DMRS port indexes {1002, 1003}.

[Case 2]

Eight ports and two CDM groups may be available. For the PUSCH, CDM group #0 may correspond to the DMRS port indexes {0, 1, 4, 5}, and CDM group #1 may correspond to the DMRS port indexes {2, 3, 6, 7}. For the PDSCH, CDM group #0 may correspond to the DMRS port indexes {1000, 1001, 1004, 1005}, and CDM group #1 may correspond to the DMRS port indexes {1002, 1003, 1006, 1007}.

[Case 3]

Six ports and three CDM groups may be available. For the PUSCH, CDM group #0 may correspond to the DMRS port indexes {0, 1}, CDM group #1 may correspond to the DMRS port indexes {2, 3}, and CDM group #2 may correspond to the DMRS port indexes {4, 5}. For the PDSCH, CDM group #0 may correspond to the DMRS port indexes {1000, 1001}, CDM group #1 may correspond to the DMRS port indexes {1002, 1003}, and CDM group #2 may correspond to the DMRS port indexes {1004, 1005}.

[Case 4]

12 ports and three CDM groups may be available. For the PUSCH, CDM group #0 may correspond to the DMRS port indexes {0, 1, 6, 7}, CDM group #1 may correspond to the DMRS port indexes {2, 3, 8, 9}, and CDM group #2 may correspond to the DMRS port indexes {4, 5, 10, 11}. For the PDSCH, CDM group #0 may correspond to the DMRS port indexes {1000, 1001, 1006, 1007}, CDM group #1 may correspond to the DMRS port indexes {1002, 1003, 1008, 1009}, and CDM group #2 may correspond to the DMRS port indexes {1004, 1005, 1010, 1011}.

In the embodiment, mapping between the CDM groups and the DMRS port indexes may conform to one of the following options 1 and 2.

<<Option 1>>

The UE may support new CDM groups for new (a larger number of) DMRS ports. In this case, the UE may support at least one of the following cases 1 to 4.

[Case 1]

Eight ports may be available. Two CDM groups similar to the existing DMRS port tables may be maintained. For the PUSCH, CDM group #0 may correspond to the DMRS port indexes {0, 1}, and CDM group #1 may correspond to the DMRS port indexes {2, 3}. For the PDSCH, CDM group #0 may correspond to the DMRS port indexes {1000, 1001}, and CDM group #1 may correspond to the DMRS port indexes {1002, 1003}.

[Case 2]

16 ports may be available. Four CDM groups may be available in accordance with one of the following choices 1 and 2.

[[Choice 1]]

Four CDM groups may be available owing to enhancement/addition of the existing two CDM groups. For the PUSCH, CDM group #0 may correspond to the DMRS port indexes {0, 1, 4, 5}, CDM group #1 may correspond to the DMRS port indexes {2, 3, 6, 7}, CDM group #2 may correspond to the DMRS port indexes {8, 9, 10, 13}, and CDM group #3 may correspond to the DMRS port indexes {10, 11, 14, 15}. For the PDSCH, CDM group #0 may correspond to the DMRS port indexes {1000, 1001, 1004, 1005}, CDM group #1 may correspond to the DMRS port indexes {1002, 1003, 1006, 1007}, CDM group #2 may correspond to the DMRS port indexes {1008, 1009, 1012, 1013}, and CDM group #3 may correspond to the DMRS port indexes {1010, 1011, 1014, 1015}.

[[Choice 2]]

Four CDM groups may be available owing to new mapping order.

[Case 3]

12 ports may be available. Three CDM groups similar to the existing DMRS port tables may be maintained. For the PUSCH, CDM group #0 may correspond to the DMRS port indexes {0, 1, 6, 7}, CDM group #1 may correspond to the DMRS port indexes {2, 3, 8, 9}, and CDM group #2 may correspond to the DMRS port indexes {4, 5, 10, 11}. For the PDSCH, CDM group #0 may correspond to the DMRS port indexes {1000, 1001, 1006, 1007}, CDM group #1 may correspond to the DMRS port indexes {1002, 1003, 1008, 1009}, and CDM group #2 may correspond to the DMRS port indexes {1004, 1005, 1010, 1011}.

[Case 4]

24 ports may be available. Six CDM groups may be available in accordance with one of the following choices 3 and 4.

[[Choice 3]]

Six CDM groups may be available owing to enhancement/addition of the existing two CDM groups. For the PUSCH, CDM group #0 may correspond to the DMRS port indexes {0, 1, 6, 7}, CDM group #1 may correspond to the DMRS port indexes {2, 3, 8, 9}, CDM group #2 may correspond to the DMRS port indexes {4, 5, 10, 11}, CDM group #3 may correspond to the DMRS port indexes {12, 13, 18, 19}, CDM group #4 may correspond to the DMRS port indexes {14, 15, 20, 21}, and CDM group #5 may correspond to the DMRS port indexes {16, 17, 22, 23}. For the PDSCH, CDM group #0 may correspond to the DMRS port indexes {1000, 1001, 1006, 1007}, CDM group #1 may correspond to the DMRS port indexes {1002, 1003, 1008, 1009}, CDM group #2 may correspond to the DMRS port indexes {1004, 1005, 1010, 1011}, CDM group #3 may correspond to the DMRS port indexes {1012, 1013, 1018, 1019}, CDM group #4 may correspond to the DMRS port indexes {1014, 1015, 1020, 1021}, and CDM group #5 may correspond to the DMRS port indexes {1016, 1017, 1022, 1023}.

[[Choice 4]]

Six CDM groups may be available owing to new mapping order.

An example of the PDSCH of choice 1/3 in case 2/4 described above will be described. For the PUSCH, the same applies except that the DMRS port index starts with 0.

The number of CDM groups is increased in at least one of a case in which the number of DMRS ports for DMRS configuration type 1 is larger than 8 and a case in which the number of DMRS ports for DMRS configuration type 2 is larger than 12.

In choice 1/3, for each DMRS configuration type, a unified DMRS port table for the single symbol DMRS and the double symbol DMRS may be defined so that the same DMRS port index belongs to the same CDM group in both of the single symbol DMRS and the double symbol DMRS.

FIG. 5 shows an example of a new DMRS port table for DMRS configuration type 1 according to choice 1. In the present example, even when the number of DMRS ports supported for DMRS configuration type 1 and the single symbol DMRS is increased to 8, the number of CDM groups is 2.

FIG. 6 shows an example of a new DMRS port table for DMRS configuration type 2 according to choice 1. In the present example, even when the number of DMRS ports supported for DMRS configuration type 2 and the single symbol DMRS is increased to 12, the number of CDM groups is 2.

In choice 2/4 in case 2/4 described above, new mapping order between the DMRS CDM groups and the DMRS port indexes may be defined.

FIG. 7 shows an example of a new DMRS port table for DMRS configuration type 1 according to choice 2. For the PDSCH, CDM group #0 corresponds to the DMRS port indexes {1000, 1001, 1008, 1009}, CDM group #1 corresponds to the DMRS port indexes {1002, 1003, 1010, 1011}, CDM group #2 corresponds to the DMRS port indexes {1004, 1005, 1012, 1013}, and CDM group #3 corresponds to the DMRS port indexes {1006, 1007, 1014, 1015}.

FIG. 8 shows an example of a new DMRS port table for DMRS configuration type 2 according to choice 2. For the PDSCH, CDM group #0 corresponds to the DMRS port indexes {1000, 1001, 1012, 1013}, CDM group #1 corresponds to the DMRS port indexes {1002, 1003, 1014, 1015}, CDM group #2 corresponds to the DMRS port indexes {1004, 1005, 1016, 1016}, CDM group #3 corresponds to the DMRS port indexes {1006, 1007, 1018, 1019}, CDM group #4 corresponds to the DMRS port indexes {1008, 1009, 1020, 1021}, and CDM group #5 corresponds to the DMRS port indexes {1010, 1011, 1022, 1023}.

In choice 2/4, for each DMRS configuration type, such a unified DMRS port table for the single symbol DMRS and the double symbol DMRS may be defined that the same DMRS port index belongs to the same CDM group in both of the single symbol DMRS and the double symbol DMRS.

<<Option 2>>

The UE may support a new CDM group for enhanced DMRS configuration type 1/2 (for example, Rel/18 DMRS configuration type 1/2). In this case, the UE may support at least one of the following cases 1 to 4.

[Case 1]

Eight ports may be available. Four CDM groups may be available. FIG. 9 shows an example of a new DMRS port table. For the PUSCH, CDM group #0 may correspond to the DMRS port indexes {0, 1}, CDM group #1 may correspond to the DMRS port indexes {2, 3}, CDM group #2 may correspond to the DMRS port indexes {4, 5}, and CDM group #3 may correspond to the DMRS port indexes {6, 7}. For the PDSCH, CDM group #0 may correspond to the DMRS port indexes {1000, 1001}, CDM group #1 may correspond to the DMRS port indexes {1002, 1003}, CDM group #2 may correspond to the DMRS port indexes {1004, 1005}, and CDM group #3 may correspond to the DMRS port indexes {1006, 1007}.

[Case 2]

16 ports may be available. Four CDM groups may be available. Mapping between the CDM groups and the DMRS port indexes may be the same as that of choice 1/3 of case 2 of option 1 described above.

[Case 3]

12 ports may be available. Six CDM groups may be available. FIG. 10 shows an example of a new DMRS port table. For the PUSCH, CDM group #0 may correspond to the DMRS port indexes {0, 1}, CDM group #1 may correspond to the DMRS port indexes {2, 3}, CDM group #2 may correspond to the DMRS port indexes {4, 5}, CDM group #3 may correspond to the DMRS port indexes {6, 7}, CDM group #4 may correspond to the DMRS port indexes {8, 9}, and CDM group #5 may correspond to the DMRS port indexes {10, 11}. For the PDSCH, CDM group #0 may correspond to the DMRS port indexes {1000, 1001}, CDM group #1 may correspond to the DMRS port indexes {1002, 1003}, CDM group #2 may correspond to the DMRS port indexes {1004, 1005}, CDM group #3 may correspond to the DMRS port indexes {1006, 1007}, CDM group #4 may correspond to the DMRS port indexes {1008, 1009}, and CDM group #5 may correspond to the DMRS port indexes {1010, 1011}.

[Case 4]

24 ports may be available. Six CDM groups may be available. Mapping between the CDM groups and the DMRS port indexes may be the same as that of choice 2/4 of case 4 of option 1 described above.

When option 2 is adopted for the single symbol DMRS, choice 2/4 may apply. In this case, for each DMRS configuration type, such a unified DMRS port table for the single symbol DMRS and the double symbol DMRS may be defined that the same DMRS port index belongs to the same CDM group in both of the single symbol DMRS and the double symbol DMRS.

According to the embodiment, the UE can appropriately determine a relationship between the DMRS ports and the CDM groups.

Embodiment #2

The embodiment relates to a DMRS sequence.

As shown in the example of FIG. 11, a pseudo-random sequence generator for a pseudo-random sequence c(i) used to generate a DMRS sequence r(n) is initialized by using an initial value $c_{int}$. Rel. 16 supports $c_{init}$ specific to a CDM group in order to reduce a PAPR at the same level as data symbols for all of the combinations of ports.

In $c_{init}$ similar to Rel. 16, an identifier $n^{-}_{SCID}{}^{\lambda-}$ may be used. Here, $n^{-}$ may be represented with "– (bar)" being added above "n", or may be referred to as "n bar". λ– may be represented with "– (bar)" being added above "A", or may be referred to as "A bar".

$n^{-}{}_{SCID}{}^{\lambda-}$ for new values (for example, λ=3, 4, 5) of the CDM group index A may be defined. For λ=0, 2, 4, n-SCID may be $n_{SCID}$, and for λ=1, 3, 5, $n^{-}{}_{ID}{}^{\lambda-}$ may be $1-n_{SCID}$. The expression of $n^{-}{}_{ID}{}^{\lambda-}$ for λ is not limited to this, and may be given by another expression. Here, $N_{ID}\hat{}(n^{-}{}_{SCID}{}^{\lambda-})$ is a scrambling ID (based on higher layer parameters $N_{ID}^{0}$ and $N_{ID}^{1}$) or a physical layer cell identity $N_{ID}^{cell}$, and $n_{SCID} \in \{0, 1\}$.

According to the embodiment, the UE can appropriately determine a relationship between the CDM groups and the DMRS sequences.

Embodiment #0-1

The embodiment relates to mapping between the CDM groups and the DMRS ports.

In the CDM groups in option 1/2 of embodiment #1, a new concept of CDM group lists may be introduced above the CDM groups. The number of CDM groups and the CDM group order for each CDM group list may conform to the existing DMRS port tables. The CDM group lists may support at least one of the following case 1 to case 4.

[Case 1]

Eight ports may be available. Two CDM group lists may be available. Two CDM groups may be present for each CDM group list. Two DMRS ports may be present for each CDM group. List #1 may include the CDM groups {0, 1}, and list #2 may include the CDM groups {2, 3}.

[Case 2]

16 ports may be available. Two CDM group lists may be available. Two CDM groups may be present for each CDM group list. Four DMRS ports may be present for each CDM group. List #1 may include the CDM groups {0, 1}, and list #2 may include the CDM groups {2, 3}.

[Case 3]

12 ports may be available. Two CDM group lists may be available. Three CDM groups may be present for each CDM group list. Two DMRS ports may be present for each CDM group. list #1 may include the CDM groups {0, 1, 2}, and list #2 may include the CDM groups {3, 4, 5}.

[Case 4]

24 ports may be available. Two CDM group lists may be available. Three CDM groups may be present for each CDM group list. Four DMRS ports may be present for each CDM group. list #1 may include the CDM groups {0, 1, 2}, and list #2 may include the CDM groups {3, 4, 5}.

For the DMRS ports for each list, the order of the CDM groups of the existing DMRS port tables may be reused. For the second list, a DMRS port index j in the DMRS port table may mean j+P. Here, P may be the number of DMRS ports in the list (the maximum number of DMRS ports in the list). For the second list, a DMRS CDM group index k in the DMRS port table may mean k+Q. Here, Q may be the number of DMRS CDM groups in the list (the maximum number of DMRS CDM groups in the list).

FIG. 12 shows an example of the CDM group lists for case 1. In the DMRS port table, the DMRS ports {1000, 1001, 1002, 1003}correspond to the CDM groups {0, 0, 1, 1}, respectively. Mapping for list #1 is the same as that of the DMRS port table. Regarding mapping for list #2, P=4 and Q=2 are applied to the DMRS port table, in such a manner that the DMRS port j+P corresponds to the CDM group k+Q.

FIG. 13 shows an example of the CDM group lists for case 2. In the DMRS port table, the DMRS ports {1000, 1001, 1002, 1003, 1004, 1005, 1006, 1007}correspond to the CDM groups {0, 0, 1, 1, 0, 0, 1, 1}, respectively. Mapping for list #1 is the same as that of the DMRS port table. Regarding mapping for list #2, P=8 and Q=2 are applied to the DMRS port table, in such a manner that the DMRS port j+P corresponds to the CDM group k+Q.

FIG. 14 shows an example of the CDM group lists for case 3. In the DMRS port table, the DMRS ports {1000, 1001, 1002, 1003, 1004, 1005}correspond to the CDM groups {0, 0, 1, 1, 2, 2}, respectively. Mapping for list #1 is the same as that of the DMRS port table. Regarding mapping for list #2, P=6 and Q=3 are applied to the DMRS port table, in such a manner that the DMRS port j+P corresponds to the CDM group k+Q.

FIG. 15 shows an example of the CDM group lists for case 4. In the DMRS port table, the DMRS ports {1000, 1001, 1002, 1003, 1004, 1005, 1006, 1007, 1008, 1009, 1010, 1011}correspond to the CDM groups {0, 0, 1, 1, 2, 2, 0, 0, 1, 1, 2, 2}, respectively. Mapping for list #1 is the same as that of the DMRS port table. Regarding mapping for list #2, P=12 and Q=3 are applied to the DMRS port table, in such a manner that the DMRS port j+P corresponds to the CDM group k+Q.

According to the embodiment, the CDM groups and the DMRS ports can be appropriately increased.

Embodiment #0-2

The embodiment relates to a DMRS structure.

In Rel. 16/17, different CDM groups are subjected to FDM.

Received signals have a near-far problem (a received signal at a short distance affects a received signal at a long distance) among a plurality of different UEs having a plurality of different received powers, and thus the base station may assign different CDM groups to different UEs for MU-MIMO.

In order to increase the number of CDM groups, how to map the REs to the CDM groups poses a problem.

FIG. 16 shows an example of mapping (assignment, allocation) from the CDM groups to the REs for DMRS configuration type 1/2.

For DMRS configuration type 1, four CDM groups may be subjected to FDM, using a comb structure having four transmission combs. For DMRS configuration type 2, six CDM groups may be subjected to FDM for every two REs.

Analysis #2

For the PUSCH, the antenna port indication (antenna port field) in DCI format 0_1/0_2 may indicate the number of CDM groups>2 for DMRS configuration type 1, and indicate the number of CDM groups>3 for DMRS configuration type 2.

The existing antenna port tables can only indicate the number of CDM groups≤2 for DMRS configuration type 1, and can only indicate the number of CDM groups≤3 for DMRS configuration type 2.

Values of the antenna port indication are associated with the number of DMRS CDM groups (the number of DMRS CDM groups without data) and the DMRS port indexes in the existing antenna port tables for a combination of the DMRS configuration type (dmrs-Type), the DMRS maximum length (maxLength, the maximum number of DMRS symbols), and the rank. For DMRS configuration type 1 and the DMRS maximum length=1, FIG. 17 shows an example of existing antenna port tables for the rank=1, 2, 3, 4. For DMRS configuration type 1 and the DMRS maximum length=2, FIG. 18 and FIG. 19 show examples of existing antenna port tables for the rank=1, 2, 3, 4. For DMRS configuration type 2 and the DMRS maximum length=1, FIG. 20 and FIG. 21 show examples of existing antenna port tables for the rank=1, 2, 3, 4. For DMRS configuration type 2 and the DMRS maximum length=2, FIG. 22, FIG. 23, and FIG. 24 show examples of existing antenna port tables for the rank=1, 2, 3, 4.

The UE may receive DCI (DCI format) including resource assignment of the PUSCH and values of the antenna port indication (antenna port field), and control transmission of the DMRS, based on association between the values, the number of CDM groups, and the DMRS ports.

Enhancement of the antenna port indication for the PUSCH may conform to one of the following directions #2-1 and #2-2.

——Direction #2-1

For the following cases 1 to 4, new antenna port tables may be defined (embodiments #3 to #7).

- [Case 1] DMRS configuration type 1, the DMRS maximum length=1, the number of ports=8, and the rank=1/2/3/4
- [Case 2] DMRS configuration type 1, the DMRS maximum length=2, the number of ports=16, and the rank=1/2/3/4
- [Case 3] DMRS configuration type 2, the DMRS maximum length=1, the number of ports=12, and the rank=1/2/3/4
- [Case 4] DMRS configuration type 2, the DMRS maximum length=2, the number of ports=24, and the rank=1/2/3/4

Different options of embodiment #1 describe different CDM grouping orders/methods. For different CDM grouping methods, the DMRS port indexes in each CDM group may be different, and the antenna port tables may be different. For the sake of simplicity and in order to enable application to all of the CDM grouping methods, in each of the embodiments described below, $i_{x,\ y}$(or i_x, y) may represent a y-th DMRS port index in an x-th CDM group (CDM group #(x−1)). Here, x>=1 and y>=1 may hold.

For example, in the example of the DMRS port table (FIG. 5) of choice 1 of option 1 of embodiment #described above, $i_{1,1}$=1000, $i_{1,2}$=1001, $i_1$,3=1004, $i_{1,4}$=1005, $i_{2,1}$=1002, and $i_{2,2}$=1003, . . . may hold.

For example, in the example of the DMRS port table (FIG. 7) of choice 2 of option 1 of embodiment #described above, $i_{1,1}$=1000, $i_{1,2}$=1001, $i_1$,3=1008, $i_{1,4}$=1009, $i_{2,1}$=1002, and $i_{2,2}$=1003, . . . may hold.

Embodiment #3

The embodiment relates to a new antenna port table for case 1 of the PUSCH.

DMRS configuration type 1, the DMRS maximum length=1, and the number of enhanced ports (the number of DMRS ports)=8 may hold (case 1).

<<Assumption A>>

Option 1 of embodiment #1 may be applied to two CDM groups for eight ports. Four existing antenna port tables for case 1 may be reused for case 1 of the number of enhanced ports. A field size (the number of bits) of the antenna port indication may be increased to 4 bits.

<<Assumption B>>

Option 2 of embodiment #1 may be applied to four CDM groups for eight ports.

The field size (the number of bits) of the antenna port indication may be increased so that the new antenna port table includes entries with the number of DMRS CDM groups without data {3, 4}. The number of DMRS CDM groups without data 1, 2, 3, 4 may indicate the CDM groups {0}, {0, 1}, {0, 1, 2}, {0, 1, 2, 3}, respectively. The antenna port table may be defined to include all or a part of entries of examples of new antenna port tables below.

- An example of a new antenna port table with DMRS configuration type 1, the DMRS maximum length=1, the number of enhanced ports, and the rank=1 (FIG. 25)
- An example of a new antenna port table with DMRS configuration type 1, the DMRS maximum length=1, the number of enhanced ports, and the rank=2 (FIG. 26)
- An example of a new antenna port table with DMRS configuration type 1, the DMRS maximum length=1, the number of enhanced ports, and the rank=3 (a first table of FIG. 27)
- An example of a new antenna port table with DMRS configuration type 1, the DMRS maximum length=1, the number of enhanced ports, and the rank=4 (a second table of FIG. 27)

The new antenna port table may include assumption of the CDM grouping order/method of option 2 of embodiment #1. $i_{1,1}$=0, $i_{1,2}$=1, $i_{2,1=2}$, $i_{2,2}$=3, $i_{3,1}$=4, $i_{3,2}$=5, $i_{4,1}$=6, and $i_{4,2}$=7 may hold. The antenna port table may be defined to include all or a part of entries of examples of new antenna port tables below.

- An example of a new antenna port table with DMRS configuration type 1, the DMRS maximum length=1, the number of enhanced ports, and the rank=1 (FIG. 28)
- An example of a new antenna port table with DMRS configuration type 1, the DMRS maximum length=1, the number of enhanced ports, and the rank=2 (FIG. 29)
- An example of a new antenna port table with DMRS configuration type 1, the DMRS maximum length=1, the number of enhanced ports, and the rank=3 (a first table of FIG. 30)
- An example of a new antenna port table with DMRS configuration type 1, the DMRS maximum length=1, the number of enhanced ports, and the rank=4 (a second table of FIG. 30)

According to the embodiment, the antenna port indication in case 1 of the PUSCH can be appropriately performed.

Embodiment #4

The embodiment relates to a new antenna port table for case 2 of the PUSCH.

DMRS configuration type 1, the DMRS maximum length=2, and the number of enhanced ports (the number of DMRS ports)=16 may hold (case 2).

The field size (the number of bits) of the antenna port indication may be increased so that the new antenna port table includes entries with the number of DMRS CDM groups without data {3, 4}. The number of DMRS CDM groups without data 1, 2, 3, 4 may indicate the CDM groups {0}, {0, 1}, {0, 1, 2}, {0, 1, 2, 3}, respectively. The antenna port table may be defined to include all or a part of entries of examples of new antenna port tables below.

- An example of a new antenna port table with DMRS configuration type 1, the DMRS maximum length=2, the number of enhanced ports, and the rank=1 (FIG. 31)
- An example of a new antenna port table with DMRS configuration type 1, the DMRS maximum length=2, the number of enhanced ports, and the rank=2 (FIG. 32)

An example of a new antenna port table with DMRS configuration type 1, the DMRS maximum length=2, the number of enhanced ports, and the rank=3 (a first table of FIG. 33)

An example of a new antenna port table with DMRS configuration type 1, the DMRS maximum length=2, the number of enhanced ports, and the rank=4 (a second table of FIG. 33)

In these examples, the number of front-loaded (DMRS) symbols may be 1 or 2. Some rows may be repeated using two values (of the number of front-loaded symbols). For example, four rows (rows of values from 1 to 4) with the number of CDM groups=2 in the example of the first antenna port table of FIG. 33 may be, as shown in the example of FIG. 34, enhanced to eight rows through repetition using another number of front-loaded symbols.

According to the embodiment, the antenna port indication in case 2 of the PUSCH can be appropriately performed.

Embodiment #5

The embodiment relates to a new antenna port table for case 3 of the PUSCH.

DMRS configuration type 2, the DMRS maximum length=1, and the number of enhanced ports (the number of DMRS ports)=12 may hold (case 3).

<<Assumption A>>

Option 1 of embodiment #1 may be applied to three CDM groups for 12 ports. Four existing antenna port tables for case 1 may be reused for case 3 of the number of enhanced ports. A field size (the number of bits) of the antenna port indication may be increased to 5 bits.

<<Assumption B>>

Option 2 of embodiment #1 may be applied to six CDM groups for 12 ports.

The field size (the number of bits) of the antenna port indication may be increased so that the new antenna port table includes entries with the number of DMRS CDM groups without data {4, 5, 6}. The number of DMRS CDM groups without data 1, 2, 3, 4, 5, 6 may indicate the CDM groups {0}, {0, 1}, {0, 1, 2}, {0, 1, 2, 3}, {0, 1, 2, 3, 4}, {0, 1, 2, 3, 4, 5}, respectively. The antenna port table may be defined to include all or a part of entries of examples of new antenna port tables below.

An example of a new antenna port table with DMRS configuration type 2, the DMRS maximum length=1, the number of enhanced ports, and the rank=1 (FIG. 35)

An example of a new antenna port table with DMRS configuration type 2, the DMRS maximum length=1, the number of enhanced ports, and the rank=2 (FIG. 36)

An example of a new antenna port table with DMRS configuration type 2, the DMRS maximum length=1, the number of enhanced ports, and the rank=3 (a first table of FIG. 37)

An example of a new antenna port table with DMRS configuration type 2, the DMRS maximum length=1, the number of enhanced ports, and the rank=4 (a second table of FIG. 37)

According to the embodiment, the antenna port indication in case 3 of the PUSCH can be appropriately performed.

Embodiment #6

The embodiment relates to a new antenna port table for case 4 of the PUSCH.

DMRS configuration type 1, the DMRS maximum length=2, and the number of enhanced ports (the number of DMRS ports)=24 may hold (case 4).

The field size (the number of bits) of the antenna port indication may be increased so that the new antenna port table includes entries with the number of DMRS CDM groups without data {4, 5, 6}. The number of DMRS CDM groups without data 1, 2, 3, 4 may indicate the CDM groups {0}, {0, 1}, {0, 1, 2}, {0, 1, 2, 3}, {0, 1, 2, 3, 4}, {0, 1, 2, 3, 4, 5}, respectively. The antenna port table may be defined to include all or a part of entries of examples of new antenna port tables below.

An example of a new antenna port table with DMRS configuration type 2, the DMRS maximum length=2, the number of enhanced ports, and the rank=1 (FIG. 38)

An example of a new antenna port table with DMRS configuration type 2, the DMRS maximum length=2, the number of enhanced ports, and the rank=2 (FIG. 39)

An example of a new antenna port table with DMRS configuration type 2, the DMRS maximum length=2, the number of enhanced ports, and the rank=3 (FIG. 40)

An example of a new antenna port table with DMRS configuration type 2, the DMRS maximum length=2, the number of enhanced ports, and the rank=4 (FIG. 41)

In these examples, the number of front-loaded (DMRS) symbols may be 1 or 2. Some rows may be repeated using two values (of the number of front-loaded symbols).

According to the embodiment, the antenna port indication in case 4 of the PUSCH can be appropriately performed.

Embodiment #7

The embodiment relates to a size (the number of rows, the field size, the number of bits) of a new antenna port table/antenna port indication for the PUSCH.

A new antenna port table including a part of entries of the antenna port tables of embodiment #3-6 may be defined.

Embodiment #7A

The new antenna port table need not include all of the rows for all of the port indexes in each CDM group for certain values of "the number of DMRS CDM groups without data". The new antenna port table may only include at least one port index in each CDM group.

In the example of the antenna port table with DMRS configuration type 1, the DMRS maximum length=2, the number of enhanced ports, and the rank=1 of embodiment #4 (FIG. 31), the rows of the values {5, 6, 7, 9, 10, 11, 13, 14, 15, 17, 18, 19, 21, 22, 23, 25, 26, 27, 29, 30, 31, 33, 34, 35, 37, 38, 39, . . . } of the antenna port indication may be deleted. The field size of the antenna port indication may be reduced by maintaining one DMRS port per CDM group.

Embodiment #7B

The new antenna port table need not include rows with port indexes across a plurality of CDM groups for certain values of "the number of DMRS CDM groups without data". (When the rank is not larger than the number of port indexes per CDM group) the new antenna port table only needs to maintain rows with all of the port indexes in one CDM group.

In the example of the antenna port table with DMRS configuration type 1, the DMRS maximum length=2, the number of enhanced ports, and the rank=2 of embodiment #4 (FIG. 32), the rows of the values {5, 6, 14, 15, 24, 25, 26, . . . } of the antenna port indication may be deleted. The field size of the antenna port indication may be reduced by maintaining one DMRS port per CDM group.

Embodiment #7C

When the number of enhanced ports is configured, a new field indicating whether or not the number of PDSCHs/PUSCHs to be scheduled exceeds a specific number may be added in the DCI. The specific number may be an existing number (supported number) of CDM groups for a configured case, or may be an existing maximum number (supported number) of DMRS ports for a configured case. A fact that the number of PDSCHs/PUSCHs to be scheduled exceeds the specific number may mean that the number of users to be scheduled in MU is larger than the number of users supported in Rel. 15.

When the new field indicates that the number of PDSCHs/PUSCHs to be scheduled does not exceed the specific number, the existing antenna port table may be used for the antenna port indication.

When the new field indicates that the number of PDSCHs/PUSCHs to be scheduled exceeds the specific number, the new antenna port table may be used for the antenna port indication. In the method, the new antenna port table may include only entries with a larger number of CDM groups than the existing number or a larger number of DMRS ports than the existing number. For example, the number of DMRS ports>4 may hold for case 1, the number of DMRS ports>8 may hold for case 2, the number of DMRS ports>6 may hold for case 3, and the number of DMRS ports>12 may hold for case 4.

In the example of the antenna port table with DMRS configuration type 1, the DMRS maximum length=2, the number of enhanced ports, and the rank=1 of embodiment #4 (FIG. 31), the rows of values from 0 to 11 of the antenna port indication may be deleted.

In the example of the antenna port table with DMRS configuration type 1, the DMRS maximum length=2, the number of enhanced ports, and the rank=2 of embodiment #4 (FIG. 32), the rows of values from 0 to 7 of the antenna port indication may be deleted.

In order to reduce the size of the new antenna port table (the field size of the antenna port indication), at least two of embodiments #7A, #7B, and #7C may be combined.

According to the embodiment, the size of the antenna port indication/antenna port table can be reduced.

——Direction #2-2

The UE may reuse the existing antenna port table for each list, depending on new implementation using a new configuration/indication (embodiment #8).

Embodiment #8

The embodiment relates to reuse of the existing antenna port table for the PUSCH.

The embodiment may assume that embodiment #0 is used.

A new field (list indication field) for indicating at least one of whether one list is applied or one list is applied to a PUSCH to be scheduled (the number of lists, the number of lists for rate matching) and a list index may be added to DCI format 0_1/0_2 (for scheduling the PUSCH). For the antenna port indication, the existing antenna port table may be reused for each list.

When the new field indicates one list, the existing antenna port table and the DMRS port indexes for the antenna port indication may be used. By default, the one list may be a first list. When the new field indicates one list, the UE need not transmit data on REs indicated by DMRS REs in the first list (for the PUSCH, rate matching may be performed around the REs indicated by the DMRS REs in the first list). When the antenna port field indicates a row with the number of CDM groups x, a fact that data is not transmitted on the REs indicated by the DMRS REs in the first list may mean rate matching in all of the DMRS ports in x CDM groups in the first list.

Whether or not data is mapped to the REs not used for the DMRS may be indicated by DCI (for scheduling the PUSCH/PDSCH) (similar to "the number of CDM groups without data" in Rel. 15). The number of CDM groups without data may be configured with higher layer signaling.

The number of lists may be configured with higher layer signaling. Other parameters, such as a maximum number of DMRS ports and a maximum number of DMRS CDM groups, may be configured with higher layer signaling, and the UE may determine the number of lists, based on the parameters.

When one list is indicated, it may mean that a user to be multiplexed to the UE scheduled with the PUSCH/PDSCH occupies only the DMRS ports in the one list (by default, list #1). The UE may perform rate matching around the DMRS REs in the one list. When two lists are indicated, it may mean that a user to be multiplexed to the UE scheduled with the PUSCH/PDSCH occupies the DMRS ports in the two lists. The UE may perform rate matching around the DMRS REs in the two lists.

When the new field indicates one list, the new field may include a list index. When the new field indicates one list and one list index, the one list may be a list corresponding to the list index.

When the new field indicates two lists (lists #1 and #2), the new field may include a list index.

When the second list is indicated by the list index, the indicated DMRS port index j may be regarded as the DMRS port j+P in the antenna port table. Here, P may be a maximum number of DMRS ports per list (maximum number). The number of DMRS CDM groups without data {1, 2, 3} may indicate the CDM groups in the second list.

When the first list is indicated by the list index, the indicated DMRS port index j may be the DMRS port j in the antenna port table. The number of DMRS CDM groups without data {1, 2, 3} may indicate the CDM groups in the first list.

When the new field indicates two lists, the UE need not transmit data on the REs indicated by the DMRS REs in the two lists. The UE may conform to one of the following rate matchings 1 and 2.

[Rate Matching 1]

The UE performs rate matching around the DMRS REs in all of the DMRS ports in the two lists.

[Rate Matching 2]

The UE performs rate matching around the DMRS REs in all of the DMRS ports in the first list and certain DMRS ports in the second list. An additional field ("number of CDM groups" field) for indicating the number of CDM groups in the second list for rate matching may be added (to the DCI). The additional field may be applied only in a case in which DMRS RE positions of j-th ports in two lists are different. When the second list is indicated by the list index, the additional field may not be required, and the UE may conform to the antenna port field for the number of CDM groups for rate matching. When the first list is indicated by the list index, the additional field may be enabled, and the UE may conform to the number of CDM groups indicated for rate matching.

For example, values of the new field may indicate the following.

Value 00 may indicate one list for rate matching and the antenna port indication for the DMRS (in default list #1).

Value 01 may indicate two lists for rate matching and the antenna port indication in list #1 for the DMRS.

Value 10 may indicate two lists for rate matching and the antenna port indication in list #2 for the DMRS.

Value 11 may be reserved.

As a variation, even when only one list is indicated, the list index may be required. For example, values of the new field may indicate the following.

Value 00 may indicate one list for rate matching and the antenna port indication in list #1 for the DMRS.

Value 01 may indicate one list for rate matching and the antenna port indication in list #2 for the DMRS.

Value 10 may indicate two lists for rate matching and the antenna port indication in list #1 for the DMRS.

Value 11 may indicate two lists for rate matching and the antenna port indication in list #2 for the DMRS.

In embodiments #3 to #7, some new entries with the DMRS port indexes in lists #1 and #2 may be introduced. This allows for more flexible indications.

For example, in the example of the existing antenna port table (FIG. 17) for the PUSCH, DMRS configuration type 1, the DMRS maximum length=1, and the rank=1, interpretation of the existing antenna port table may conform to the following.

In list #1, the number of DMRS CDM groups without data 1, 2 may indicate the CDM groups {0}, {0, 1}, respectively.

In list #2, the number of DMRS CDM groups without data 1, 2 may indicate the CDM groups {2}, {2, 3} in list #2, respectively.

If two lists are indicated and list #2 is indicated, the port index j may mean the j-th port in list #2. In case 1, regarding the port index j, the index j+P in list #2 may be j+4. For list #2, the DMRS ports 0, 1, 2, 3 may be interpreted as the DMRS ports 4, 5, 6, 7, respectively.

According to the embodiment, the DMRS ports can be increased without changing the antenna port table.

—Analysis #3

(Similarly to the PUSCH), for the PDSCH, the antenna port indication in DCI format 1_1/1_2 may indicate the number of CDM groups>2 for DMRS configuration type 1, and indicate the number of CDM groups>3 for DMRS configuration type 2.

The existing antenna port tables can only indicate the number of CDM groups≤2 for DMRS configuration type 1, and can only indicate the number of CDM groups≤3 for DMRS configuration type 2. FIG. 42 shows an example of an existing antenna port table for the PDSCH, the DMRS configuration type=1, and the DMRS maximum length=1. FIG. 43 shows an example of an existing antenna port table for the PDSCH, the DMRS configuration type=1, and the DMRS maximum length=2. FIG. 44 shows an example of an existing antenna port table for the PDSCH, the DMRS configuration type=2, and the DMRS maximum length=1. FIG. 45 shows an example of an existing antenna port table for the PDSCH, the DMRS configuration type=2, and the DMRS maximum length=2.

Existing antenna port indications in DCI format 1_1/1_2 conform to the existing DMRS port tables. The number of DMRS CDM groups without data 1, 2, 3 may indicate the CDM groups {0}, {0, 1}, {0, 1, 2}, respectively.

The UE may receive DCI (DCI format) including resource assignment of the PDSCH and values of the antenna port indication (antenna port field), and control transmission of the DMRS, based on association between the values, the number of CDM groups, and the DMRS ports.

Enhancement of the antenna port indication for the PDSCH may conform to one of the following directions #3-1 and #3-2.

——Direction #3-1

For the following cases 1 to 4, new antenna port tables may be defined (embodiment #9).

[Case 1] DMRS configuration type 1, the DMRS maximum length=1, and the number of ports=8

[Case 2] DMRS configuration type 1, the DMRS maximum length=2, and the number of ports=16

[Case 3] DMRS configuration type 2, the DMRS maximum length=1, and the number of ports=12

[Case 4] DMRS configuration type 2, the DMRS maximum length=2, and the number of ports=24

Embodiment #9

The embodiment relates to a new antenna port table for the PDSCH.

Similarly to embodiment #3-6, a new antenna port table for the PDSCH may be defined.

Similarly to embodiment #7, a new antenna port table including a part of entries in the antenna port table for the PDSCH based on embodiment #3-6 may be defined.

<<Case 1>>

DMRS configuration type 1, the DMRS maximum length=1, and the number of enhanced ports (the number of DMRS ports)=8 may hold (case 1).

<<Assumption A>>

Option 1 of embodiment #1 may be applied to two CDM groups for eight ports. Four existing antenna port tables for case 1 may be reused for case 1 of the number of enhanced ports. A field size (the number of bits) of the antenna port indication may be increased to 5 bits.

<<Assumption B>>

Option 2 of embodiment #1 may be applied to four CDM groups for eight ports.

The field size (the number of bits) of the antenna port indication may be increased so that the new antenna port table includes entries with the number of DMRS CDM groups without data {3, 4}. The number of DMRS CDM groups without data 1, 2, 3, 4 may indicate the CDM groups {0}, {0, 1}, {0, 1, 2}, {0, 1, 2, 3}, respectively. The antenna port table may be defined to include all or a part of entries of an example of a new antenna port table (a case of DMRS configuration type 1, the DMRS maximum length=1, and the number of enhanced ports) of FIG. 46.

<<Case 2>>

DMRS configuration type 1, the DMRS maximum length=2, and the number of enhanced ports (the number of DMRS ports)=16 may hold (case 2).

The field size (the number of bits) of the antenna port indication may be increased so that the new antenna port table includes entries with the number of DMRS CDM groups without data {3, 4}. The number of DMRS CDM groups without data 1, 2, 3, 4 may indicate the CDM groups {0}, {0, 1}, {0, 1, 2}, {0, 1, 2, 3}, respectively. The antenna port table may be defined to include all or a part of entries of an example of a new antenna port table (a case of DMRS configuration type 1, the DMRS maximum length=2, and the number of enhanced ports) combining a first part of FIG. 47, a second part of FIG. 48, and a third part of FIG. 49.

The number of front-loaded (DMRS) symbols may be 1 or 2. A certain row may be repeated using two rows in which only the number of front-loaded symbols is different.

Although a new antenna port table for case 3/4 is not shown because of its large size, a concept similar to that of case 1/2 may be adopted.

According to the embodiment, the antenna port indication for the PDSCH can be appropriately performed.

——Direction #3-2

The UE may reuse the existing antenna port table for each list, depending on new implementation using a new configuration/indication (embodiment #10).

Embodiment #10

The embodiment relates to reuse of the existing antenna port table for the PDSCH.

Similarly to embodiment #8, the existing antenna port tables for the PDSCH may be reused.

The embodiment may assume that embodiment #0 is used.

A new field (list indication field) for indicating at least one of whether one list is applied or one list is applied to a PDSCH to be scheduled (the number of lists, the number of lists for rate matching) and a list index may be added to DCI format 0_1/0_2 (for scheduling the PDSCH). For the antenna port indication, the existing antenna port table may be reused for each list.

When the new field indicates one list, the existing antenna port table and the DMRS port indexes for the antenna port indication may be used. By default, the one list may be a first list. When the new field indicates one list, the UE need not receive data on REs indicated by DMRS REs in the first list (for the PDSCH, rate matching may be performed around the REs indicated by the DMRS REs in the first list). When the antenna port field indicates a row with the number of CDM groups x, a fact that data is not received on the REs indicated by the DMRS REs in the first list may mean rate matching in all of the DMRS ports in x CDM groups in the first list.

Whether or not data is mapped to the REs not used for the DMRS may be indicated by DCI (for scheduling the PUSCH/PDSCH) (similar to “the number of CDM groups without data” in Rel. 15). The number of CDM groups without data may be configured with higher layer signaling.

The number of lists may be configured with higher layer signaling. Other parameters, such as a maximum number of DMRS ports and a maximum number of DMRS CDM groups, may be configured with higher layer signaling, and the UE may determine the number of lists, based on the parameters.

When one list is indicated, it may mean that a user to be multiplexed to the UE scheduled with the PUSCH/PDSCH occupies only the DMRS ports in the one list (by default, list #1). The UE may perform rate matching around the DMRS REs in the one list. When two lists are indicated, it may mean that a user to be multiplexed to the UE scheduled with the PUSCH/PDSCH occupies the DMRS ports in the two lists. The UE may perform rate matching around the DMRS REs in the two lists.

When the new field indicates one list, the new field may include a list index. When the new field indicates one list and one list index, the one list may be a list corresponding to the list index.

When the new field indicates two lists (lists #1 and #2), the new field may include a list index.

When the second list is indicated by the list index, the indicated DMRS port index j may be regarded as the DMRS port j+P in the antenna port table. Here, P may be a maximum number of DMRS ports per list (maximum number). The number of DMRS CDM groups without data {1, 2, 3} may indicate the CDM groups in the second list.

When the first list is indicated by the list index, the indicated DMRS port index j may be the DMRS port j in the antenna port table. The number of DMRS CDM groups without data {1, 2, 3} may indicate the CDM groups in the first list.

When the new field indicates two lists, the UE need not receive data on the REs indicated by the DMRS REs in the two lists. The UE may conform to one of the following rate matchings 1 and 2.

[Rate Matching 1]

The UE performs rate matching around the DMRS REs in all of the DMRS ports in the two lists.

[Rate Matching 2]

The UE performs rate matching around the DMRS REs in all of the DMRS ports in the first list and certain DMRS ports in the second list. An additional field (“number of CDM groups” field) for indicating the number of CDM groups in the second list for rate matching may be added (to the DCI). The additional field may be applied only in a case in which DMRS RE positions of j-th ports in two lists are different. When the second list is indicated by the list index, the additional field may not be required, and the UE may conform to the antenna port field for the number of CDM groups for rate matching. When the first list is indicated by the list index, the additional field may be enabled, and the UE may conform to the number of CDM groups indicated for rate matching.

For example, values of the new field may indicate the following.

- Value 00 may indicate one list for rate matching and the antenna port indication for the DMRS (in default list #1).
- Value 01 may indicate two lists for rate matching and the antenna port indication in list #1 for the DMRS.
- Value 10 may indicate two lists for rate matching and the antenna port indication in list #2 for the DMRS.
- Value 11 may be reserved.

As a variation, even when only one list is indicated, the list index may be required. For example, values of the new field may indicate the following.

- Value 00 may indicate one list for rate matching and the antenna port indication in list #1 for the DMRS.
- Value 01 may indicate one list for rate matching and the antenna port indication in list #2 for the DMRS.
- Value 10 may indicate two lists for rate matching and the antenna port indication in list #1 for the DMRS.
- Value 11 may indicate two lists for rate matching and the antenna port indication in list #2 for the DMRS.

In embodiment #9, some new entries with the DMRS port indexes in lists #1 and #2 may be introduced. This allows for more flexible indications.

For example, in the example of the existing antenna port table (FIG. 43) for the PDSCH, DMRS configuration type 1, and the DMRS maximum length=1, interpretation of the existing antenna port table may conform to the following.

- In list #1, the number of DMRS CDM groups without data 1, 2 may indicate the CDM groups {0}, {0, 1}, respectively.

In list #2, the number of DMRS CDM groups without data 1, 2 may indicate the CDM groups {2}, {2, 3} in list #2, respectively.

If two lists are indicated and list #2 is indicated, the port index j may mean the j-th port in list #2. In case 2, regarding the port index j, the index j+P in list #2 may be j+8. For list #2, the DMRS ports 0, 1, 2, 3 may be interpreted as the DMRS ports 4, 5, 6, 7, respectively.

According to the embodiment, the DMRS ports can be increased without changing the antenna port table.

—Analysis #4

The number of DMRS ports per CDM group may be increased, without the number of DMRS CDM groups being increased.

How mapping between the DMRS ports and the CDM groups is performed poses a problem. In the embodiments described below, use of existing mapping/order to the extent possible is taken into consideration.

How to use the existing antenna port tables/existing DMRS port tables for the antenna port indication for the PDSCH/PUSCH poses a problem. In the embodiments described below, use of the existing antenna port tables/existing DMRS port tables to the extent possible is taken into consideration.

The UE may receive a configuration of the DMRS, and control transmission and reception of the DMRS, based on one or more associations between a plurality of CDM groups and a plurality of DMRS ports and the configuration. The number of DMRS ports for DMRS configuration type 1 may be larger than 8, and the number of DMRS ports for DMRS configuration type 2 may be larger than 12.

Embodiment #11

The embodiment relates to mapping between the CDM groups and the DMRS ports.

A new concept of CDM group subsets (group subsets) may be introduced under the CDM groups. The number of CDM groups and the CDM group order for each CDM group subset may conform to the existing DMRS port tables. The CDM group subsets may support at least one of the following case 1 to case 4.

[Case 1]

Eight ports may be available. Two CDM groups may be available. Two group subsets may be present for each CDM group. Four DMRS ports may correspond to each CDM group. Each of group subsets #1 and #2 may correspond to the CDM groups {0, 1}.

[Case 2]

16 ports may be available. Two CDM groups may be available. Two group subsets may be present for each CDM group. Eight DMRS ports may correspond to each CDM group. Each of group subsets #1 and #2 may correspond to the CDM groups {0, 1}.

[Case 3]

12 ports may be available. Three CDM groups may be available. Two group subsets may be present for each CDM group. Four DMRS ports may correspond to each CDM group. Each of group subsets #1 and #2 may correspond to the CDM groups {0, 1, 2}.

[Case 4]

24 ports may be available. Three CDM groups may be available. Two group subsets may be present for each CDM group. Eight DMRS ports may correspond to each CDM group. Each of group subsets #1 and #2 may correspond to the CDM groups {0, 1, 2}.

For each group subset, order of the CDM groups of the existing DMRS port tables may be reused. For the second group subset, a DMRS port index j in the DMRS port table may mean j+P. Here, P may be the number of DMRS ports in the group subset (the maximum number of DMRS ports in the group subset). For the first group subset, the DMRS port index j in the DMRS port table may mean j.

FIG. 50 shows an example of the group subsets for case 1. In the DMRS port table, the DMRS ports {1000, 1001, 1002, 1003}correspond to the CDM groups {0, 0, 1, 1}, respectively. Mapping for group subset #1 is the same as that of the DMRS port table. Regarding actual mapping for group subset #2, P=4 is applied to the DMRS port table, and accordingly the DMRS ports j+P={1004, 1005, 1006, 1007}correspond to the CDM groups {0, 0, 1, 1}, respectively.

FIG. 51 shows an example of the group subsets for case 2. In the DMRS port table, the DMRS ports {1000, 1001, 1002, 1003, 1004, 1005, 1006, 1007}correspond to the CDM groups {0, 0, 1, 1, 0, 0, 1, 1}, respectively. Mapping for group subset #1 is the same as that of the DMRS port table. Regarding actual mapping for group subset #2, P=8 is applied to the DMRS port table, and accordingly the DMRS ports j+P={1008, 1009, 1010, 1011, 1012, 1013, 1014, 1015}correspond to the CDM groups {0, 0, 1, 1, 0, 0, 1, 1}, respectively.

FIG. 52 shows an example of the group subsets for case 3. In the DMRS port table, the DMRS ports {1000, 1001, 1002, 1003, 1004, 1005}correspond to the CDM groups {0, 0, 1, 1, 2, 2}, respectively. Mapping for group subset #1 is the same as that of the DMRS port table. Regarding actual mapping for group subset #2, P=6 is applied to the DMRS port table, and accordingly the DMRS ports j+P={1006, 1007, 1008, 1009, 1010, 1011}correspond to the CDM groups {0, 0, 1, 1, 2, 2}, respectively.

FIG. 53 shows an example of the group subsets for case 4. In the DMRS port table, the DMRS ports {1000, 1001, 1002, 1003, 1004, 1005, 1006, 1007, 1008, 1009, 1010, 1011}correspond to the CDM groups {0, 0, 1, 1, 2, 2, 0, 0, 1, 1, 2, 2}, respectively. Mapping for group subset #1 is the same as that of the DMRS port table. Regarding actual mapping for group subset #2, P=12 is applied to the DMRS port table, and accordingly the DMRS ports j+P={1012, 1013, 1014, 1015, 1016, 1017, 1018, 1019, 1020, 1021, 1022, 1023}correspond to the CDM groups {0, 0, 1, 1, 2, 2, 0, 0, 1, 1, 2, 2}, respectively.

According to the embodiment, the DMRS ports can be appropriately increased.

Embodiment #12

The embodiment relates to reuse of the existing antenna port table.

A new field (group subset indication field) for indicating at least one of whether one group subset is applied or one group subset is applied to a PUSCH/PDSCH to be scheduled (the number of group subsets, the number of group subsets for rate matching) and a group subset index may be added to DCI format 0_1/0_2/1_1/1_2 (for scheduling the PUSCH/PDSCH). For the antenna port indication, the existing antenna port table may be reused for each group subset.

When the new field indicates one group subset, the existing antenna port table and the DMRS port indexes for the antenna port indication may be used. By default, the one group subset may be a first group subset. When the new field indicates one group subset, the UE need not transmit/receive data on REs indicated by DMRS REs in the first group subset (for the PUSCH/PDSCH, rate matching may be performed around the REs indicated by the DMRS REs in the first group subset). When the antenna port field indicates a row with the number of CDM groups x, a fact that data is not transmitted/received on the REs indicated by the DMRS REs in the first group subset may mean rate matching in all of the DMRS ports in x CDM groups in the first group subset.

Whether or not data is mapped to the REs not used for the DMRS may be indicated by DCI (for scheduling the PUSCH/PDSCH) (similar to "the number of CDM groups without data" in Rel. 15). The number of CDM groups without data may be configured with higher layer signaling.

The number of group subsets may be configured with higher layer signaling. Other parameters, such as a maximum number of DMRS ports and a maximum number of DMRS CDM groups, may be configured with higher layer signaling, and the UE may determine the number of group subsets, based on the parameters.

When one group subset is indicated, it may mean that a user to be multiplexed to the UE scheduled with the PUSCH/PDSCH occupies only the DMRS ports in the one group subset (by default, group subset #1). The UE may perform rate matching around the DMRS REs in the one group subset. When two group subsets are indicated, it may mean that a user to be multiplexed to the UE scheduled with the PUSCH/PDSCH occupies the DMRS ports in the two group subsets. The UE may perform rate matching around the DMRS REs in the two group subsets.

When the new field indicates one group subset, the new field may include a group subset index. When the new field indicates one group subset and a group subset index, the one group subset may be a group subset corresponding to the group subset index.

When the new field indicates two group subsets (group subsets #1 and #2), the new field may include a group subset index.

When the second group subset is indicated by the group subset index, the indicated DMRS port index j may be regarded as the DMRS port j+P in the antenna port table. Here, P may be a maximum number of DMRS ports per group subset (maximum number). The number of DMRS CDM groups without data {1, 2, 3} may indicate the CDM groups in the second group subset.

When the first group subset is indicated by the group subset index, the indicated DMRS port index j may be the DMRS port j in the antenna port table. The number of DMRS CDM groups without data {1, 2, 3} may indicate the CDM groups in the first group subset.

When the new field indicates two group subsets, the UE need not transmit/receive data on the REs indicated by the DMRS REs in the two group subsets. The UE may conform to one of the following rate matchings 1 and 2.

[Rate Matching 1]

The UE performs rate matching around the DMRS REs in all of the DMRS ports in the two group subsets.

[Rate Matching 2]

The UE performs rate matching around the DMRS REs in all of the DMRS ports in the first group subset and certain DMRS ports in the second group subset. An additional field ("number of CDM groups" field) for indicating the number of CDM groups in the second group subset for rate matching may be added (to the DCI). The additional field may be applied only in a case in which DMRS RE positions of j-th ports in two group subsets are different. When the second group subset is indicated by the group subset index, the additional field may not be required, and the UE may conform to the antenna port field for the number of CDM groups for rate matching. When the first group subset is indicated by the group subset index, the additional field may be enabled, and the UE may conform to the number of CDM groups indicated for rate matching.

For example, values of the new field may indicate the following.

- Value 00 may indicate one group subset for rate matching and the antenna port indication for the DMRS (in default group subset #1).
- Value 01 may indicate two group subsets for rate matching and the antenna port indication in group subset #1 for the DMRS.
- Value 10 may indicate two group subsets for rate matching and the antenna port indication in group subset #2 for the DMRS.
- Value 11 may be reserved.

As a variation, even when only one group subset is indicated, the group subset index may be required. For example, values of the new field may indicate the following.

- Value 00 may indicate one group subset for rate matching and the antenna port indication in group subset #1 for the DMRS.
- Value 01 may indicate one group subset for rate matching and the antenna port indication in group subset #2 for the DMRS.
- Value 10 may indicate two group subsets for rate matching and the antenna port indication in group subset #1 for the DMRS.
- Value 11 may indicate two group subsets for rate matching and the antenna port indication in group subset #2 for the DMRS.

In embodiments #3 to #7, some new entries with the DMRS port indexes in group subsets #1 and #2 may be introduced. This allows for more flexible indications.

For example, in the example of the existing antenna port table (FIG. 17) for DMRS configuration type 1 and the DMRS maximum length=1, interpretation of the existing antenna port table may conform to the following.

- The number of DMRS CDM groups without data 1, 2 may indicate the CDM groups {0}, {0, 1}, respectively.
- In group subset #1, the CDM group 0 may correspond to the DMRS port indexes {0, 1}, and the CDM group 1 may correspond to the DMRS port indexes {2, 3}.
- In group subset #2, the CDM group 0 may correspond to the DMRS port indexes {4, 5}, and the CDM group 1 may correspond to the DMRS port indexes {6, 7}.
- If two group subsets are indicated and group subset #2 is indicated, the port index j may mean the j-th port in group subset #2. Regarding the port index j, the index j+P in group subset #2 may be j+4. For group subset #2, the DMRS ports 0, 1, 2, 3 may be interpreted as the DMRS ports 4, 5, 6, 7, respectively.

According to the embodiment, the DMRS ports can be increased without changing the antenna port table.

VARIATIONS

The embodiment relates to variations that can be applied to embodiment #8/#10/#12.

In embodiment #8/#10, the j-th DMRS port (port index j) in list #1 and the j-th DMRS port (port index j+P) in list #2 can occupy the same DMRS RS (can be mapped to the same DMRS RS).

In embodiment #12, the j-th DMRS port (port index j) in group subset #1 and the j-th DMRS port (port index j+P) in group subset #2 can occupy the same DMRS RS (can be mapped to the same DMRS RS).

In these states, rate matching in the j-th DMRS port in one list/group subset may mean the same effect as that of rate matching in the j-th DMRS port in two lists/group subsets. Rate matching in all of the DMRS ports in one list/group subset may mean the same effect as that of rate matching in all of the DMRS ports in two lists/group subsets. In this case, the following variations may be applied.

- An indication for one list or two lists (one group subset or two group subsets) for rate matching may be unnecessary.
- A new indication (new field) for indicating a list index/group subset index of the antenna port indication may be introduced. The antenna port indication can be interpreted based on the list index/group subset index.
- When the second list/group subset is indicated, interpretation of the existing table may be similar to that of embodiment #8/#10/#12. In embodiment #8/#10, for the second list, the indicated DMRS port index j in the existing DMRS port table may be regarded as the DMRS port j+P, and the number of CDM groups without data 1, 2, 3 may indicate the CDM groups in the second list. In embodiment #12, for the second group subset, the indicated DMRS port index j in the existing DMRS port table may be regarded as the DMRS port j+P.
- Rate matching may be similar to that of existing specifications. If the antenna port field indicates a row with the number of CDM groups x, it may mean rate matching in all of the DMRS ports in x CDM groups.

OTHER EMBODIMENTS

<<UE Capability Information/Higher Layer Parameter>>

A higher layer parameter (RRC IE)/UE capability corresponding to a function (feature) in each embodiment described above may be defined. The higher layer parameter may indicate whether or not the function is to be enabled. The UE capability may indicate whether or not the UE supports the function.

The UE configured with the higher layer parameter corresponding to the function may perform the function. "The UE not configured with the higher layer parameter corresponding to the function does not perform the function (for example, in conformity to Rel. 15/16)" may be defined.

The UE that reports/transmits the UE capability indicating support of the function may perform the function. "The UE not reporting the UE capability indicating support of the function does not perform the function (for example, in conformity to Rel. 15/16)" may be defined.

When the UE reports/transmits the UE capability indicating support of the function and is configured with the higher layer parameter corresponding to the function, the UE may perform the function. "When the UE does not report/transmit the UE capability indicating support of the function or is not configured with the higher layer parameter corresponding to the function, the UE does not perform the function (for example, in conformity to Rel. 15/16)" may be defined.

Which of the embodiments/options/choices/functions in the plurality of embodiments described above is used may be configured by a higher layer parameter, may be reported by the UE as a UE capability, may be defined in a specification, or may be determined by a reported UE capability and a configuration of a higher layer parameter.

The UE capability may indicate whether or not the UE supports at least one of the following functions.

- A larger number of DMRS ports than the number in existing specifications (Rel. 15/16).
- A larger number of DMRS ports for DMRS configuration type 1 or 2, or both thereof.
- A larger number of DMRS ports for DMRS mapping type A or B, or both thereof.
- A larger number of DMRS ports for the single symbol DMRS, or the single symbol DMRS and the double symbol DMRS. A larger number of DMRS ports for the single symbol DMRS or the double symbol DMRS.

The UE capability may indicate at least one of the following values.

The number of DMRS ports.

According to the UE capability/higher layer parameter described above, the UE can implement the above function while maintaining compatibility with the existing specifications.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 54:
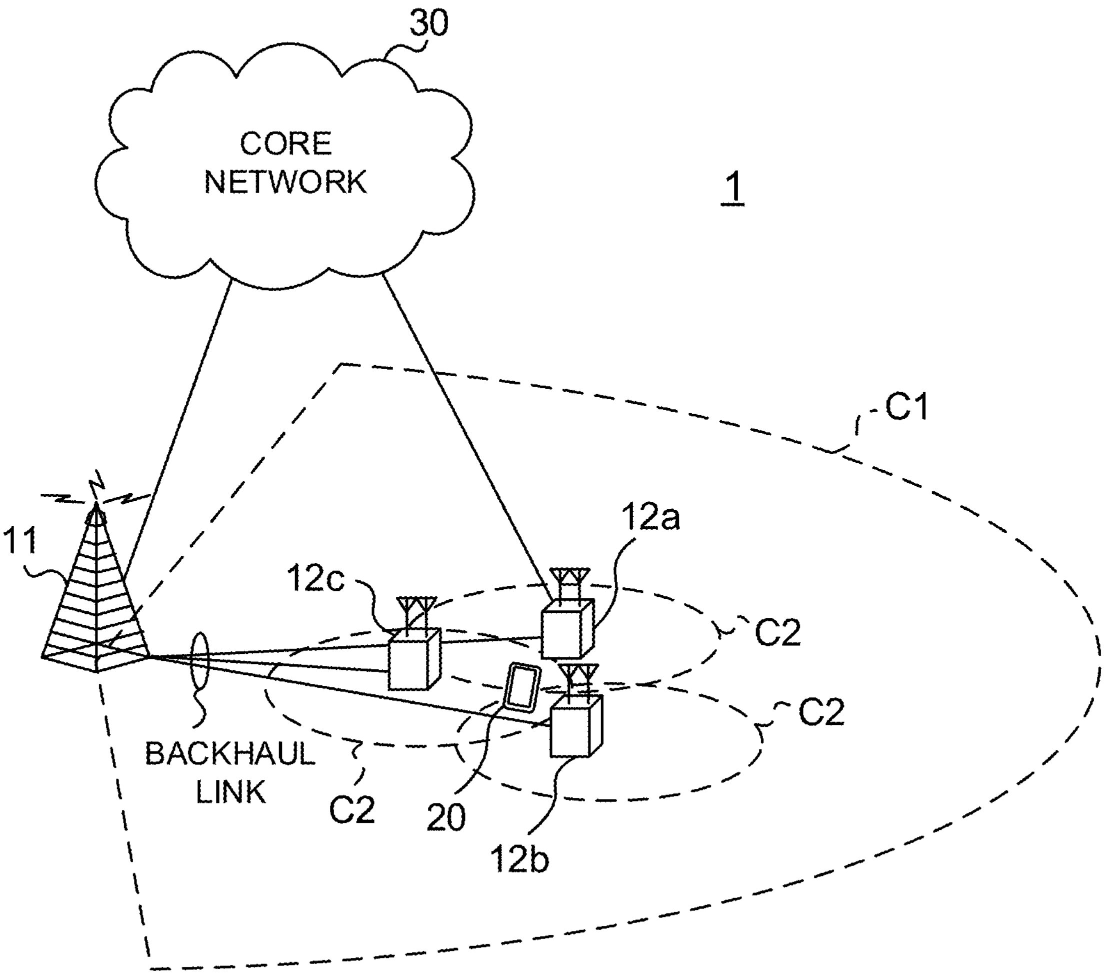
FIG. 54 is a diagram to show an example of a schematic structure of a radio communication system according to one embodiment.

FIG. 54 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12*a* to 12*c*) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 55:
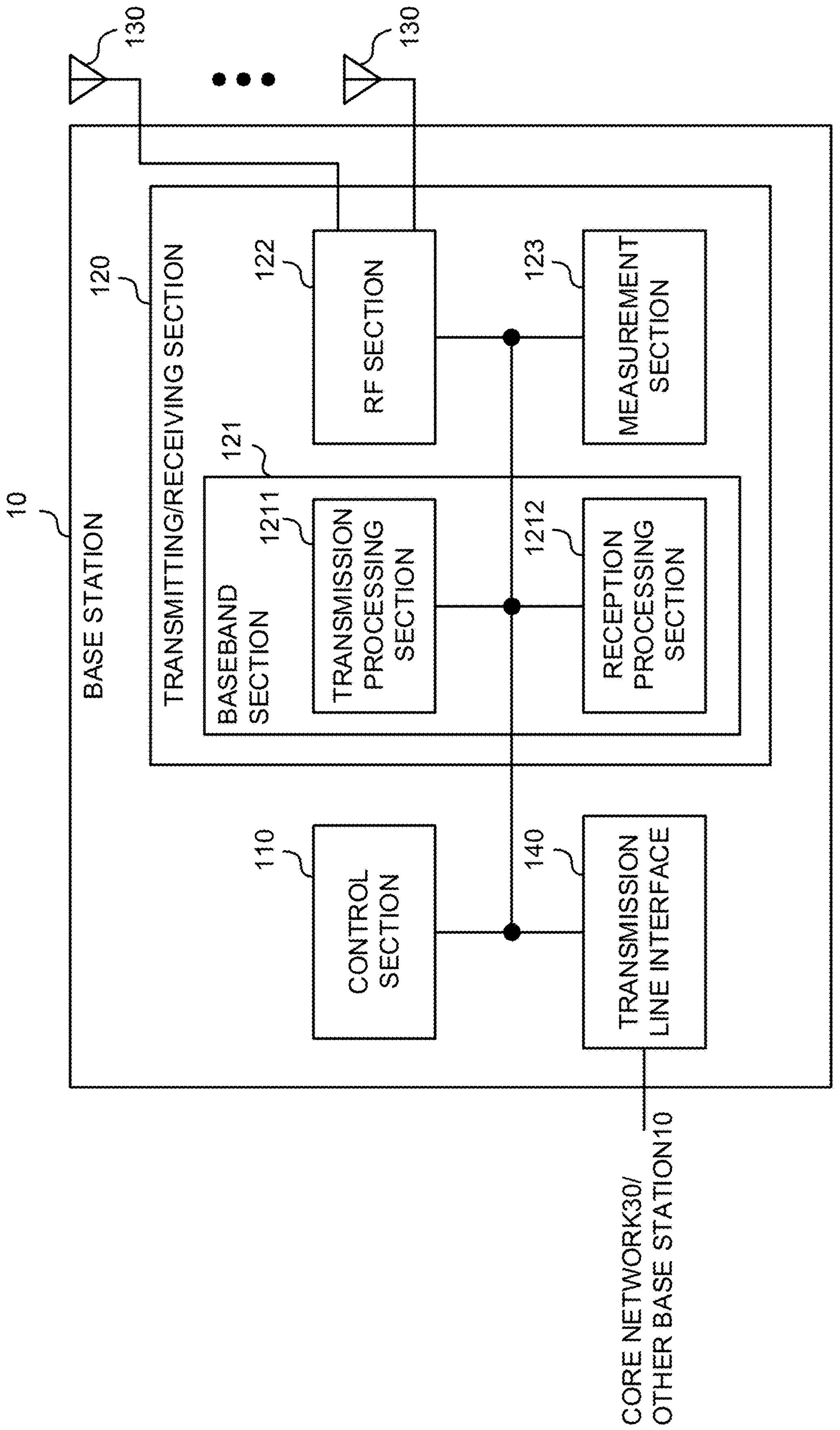
FIG. 55 is a diagram to show an example of a structure of a base station according to one embodiment.

FIG. 55 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

The transmitting/receiving section 120 may transmit a configuration of a demodulation reference signal (DMRS). The control section 110 may control transmission and reception of the DMRS, based on one or more associations between a plurality of code division multiplexing (CDM) groups and a plurality of DMRS ports and the configuration. Number of the plurality of CDM groups for DMRS configuration type 1 may be larger than 2, and number of the plurality of CDM groups for DMRS configuration type 2 may be larger than 3.

The transmitting/receiving section 120 may transmit downlink control information including a resource assignment of a physical uplink shared channel and a value of an antenna port indication. The control section 110 may control reception of a demodulation reference signal (DMRS), based on an association between the value, number of code division multiplexing (CDM) groups, and a DMRS port. Number of the CDM groups for DMRS configuration type 1 may be larger than 2, and number of the CDM groups for DMRS configuration type 2 may be larger than 3.

The transmitting/receiving section 120 may transmit downlink control information including a resource assignment of a physical downlink shared channel and a value of an antenna port indication. Transmission of a demodulation reference signal (DMRS) may be controlled, based on an association between the value, number of code division multiplexing (CDM) groups, and a DMRS port. Number of the CDM groups for DMRS configuration type 1 may be larger than 2, and number of the CDM groups for DMRS configuration type 2 may be larger than 3.

The transmitting/receiving section 120 may transmit a configuration of a demodulation reference signal (DMRS). The control section 110 may control transmission and reception of the DMRS, based on one or more associations between a plurality of code division multiplexing (CDM) groups and a plurality of DMRS ports and the configuration. Number of the plurality of DMRS ports for DMRS configuration type 1 may be larger than 8, and number of the plurality of DMRS ports for DMRS configuration type 2 may be larger than 12. The plurality of DMRS ports may include a first plurality of DMRS ports and a second plurality of DMRS ports.

(User Terminal)

Figure 56:
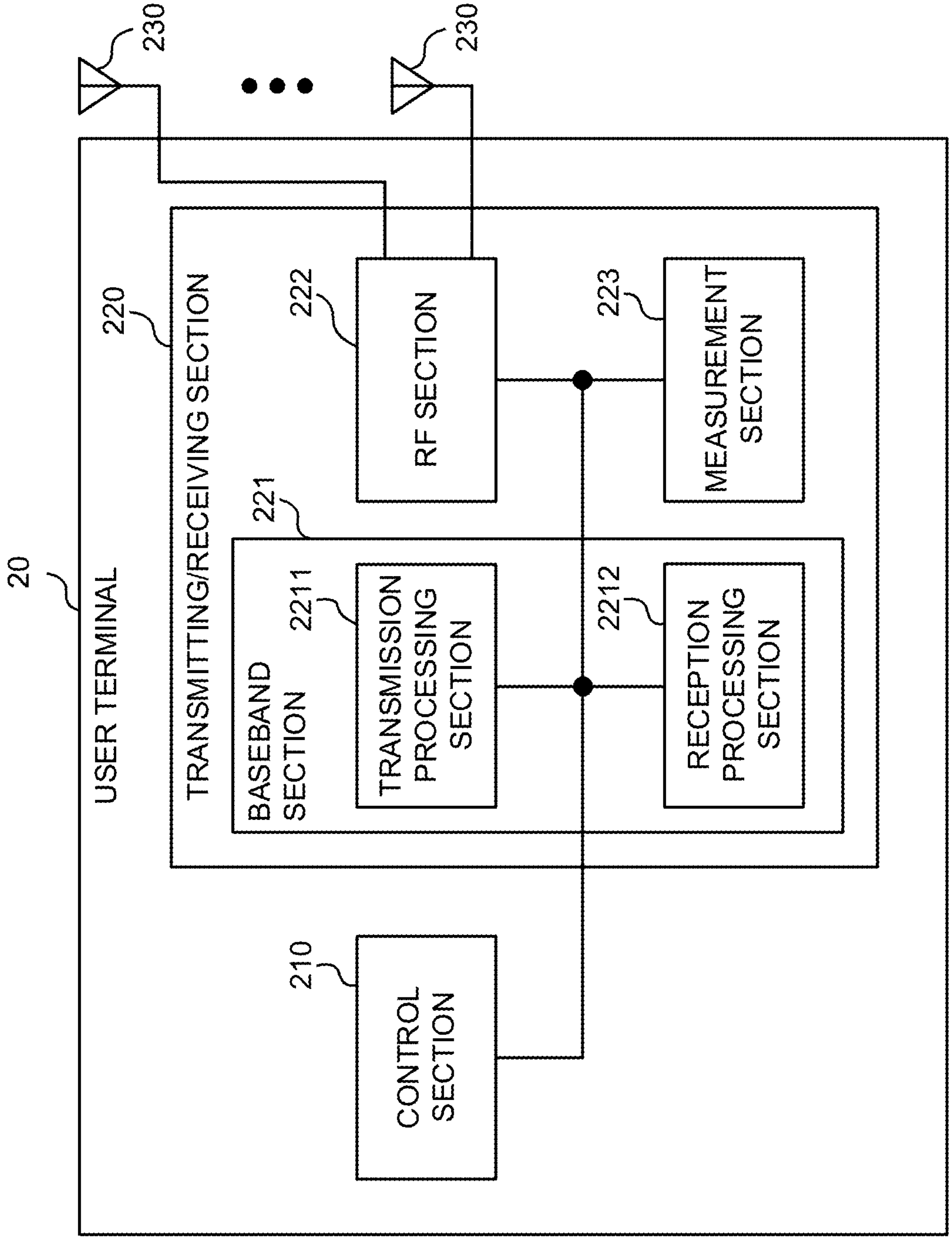
FIG. 56 is a diagram to show an example of a structure of a user terminal according to one embodiment.

FIG. 56 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

The transmitting/receiving section 220 may receive a configuration of a demodulation reference signal (DMRS). The control section 210 may control transmission and reception of the DMRS, based on one or more associations between a plurality of code division multiplexing (CDM) groups and a plurality of DMRS ports and the configuration. Number of the plurality of CDM groups for DMRS configuration type 1 may be larger than 2, and number of the plurality of CDM groups for DMRS configuration type 2 may be larger than 3.

The plurality of CDM ports may include a first plurality of CDM groups and a second plurality of CDM groups. The plurality of DMRS ports may include a first plurality of DMRS ports and a second plurality of DMRS ports. Number of the plurality of DMRS ports for DMRS configuration type 1 may be larger than 8, and number of the plurality of DMRS ports for DMRS configuration type 2 may be larger than 12.

The one or more associations may include a first association between the first plurality of CDM groups and the first plurality of DMRS ports, and a second association between the second plurality of CDM groups and the second plurality of DMRS ports.

The one or more associations may include a first association between the first plurality of CDM groups and the first plurality of DMRS ports. The control section 210 may add a first number to one index of the first plurality of DMRS ports, and thereby determine one index of the second plurality of DMRS ports. The control section 210 may add a second number to one index of the first plurality of CDM groups, and thereby determine one index of the second plurality of CDM groups.

The transmitting/receiving section 220 may receive downlink control information including a resource assignment of a physical uplink shared channel and a value of an antenna port indication. The control section 210 may control transmission of a demodulation reference signal (DMRS), based on an association between the value, number of code division multiplexing (CDM) groups, and a DMRS port. Number of the CDM groups for DMRS configuration type 1 may be larger than 2, and number of the CDM groups for DMRS configuration type 2 may be larger than 3.

Number of the DMRS ports for DMRS configuration type 1 may be larger than 8, and number of the DMRS ports for DMRS configuration type 2 may be larger than 12.

The association may include an association between an index of each of the CDM groups and an index of the DMRS port.

A first plurality of DMRS ports may be associated with a first plurality of CDM groups, and a second plurality of DMRS ports may be associated with a second plurality of CDM groups. The control section 210 may add a first number to one index of the first plurality of DMRS ports, and thereby determine one index of the second plurality of DMRS ports of the plurality of DMRS ports.

The transmitting/receiving section 220 may receive downlink control information including a resource assignment of a physical downlink shared channel and a value of an antenna port indication. The control section 210 may control reception of a demodulation reference signal (DMRS), based on an association between the value, number of code division multiplexing (CDM) groups, and a DMRS port. Number of the CDM groups for DMRS configuration type 1 may be larger than 2, and number of the CDM groups for DMRS configuration type 2 may be larger than 3.

Number of the DMRS ports for DMRS configuration type 1 may be larger than 8, and number of the DMRS ports for DMRS configuration type 2 may be larger than 12.

The association may include an association between an index of each of the CDM groups and an index of the DMRS port.

A first plurality of DMRS ports may be associated with a first plurality of CDM groups, and a second plurality of DMRS ports may be associated with a second plurality of CDM groups. The control section 210 may add a first number to one index of the first plurality of DMRS ports, and thereby determine one index of the second plurality of DMRS ports of the plurality of DMRS ports.

The transmitting/receiving section 220 may receive a configuration of a demodulation reference signal (DMRS). The control section 210 may control transmission and reception of the DMRS, based on one or more associations between a plurality of code division multiplexing (CDM) groups and a plurality of DMRS ports and the configuration. Number of the plurality of DMRS ports for DMRS configuration type 1 may be larger than 8, and number of the plurality of DMRS ports for DMRS configuration type 2 may be larger than 12. The plurality of DMRS ports may include a first plurality of DMRS ports and a second plurality of DMRS ports.

The first plurality of DMRS ports may be associated with the plurality of CDM groups, and the second plurality of DMRS ports may be associated with the plurality of CDM groups.

The control section 210 may add a first number to one index of the first plurality of DMRS ports, and thereby determine one index of the second plurality of DMRS ports.

The control section 210 may perform rate matching, based on the configuration.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 57:
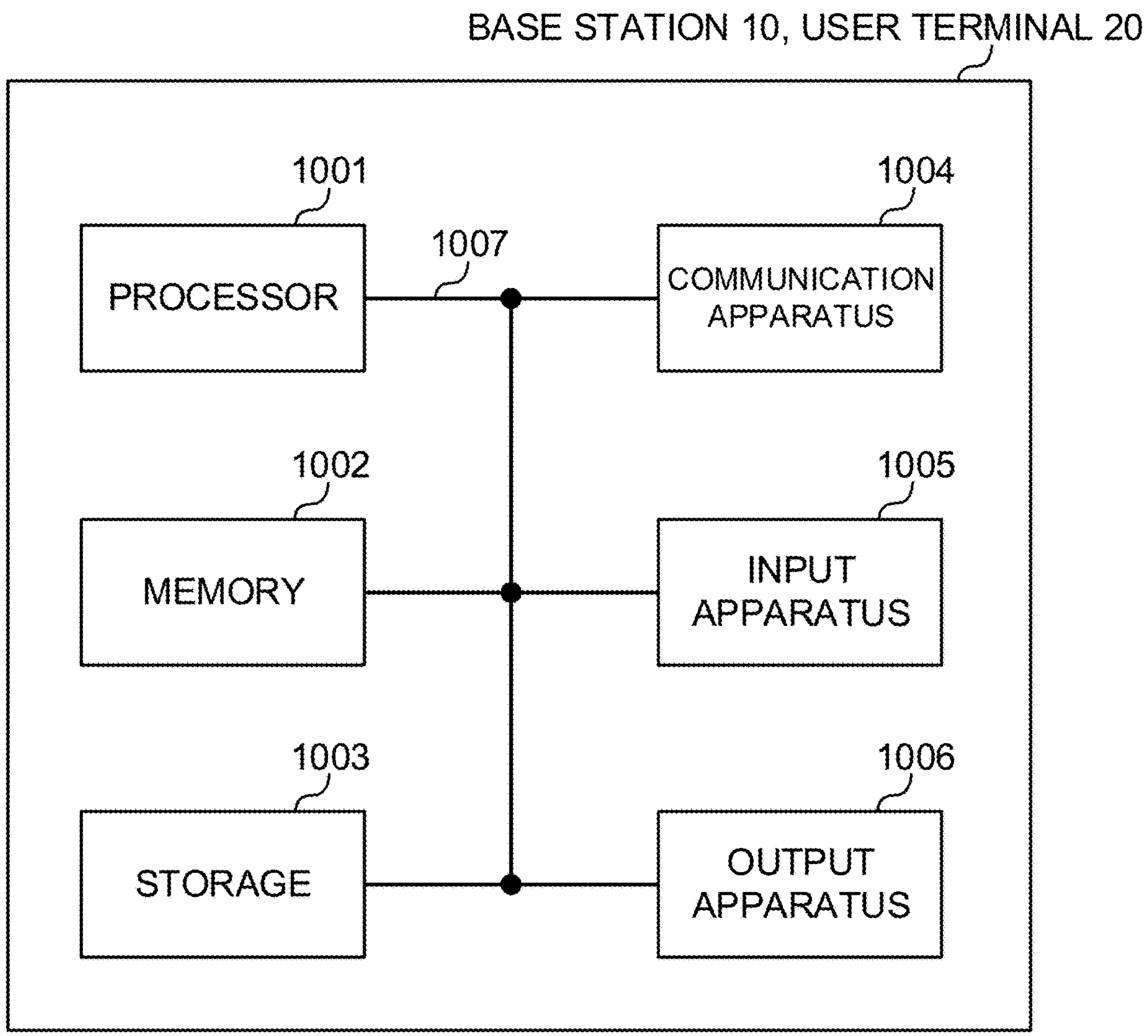
FIG. 57 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 57 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004.

In the transmitting/receiving section 120 (220), the transmitting section 120*a* (220*a*) and the receiving section 120*b* (220*b*) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

VARIATIONS

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS,"

and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be a device mounted on a moving object or a moving object itself, and so on.

The moving object refers to a mobile object, of which moving speed is any speed, and also includes, as a matter of course, a case in which the moving object is stationary. For example, the moving object includes, but is not limited to, a vehicle, a transport vehicle, an automobile, a motorcycle, a bicycle, a connected car, an excavator, a bulldozer, a wheel loader, a dump truck, a forklift, a train, a bus, a handcart, a rickshaw, a ship and other watercraft, an airplane, a rocket, an artificial satellite, a drone, a multicopter, a quadcopter, a hot air balloon, and an object loaded on these. The moving object may be a moving object that autonomously moves based on an operation command.

The moving object may be a vehicle (for example, a car, an airplane, and the like), may be a moving object which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Figure 58:
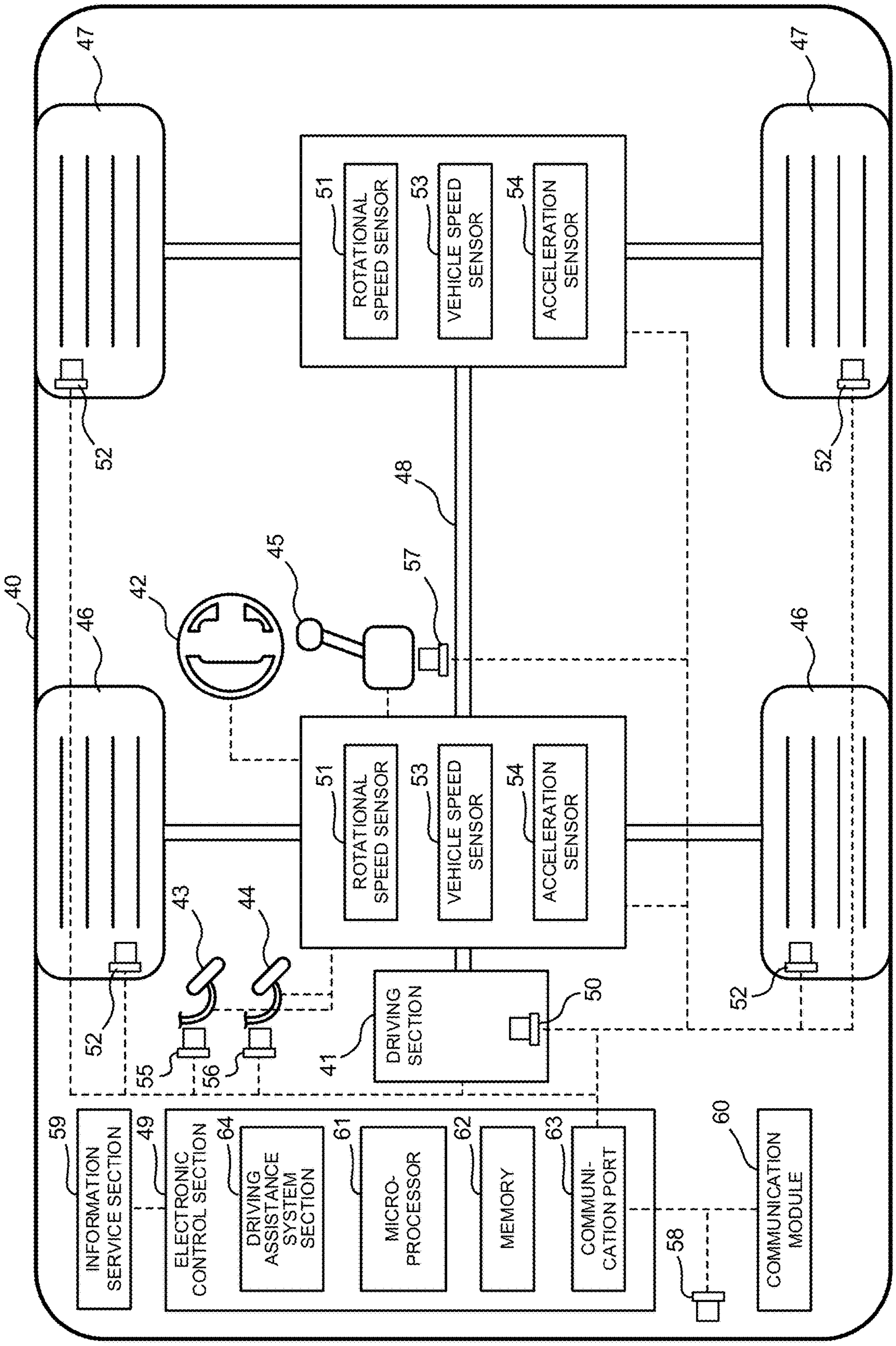
FIG. 58 is a diagram to show an example of a vehicle according to one embodiment.

FIG. 58 is a diagram to show an example of a vehicle according to one embodiment. A vehicle 40 includes a driving section 41, a steering section 42, an accelerator pedal 43, a brake pedal 44, a shift lever 45, right and left front wheels 46, right and left rear wheels 47, an axle 48, an electronic control section 49, various sensors (including a current sensor 50, a rotational speed sensor 51, a pneumatic sensor 52, a vehicle speed sensor 53, an acceleration sensor 54, an accelerator pedal sensor 55, a brake pedal sensor 56, a shift lever sensor 57, and an object detection sensor 58), an information service section 59, and a communication module 60.

The driving section 41 includes, for example, at least one of an engine, a motor, and a hybrid of an engine and a motor. The steering section 42 at least includes a steering wheel, and is configured to steer at least one of the front wheels 46 and the rear wheels 47, based on operation of the steering wheel operated by a user.

The electronic control section 49 includes a microprocessor 61, a memory (ROM, RAM) 62, and a communication port (for example, am input/output (IO) port) 63. The electronic control section 49 receives, as input, signals from the various sensors 50 to 58 included in the vehicle. The electronic control section 49 may be referred to as an Electronic Control Unit (ECU).

Examples of the signals from the various sensors 50 to 58 include a current signal from the current sensor 50 for sensing current of a motor, a rotational speed signal of the front wheels 46/rear wheels 47 acquired by the rotational speed sensor 51, a pneumatic signal of the front wheels 46/rear wheels 47 acquired by the pneumatic sensor 52, a vehicle speed signal acquired by the vehicle speed sensor 53, an acceleration signal acquired by the acceleration sensor 54, a depressing amount signal of the accelerator pedal 43 acquired by the accelerator pedal sensor 55, a depressing amount signal of the brake pedal 44 acquired by the brake pedal sensor 56, an operation signal of the shift lever 45 acquired by the shift lever sensor 57, and a detection signal for detecting an obstruction, a vehicle, a pedestrian, and the like acquired by the object detection sensor 58.

The information service section 59 includes various devices for providing (outputting) various pieces of information such as drive information, traffic information, and entertainment information, such as a car navigation system, an audio system, a speaker, a display, a television, and a radio, and one or more ECUs that control these devices. The information service section 59 provides various pieces of information/services (for example, multimedia information/multimedia service) for an occupant of the vehicle 40, using information acquired from an external apparatus via the communication module 60 and the like.

The information service section 59 may include an input device (for example, a keyboard, a mouse, a microphone, a switch, a button, a sensor, a touch panel, and the like) for receiving input from the outside, or may include an output device (for example, a display, a speaker, an LED lamp, a touch panel, and the like) for implementing output to the outside.

A driving assistance system section 64 includes various devices for providing functions for preventing an accident and reducing a driver's driving load, such as a millimeter wave radar, Light Detection and Ranging (LiDAR), a camera, a positioning locator (for example, a Global Navigation Satellite System (GNSS) and the like), map information (for example, a high definition (HD) map, an autonomous vehicle (AV)) map, and the like), a gyro system (for example, an inertial measurement apparatus (inertial measurement unit (IMU)), an inertial navigation apparatus (inertial navigation system (INS)), and the like), an artificial intelligence (AI) chip, and an AI processor, and one or more ECUs that control these devices. The driving assistance system section 64 transmits and receives various pieces of information via the communication module 60, and implements a driving assistance function or an autonomous driving function.

The communication module 60 can communicate with the microprocessor 61 and the constituent elements of the vehicle 40 via the communication port 63. For example, via the communication port 63, the communication module 60 transmits and receives data (information) to and from the driving section 41, the steering section 42, the accelerator pedal 43, the brake pedal 44, the shift lever 45, the right and left front wheels 46, the right and left rear wheels 47, the axle 48, the microprocessor 61 and the memory (ROM, RAM) 62 in the electronic control section 49, and the various sensors 50 to 58, which are included in the vehicle 40.

The communication module 60 can be controlled by the microprocessor 61 of the electronic control section 49, and is a communication device that can perform communication with an external apparatus. For example, the communication module 60 performs transmission and reception of various pieces of information to and from the external apparatus via radio communication. The communication module 60 may be either inside or outside the electronic control section 49. The external apparatus may be, for example, the base station 10, the user terminal 20, or the like described above. The communication module 60 may be, for example, at least one of the base station 10 and the user terminal 20 described above (may function as at least one of the base station 10 and the user terminal 20).

The communication module 60 may transmit at least one of signals from the various sensors 50 to 58 described above input to the electronic control section 49, information obtained based on the signals, and information based on an input from the outside (a user) obtained via the information service section 59, to the external apparatus via radio communication. The electronic control section 49, the various sensors 50 to 58, the information service section 59, and the like may be referred to as input sections that receive input. For example, the PUSCH transmitted by the communication module 60 may include information based on the input.

The communication module 60 receives various pieces of information (traffic information, signal information, inter-vehicle distance information, and the like) transmitted from the external apparatus, and displays the various pieces of information on the information service section 59 included in the vehicle. The information service section 59 may be referred to as an output section that outputs information (for example, outputs information to devices, such as a display and a speaker, based on the PDSCH received by the communication module 60 (or data/information decoded from the PDSCH)).

The communication module 60 stores the various pieces of information received from the external apparatus in the memory 62 that can be used by the microprocessor 61. Based on the pieces of information stored in the memory 62, the microprocessor 61 may perform control of the driving section 41, the steering section 42, the accelerator pedal 43, the brake pedal 44, the shift lever 45, the right and left front wheels 46, the right and left rear wheels 47, the axle 48, the various sensors 50 to 58, and the like included in the vehicle 40.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words such as "uplink" and "downlink" may be interpreted as the words corresponding to the terminal-to-terminal communication (for example, "sidelink"). For example, an uplink channel, a downlink channel and so on may be interpreted as a sidelink channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), 6th generation mobile communication system (6G), xth generation mobile communication system (xG (where x is, for example, an integer or a decimal)), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (U4B), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced, modified, created, or defined based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

"The maximum transmit power" according to the present disclosure may mean a maximum value of the transmit power, may mean the nominal maximum transmit power (the nominal UE maximum transmit power), or may mean the rated maximum transmit power (the rated UE maximum transmit power).

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

The invention claimed is:

1. A terminal comprising:

a receiver that receives a higher layer signaling for configuring a first enhanced Demodulation Reference Signal (DMRS) configuration type or a second enhanced DMRS configuration type, and receives Downlink Control Information (DCI) for scheduling a Physical Uplink Shared Channel (PUSCH), the DCI including an antenna port indication; and a processor that controls transmission of a DMRS for the PUSCH, based on an association between one or more DMRS ports and a number of Code Division Multiplexing (CDM) groups that correspond to a value of the antenna port indication, wherein when the first enhanced DMRS configuration type is configured, the one or more DMRS ports are any one or more DMRS ports of 8 existing DMRS ports and 8 enhanced DMRS ports, and when the second enhanced DMRS configuration type is configured, the one or more DMRS ports are any one or more DMRS ports of 12 existing DMRS ports and 12 enhanced DMRS ports.

2. The terminal according to claim 1, wherein when a rank is two or less, the one or more DMRS ports are included in only either the existing DMRS ports or the enhanced DMRS ports.

3. The terminal according to claim 1, wherein the antenna port indication has a greater number of bits than a number of bits in a case where the higher layer signaling is not received.

4. A radio communication method for a terminal, comprising:

receiving a higher layer signaling for configuring a first enhanced Demodulation Reference Signal (DMRS) configuration type or a second enhanced DMRS configuration type, and receiving Downlink Control Information (DCI) for scheduling a Physical Uplink Shared Channel (PUSCH), the DCI including an antenna port indication; and controlling transmission of a DMRS for the PUSCH, based on an association between one or more DMRS ports and a number of Code Division Multiplexing (CDM) groups that correspond to a value of the antenna port indication, wherein when the first enhanced DMRS configuration type is configured, the one or more DMRS ports are any one or more DMRS ports of 8 existing DMRS ports and 8 enhanced DMRS ports, and when the second enhanced DMRS configuration type is configured, the one or more DMRS ports are any one or more DMRS ports of 12 existing DMRS ports and 12 enhanced DMRS ports.

5. A base station comprising:

a transmitter that transmits a higher layer signaling for configuring a first enhanced Demodulation Reference Signal (DMRS) configuration type or a second enhanced DMRS configuration type, and transmits Downlink Control Information (DCI) for scheduling a Physical Uplink Shared Channel (PUSCH), the DCI including an antenna port indication; and a processor that controls reception of a DMRS for the PUSCH, based on an association between one or more DMRS ports and a number of Code Division Multiplexing (CDM) groups that correspond to a value of the antenna port indication, wherein when the first enhanced DMRS configuration type is configured, the one or more DMRS ports are any one or more DMRS ports of 8 existing DMRS ports and 8 enhanced DMRS ports, and when the second enhanced DMRS configuration type is configured, the one or more DMRS ports are any one or more DMRS ports of 12 existing DMRS ports and 12 enhanced DMRS ports.

6. A system comprising a terminal and a base station, wherein:

the terminal comprises:

a receiver that receives a higher layer signaling for configuring a first enhanced Demodulation Reference Signal (DMRS) configuration type or a second enhanced DMRS configuration type, and receives Downlink Control Information (DCI) for scheduling a Physical Uplink Shared Channel (PUSCH), the DCI including an antenna port indication; and a processor that controls transmission of a DMRS for the PUSCH, based on an association between one or more DMRS ports and a number of Code Division Multiplexing (CDM) groups that correspond to a value of the antenna port indication, and the base station comprises:

a transmitter that transmits the higher layer signaling, and transmits the DCI, wherein when the first enhanced DMRS configuration type is configured, the one or more DMRS ports are any one or more DMRS ports of 8 existing DMRS ports and 8 enhanced DMRS ports, and when the second enhanced DMRS configuration type is configured, the one or more DMRS ports are any one or more DMRS ports of 12 existing DMRS ports and 12 enhanced DMRS ports.

* * * * *